US011222338B2

(12) United States Patent
McGregor et al.

(10) Patent No.: US 11,222,338 B2
(45) Date of Patent: Jan. 11, 2022

(54) REPLACING A FRAUDULENTLY OBTAINED EXCHANGE ITEM

(71) Applicant: Raise Marketplace Inc., Chicago, IL (US)

(72) Inventors: David S. McGregor, Chicago, IL (US); Frank Zhengfan Yang, Chicago, IL (US)

(73) Assignee: Raise Marketplace Inc., Chicago, IL (US)

(*) Notice: Subject to any disclaimer, the term of this patent is extended or adjusted under 35 U.S.C. 154(b) by 272 days.

(21) Appl. No.: 15/712,962

(22) Filed: Sep. 22, 2017

(65) Prior Publication Data

US 2018/0089685 A1    Mar. 29, 2018

Related U.S. Application Data

(60) Provisional application No. 62/398,804, filed on Sep. 23, 2016.

(51) Int. Cl.
*G06Q 20/40* (2012.01)
*G06Q 20/38* (2012.01)
(Continued)

(52) U.S. Cl.
CPC ......... *G06Q 20/4016* (2013.01); *G06Q 20/02* (2013.01); *G06Q 20/342* (2013.01);
(Continued)

(58) Field of Classification Search
CPC .................. G06Q 20/4016; G06Q 2220/00
See application file for complete search history.

(56) References Cited

U.S. PATENT DOCUMENTS 9,786,003 B2 * 10/2017 Chace .................. G06Q 20/28
9,996,985 B2 *  6/2018 Dixon .................. G06Q 20/28
(Continued)

FOREIGN PATENT DOCUMENTS

WO    WO-2015039139 A1 *  3/2015  ....... H04N 21/47815

OTHER PUBLICATIONS

"Gao et al., Of Two Minds, Multiple Addresses, and One History: Characterizing Opinions, Knowledge, and Perceptions of Bitcoin Across Groups, Mar. 9, 2015, arxiv.org, abstract" (Year: 2015).*

*Primary Examiner* — Hani M Kazimi
*Assistant Examiner* — Adam Hilmantel
(74) *Attorney, Agent, or Firm* — Garlick & Markison; Timothy W. Markison; Timothy D. Taylor

(57) ABSTRACT

A method includes detecting, by a marketplace server of a computing network, fraudulent acquisition of an exchange item by a first computing device of the computing network. The exchange item has a first dynamic identifier (ID) that was created for the first computing device, where the first computing device is a first owner of the exchange item, exchange item information is associated with the exchange item, and the exchange item information includes a static ID of the exchange item. The method further includes deactivating, by the marketplace server, the first dynamic ID in response to the detecting fraudulent acquisition. The method further includes, after deactivating the first dynamic ID, detecting, by the marketplace server, requested use of the exchange item by the first computing device, denying, by the marketplace server, the requested use of the exchange item, and reclaiming, by the marketplace server, ownership of the exchange item.

22 Claims, 54 Drawing Sheets

(51) Int. Cl.
*G06Q 20/36* (2012.01)
*G06Q 20/02* (2012.01)
*G06Q 20/34* (2012.01)

(52) U.S. Cl.
CPC ........... *G06Q 20/36* (2013.01); *G06Q 20/367* (2013.01); *G06Q 20/3674* (2013.01); *G06Q 20/382* (2013.01); *G06Q 20/3827* (2013.01); *G06Q 20/3829* (2013.01); *G06Q 20/409* (2013.01); *G06Q 20/40* (2013.01); *G06Q 2220/00* (2013.01)

(56) References Cited

U.S. PATENT DOCUMENTS

| | | | | |
|---|---|---|---|---|
| 10,192,224 | B1* | 1/2019 | Ryan | G07F 7/06 |
| 2009/0210318 | A1* | 8/2009 | Abifaker | G06Q 40/00 705/26.1 |
| 2013/0297473 | A1* | 11/2013 | Wolfe | G06Q 20/4016 705/35 |
| 2015/0213439 | A1* | 7/2015 | Kramer | G06Q 20/347 235/380 |
| 2016/0012424 | A1* | 1/2016 | Simon | G06Q 20/3674 705/67 |
| 2016/0012465 | A1* | 1/2016 | Sharp | G06Q 20/386 705/14.17 |
| 2016/0267474 | A1* | 9/2016 | Lingham | G06Q 20/0655 |
| 2016/0267566 | A1* | 9/2016 | Levitt | G06Q 20/28 |

\* cited by examiner exchange item marketplace network 10A exchange item (EI) database 934

| EI s/n | issuer | owner | EI info | conditions | EI rules | offer for sale | use options | blockchain control | blockchain location |
|---|---|---|---|---|---|---|---|---|---|
| 001 | A_1 | AA | 01 info | x1,y4,z7 | set 1 | No | A_1_n | owner | owner |
| 002 | A_1 | BD | 02 info | x2,z3 | set 1 | Yes | A_1_n & B_1_C | MP server | MP server |
| 003 | DA_3 | FG | 03 info | k1,m12 | set 1&2 | No | DA_3 | merchant | MP server |
| 004 | F_Z_3 | PE | 04 info | n/a | none | Yes | F_Z_3_m | issuer | owner |
| 005 | B_K | AA | 05 info | E3,f6,p5 | set 4 | yes | B_K | trusted module | owner |

FIG. 8H

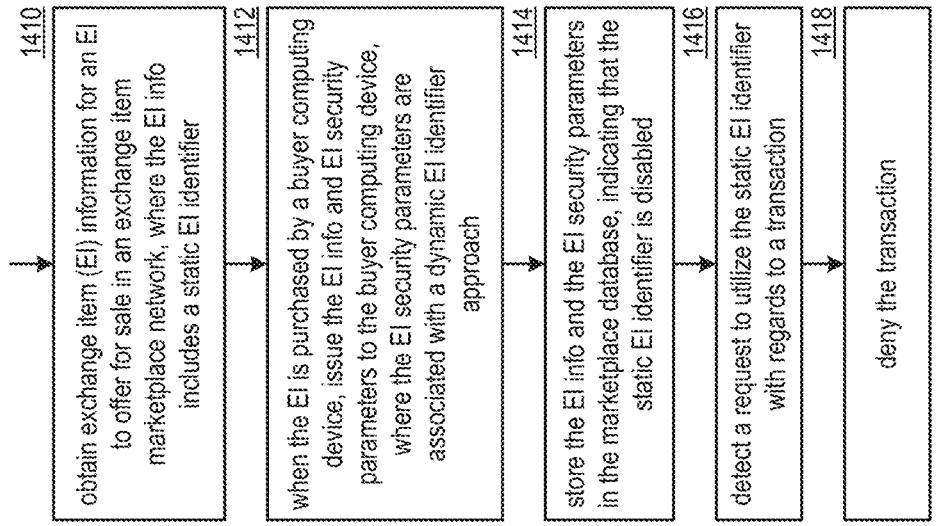

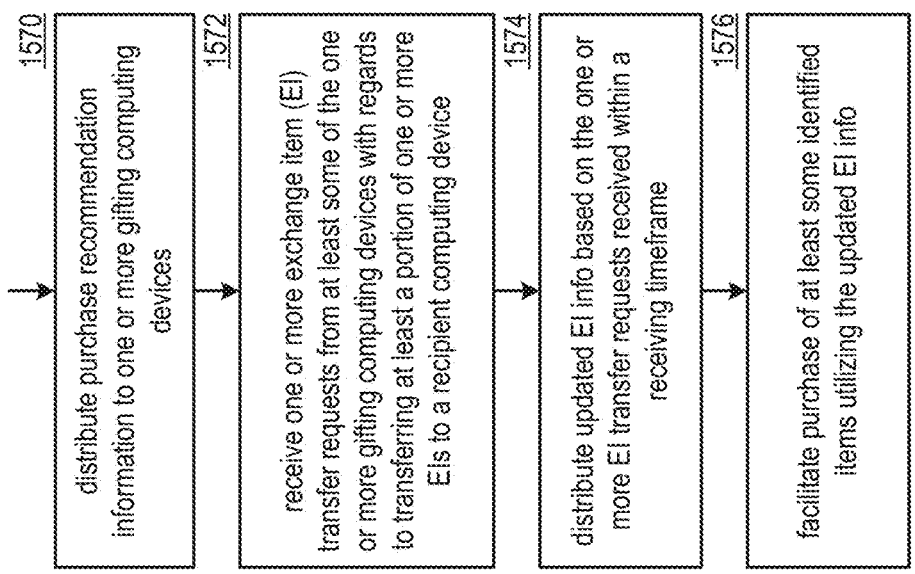

REPLACING A FRAUDULENTLY OBTAINED EXCHANGE ITEM

CROSS REFERENCE TO RELATED PATENTS

The present U.S. Utility patent application claims priority pursuant to 35 U.S.C. § 119(e) to U.S. Provisional Application No. 62/398,804, entitled "AUTHORIZING EXCHANGE ITEM REDEMPTION IN AN EXCHANGE ITEM MARKETPLACE NETWORK," filed Sep. 23, 2016, which is hereby incorporated herein by reference in its entirety and made part of the present U.S. Utility patent application for all purposes.

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

Technical Field of the Invention

This invention relates generally to computer networks and more particularly to an exchange item marketplace network.

Description of Related Art

The use of credit cards, debit cards, and gift cards to pay for goods and services is well known. It is further known to use services such as PayPal™ or Apple Pay™ to expand the use of credit cards and debit cards through computing devices (e.g., computers, tablets, cell phones, etc.). The use of these services is aided by the standardized numbering system and format used by credit card issuers and debit card issuers.

For a credit card and debit card transaction, the credit or debit cardholder presents the credit or debit card to a merchant (e.g., on line or brick & mortar) to pay for a purchase. The merchant uses point of sale (POS) equipment to capture the information of the credit or debit card and to enter the amount of the purchase. This information is sent to an acquirer (e.g., the financial institution of the merchant). The acquirer sends the transaction information via a secure network of a credit card company to the cardholder's issuer (e.g., a financial institution that issued the credit or debit card to the cardholder).

The issuer approves or declines the transaction and sends the response back to the acquirer via the secure network of the credit card company. The acquirer sends the response (e.g., approved or declined) to the merchant to complete the transaction. Money, however, is not exchanged at the time of purchase, but is done during clearing and settlement.

Clearing and settlement begins when the merchant deposits the transaction receipt with the acquirer. The acquirer credits the merchant's account and sends the transaction receipt to the issuer via the secure network. The issuer posts the transaction to the cardholder's account. The cardholder pays the issuer in response to receiving a monthly statement.

The issuance and use of a gift card is significantly different than that of a credit card. FIG. 1 illustrates a diagram regarding the issuance and use of a gift card. A branded company (e.g., a retailer, a chain store, a restaurant, etc.) issues a request to create gift cards to a processor service. The processor service creates the gift cards, which may be issued with specific values or issued as blanks; where the value is specified at the time of purchase.

The processor service provides the gift cards to a distributor who is responsible for distributing the gift cards so that a consumer may purchase them. For example, the distributor may provide gift cards to merchants so they may sell the gift cards. At some point, a consumer purchases a gift card (e.g., a sporting goods company gift card for $50.00). The payment for the gift card is processed such that the distributor, processing service, and branded company each are paid their respective shares.

If the gift card is used, a merchant (e.g., a franchise owner of the branded company) captures information of the gift card via point of sale (POS) equipment. The information of the gift card is processed to determine if it is a valid gift card and to determine the balance remaining on the gift card. If the card is valid, the use of the gift card is authorized up to the balance remaining on the gift card. Once the use is complete, the balance is updated, processing fees are paid, and the branded company is debited.

Another difference between credit cards and gift cards is that gift cards do not have a standardized numbering system or format. As such, gift cards can have one of thousands of different numbering systems and formats, which have to be recognizable by the POS equipment.

Yet another different between credit cards and gift cards is when money is processed. For credit cards, money is not processed until a purchase occurs, while gift cards are purchased and then subsequently used. As such, money is processed at the time of purchase of the gift card and again if the gift card is used.

A still further difference between credit cards and purchased gift cards is that, if a credit card goes unused, no money is spent. In contrast, if a purchased gift card goes unused, money has been spent to acquire the card, but no goods or services are acquired. It is estimated that billions of dollars worth of purchased gift cards go unused annually. While this may be a favorable scenario for the branded company, it is not a favorable scenario for consumers. Another issue concerning gift card use is fraudulent acquisition.

BRIEF DESCRIPTION OF THE SEVERAL VIEWS OF THE DRAWING(S)

FIG. 8H is a diagram of an exchange item database in accordance with the present invention;

Figure 9A:
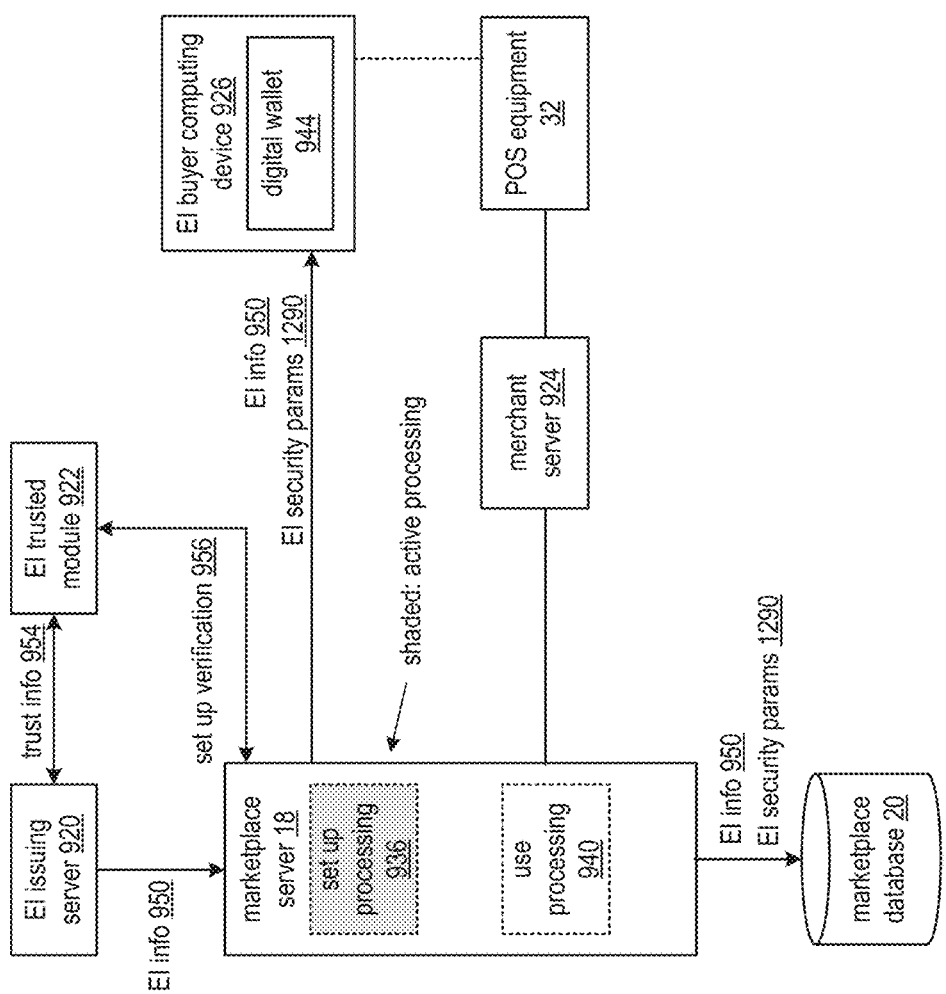
Figure 9B:
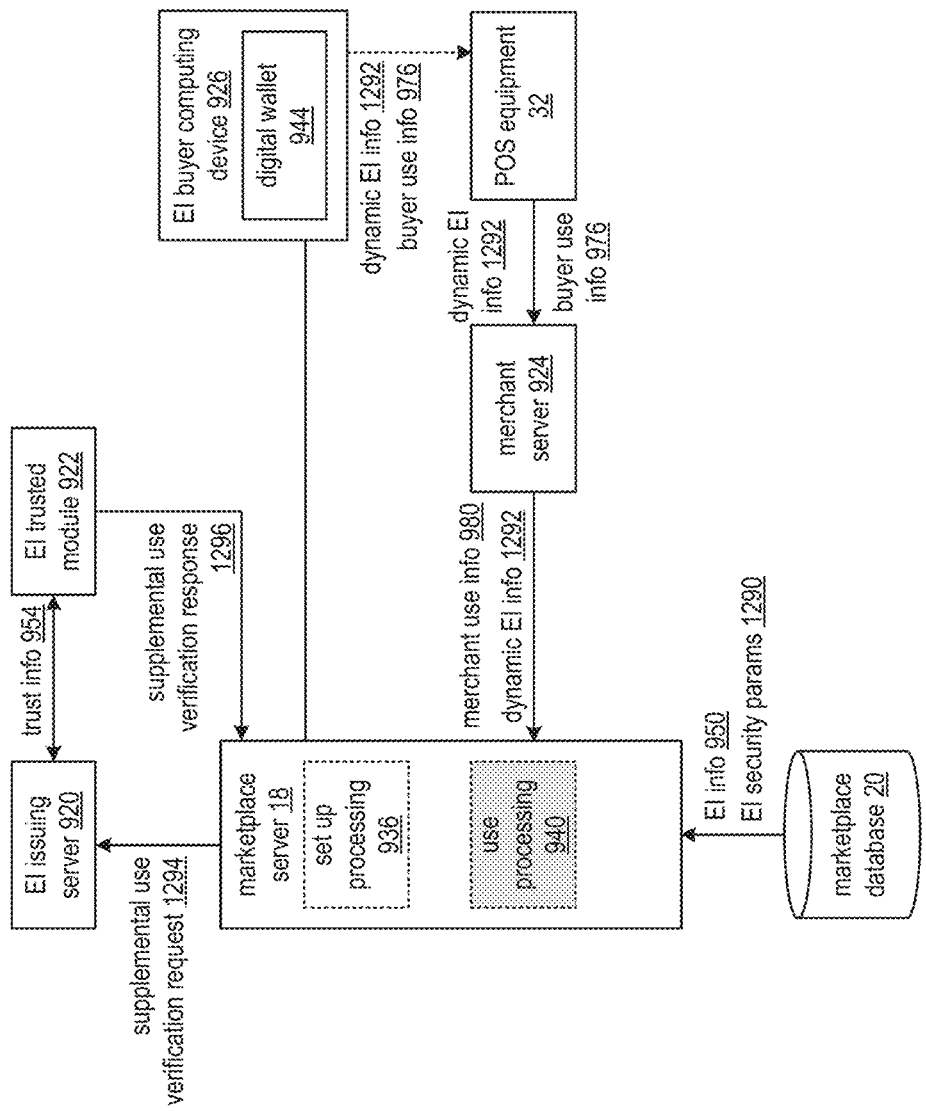
Figure 9C:
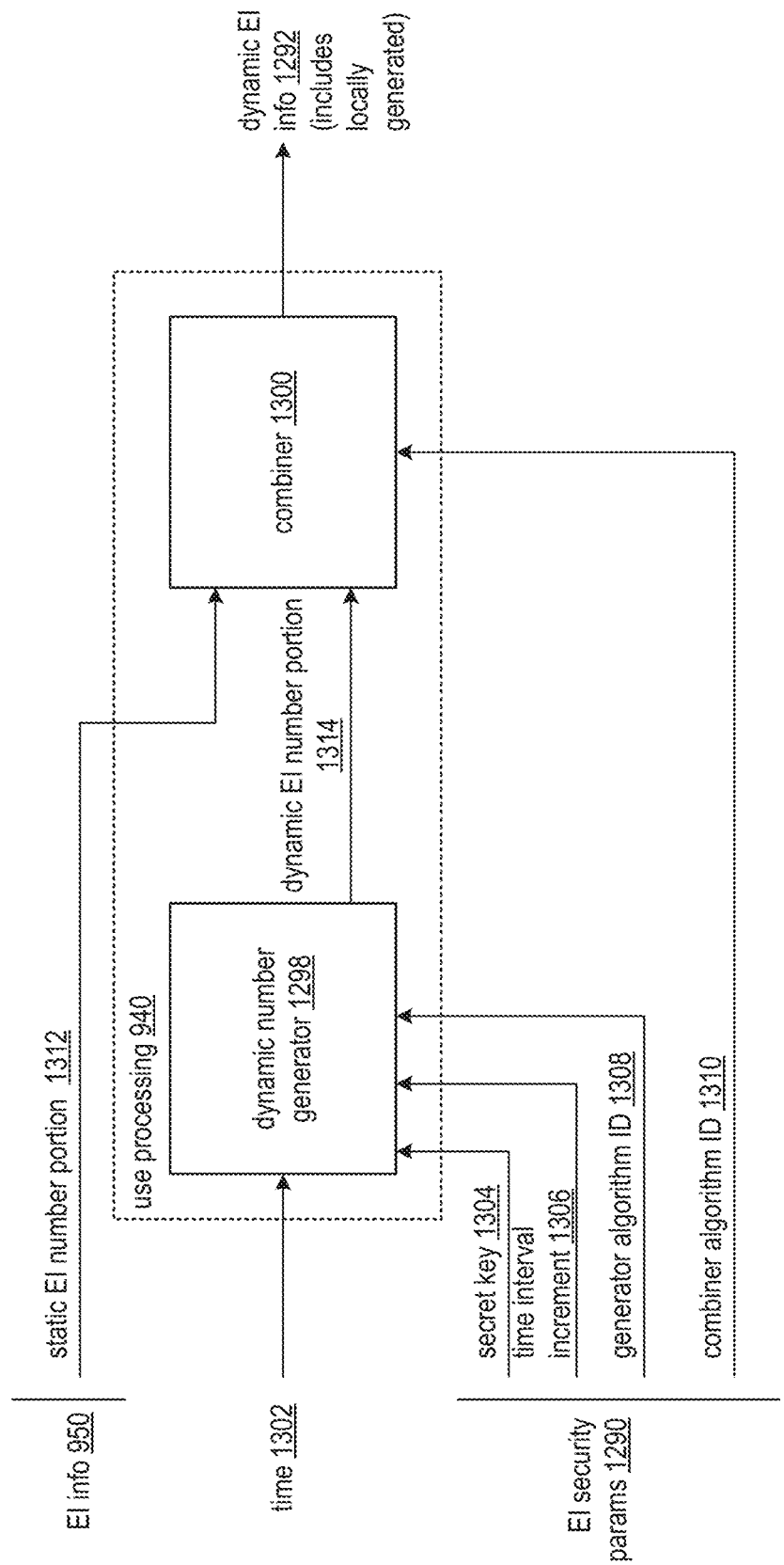
Figure 9D:
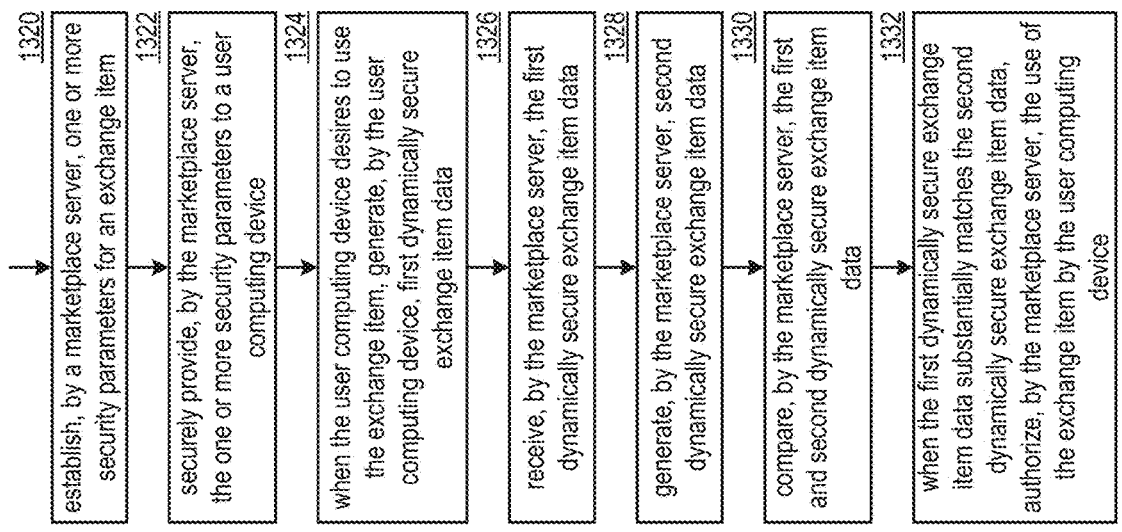
Figure 10A:
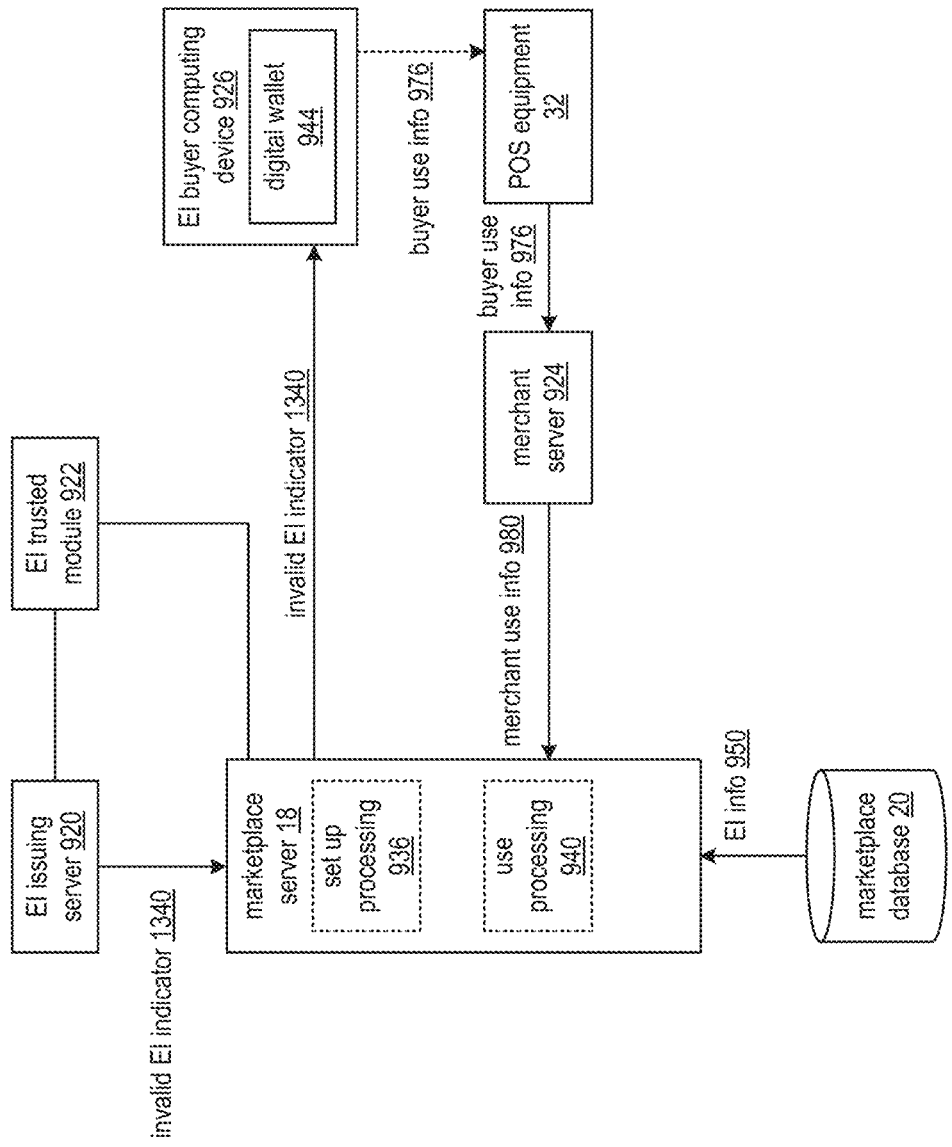
Figure 10B:
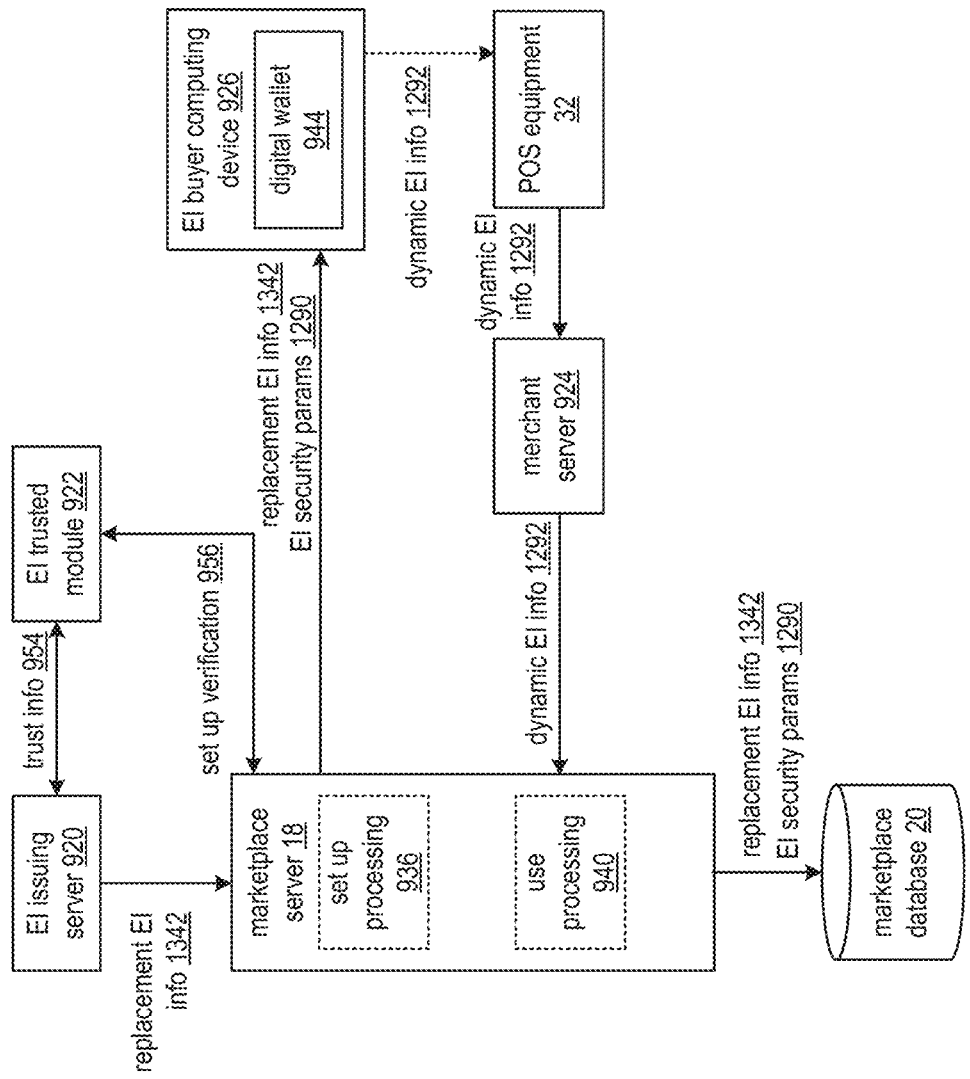
Figure 10C:
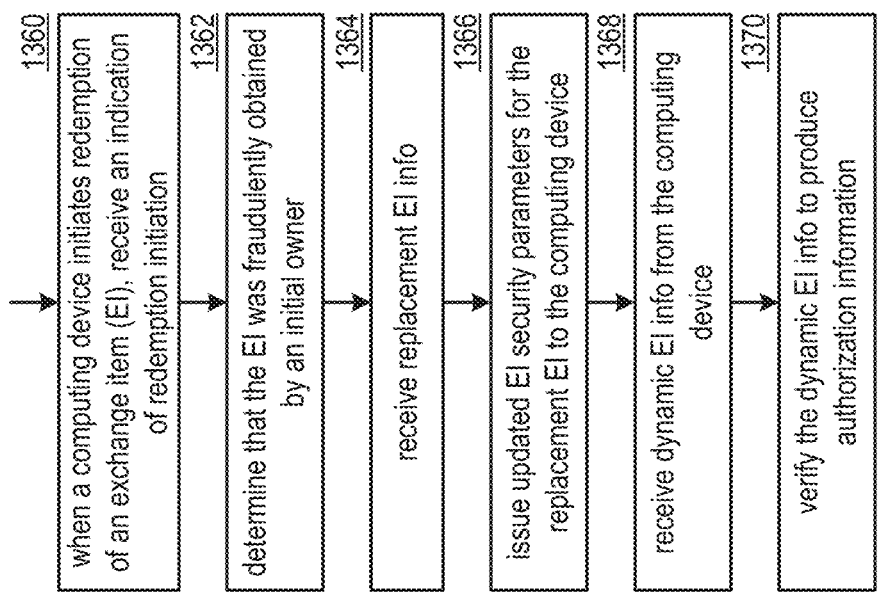
Figure 11A:
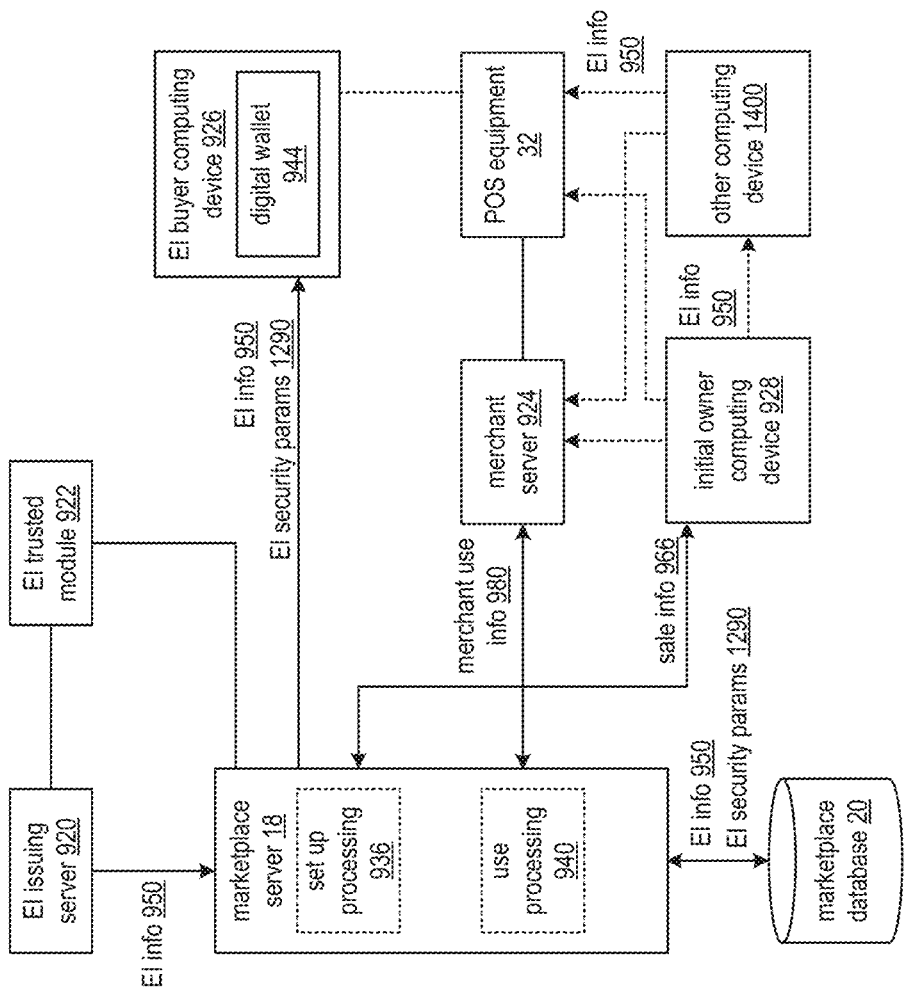
Figure 12A:
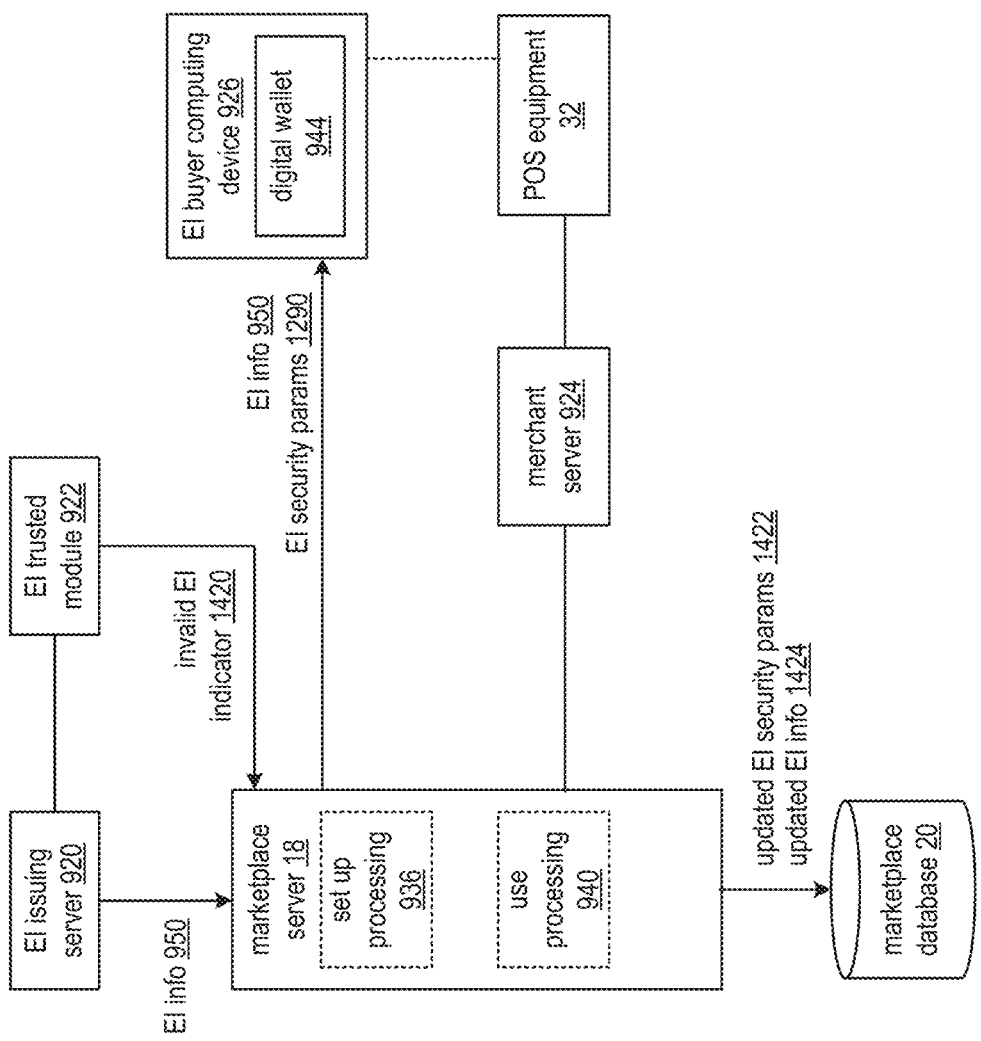
Figure 12B:
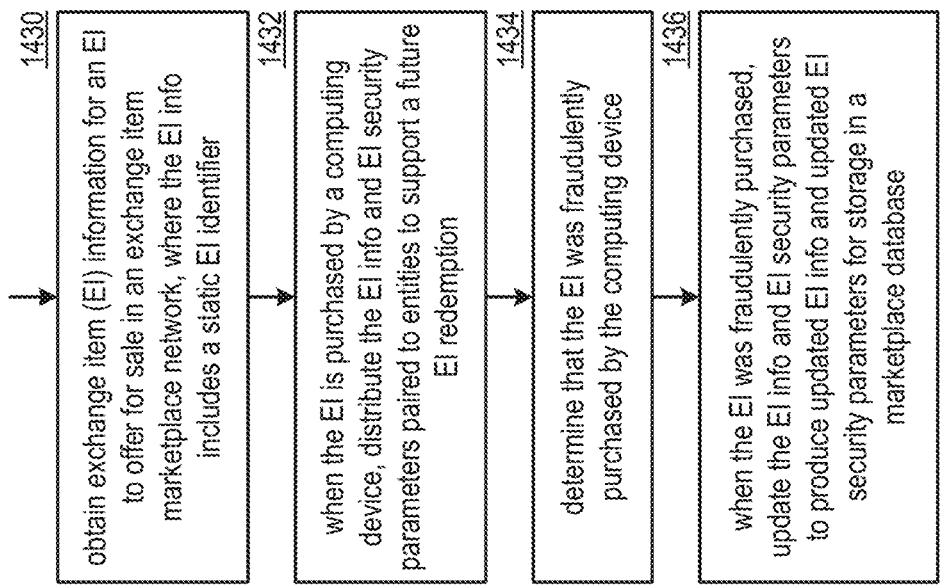
Figure 13A:
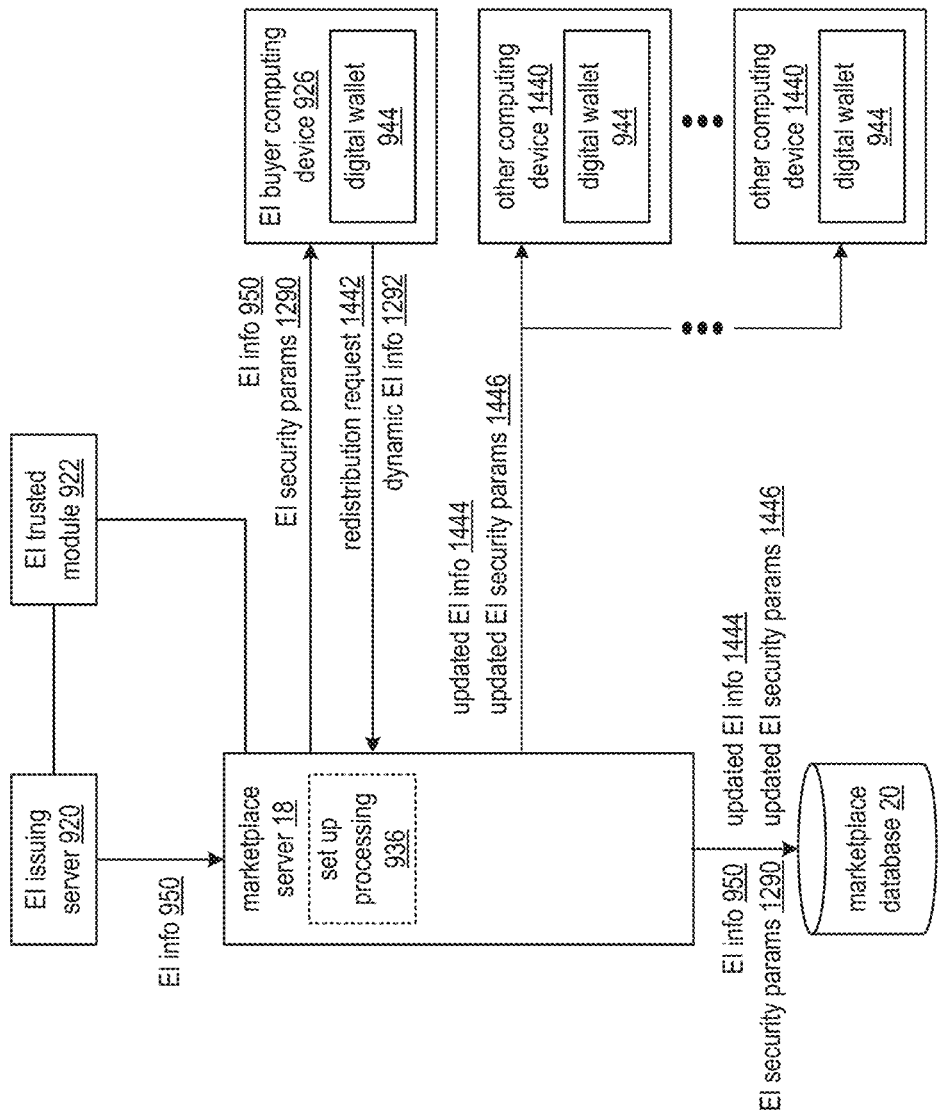
Figure 13B:
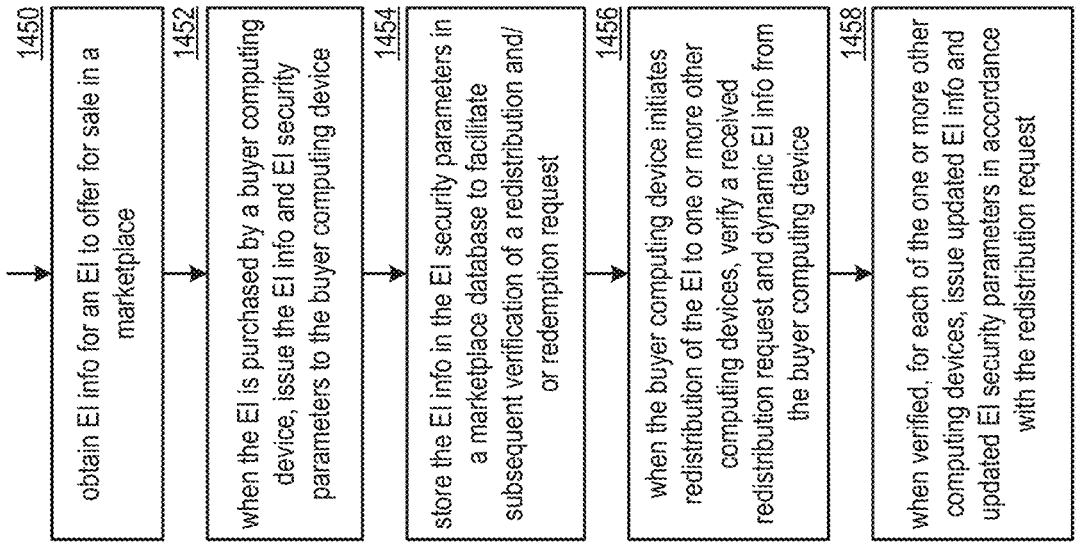
Figure 14A:
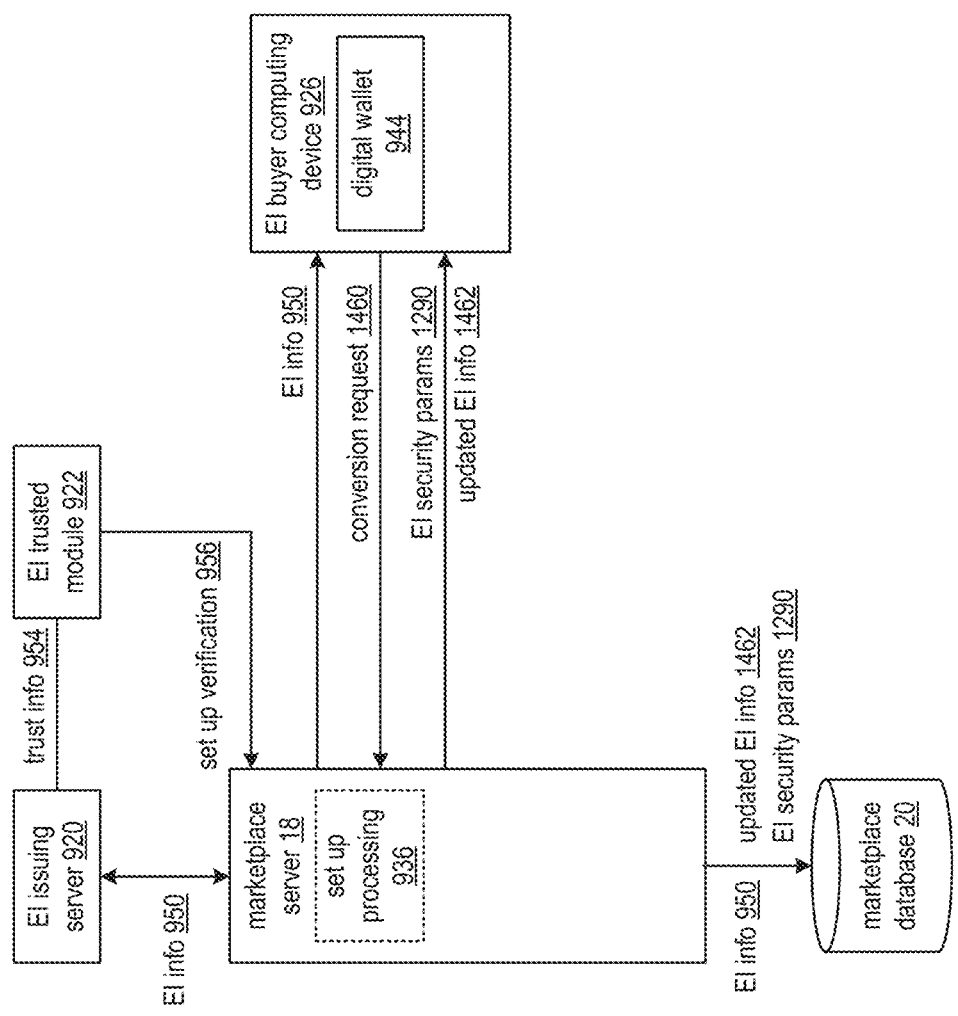
Figure 14B:
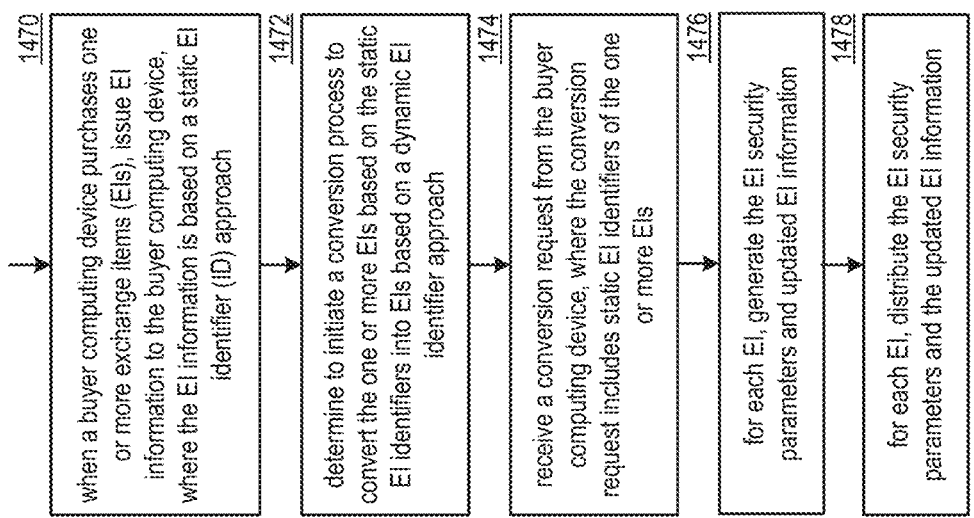
Figure 15A:
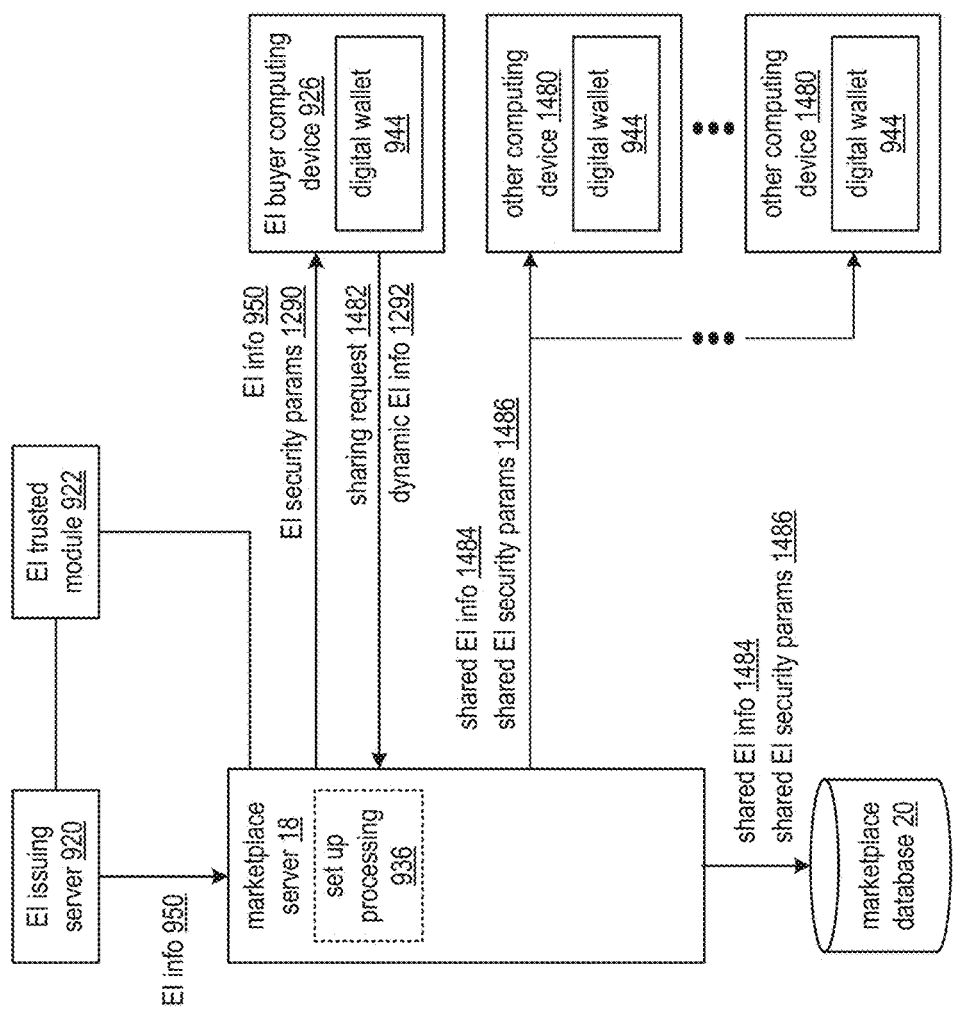
Figure 15B:
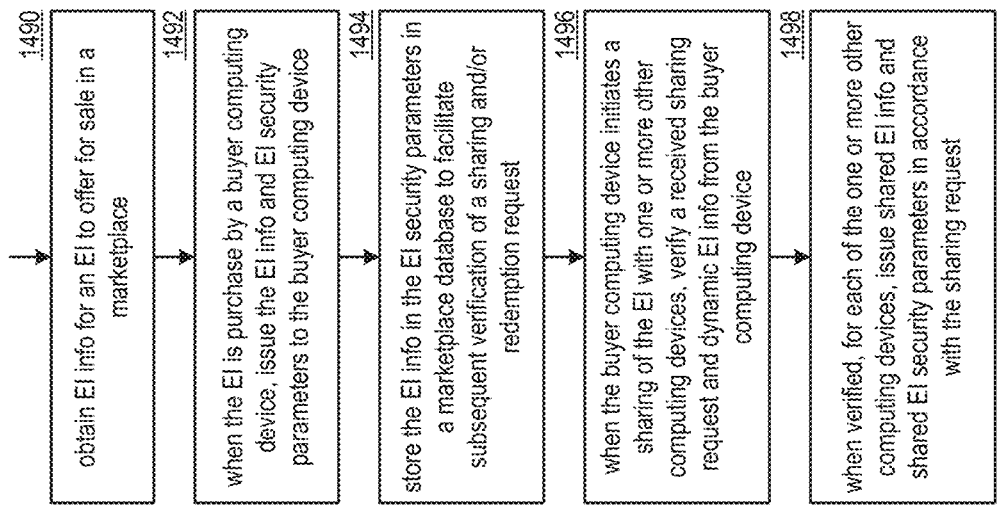
Figure 16A:
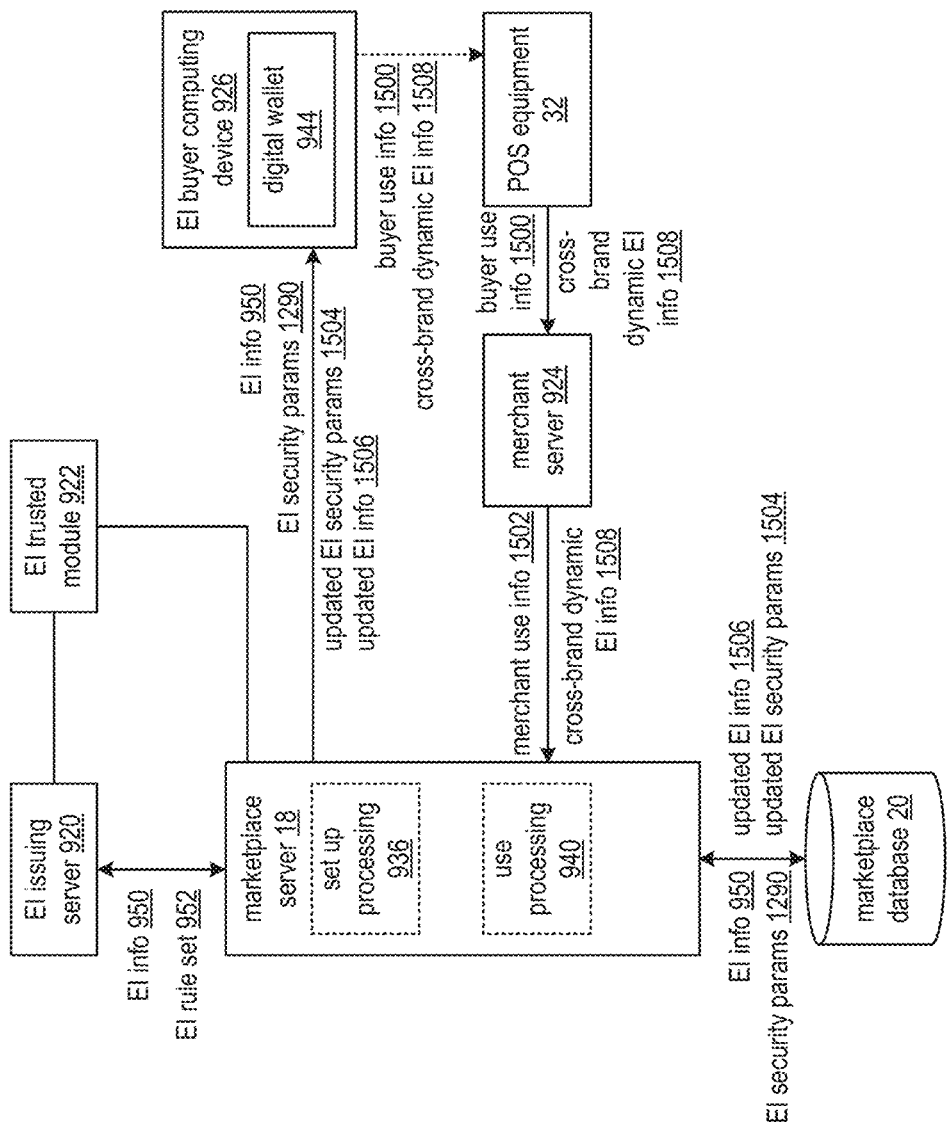
Figure 16B:
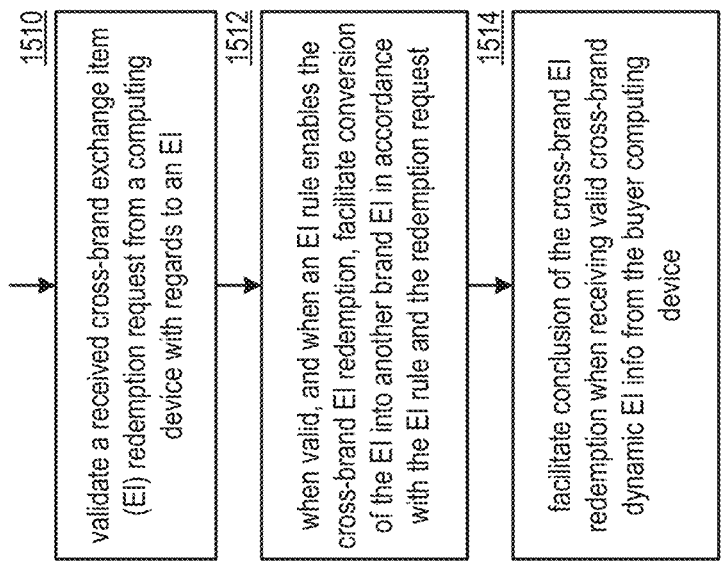
Figure 17A:
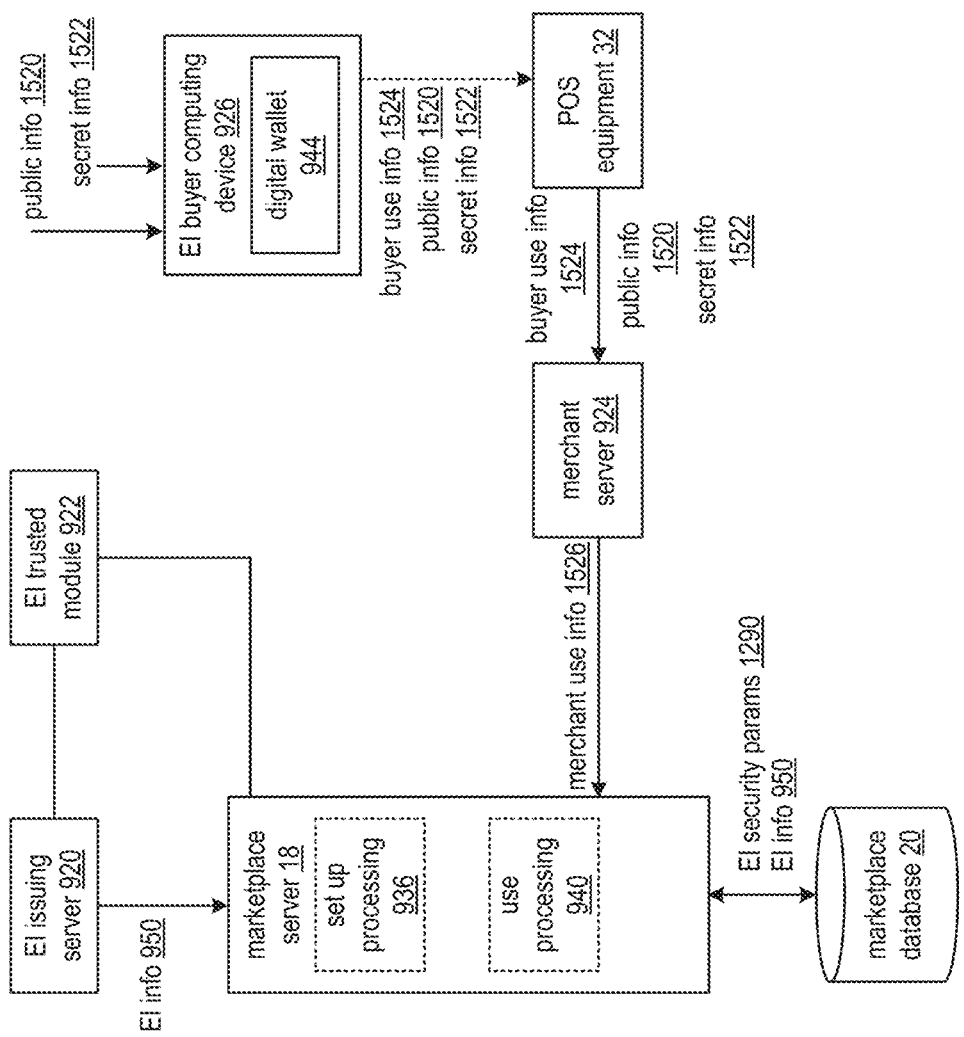
Figure 17B:
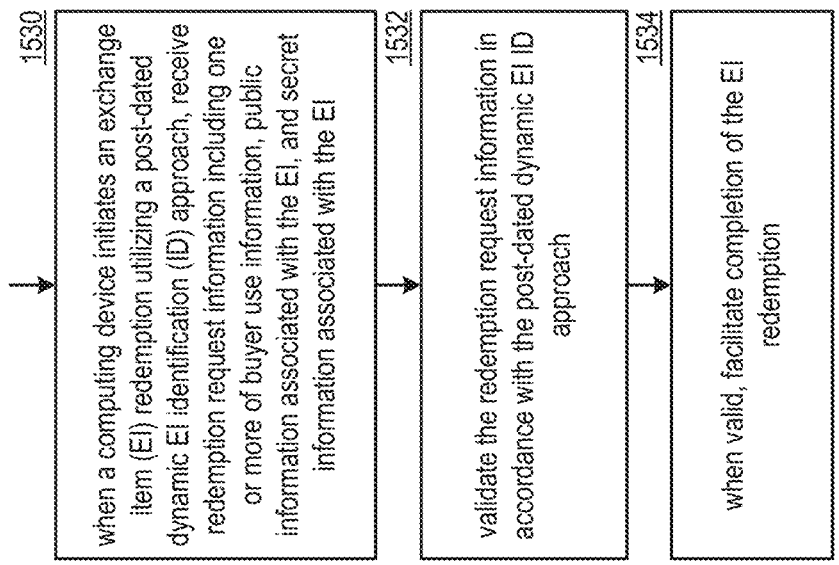
Figure 18A:
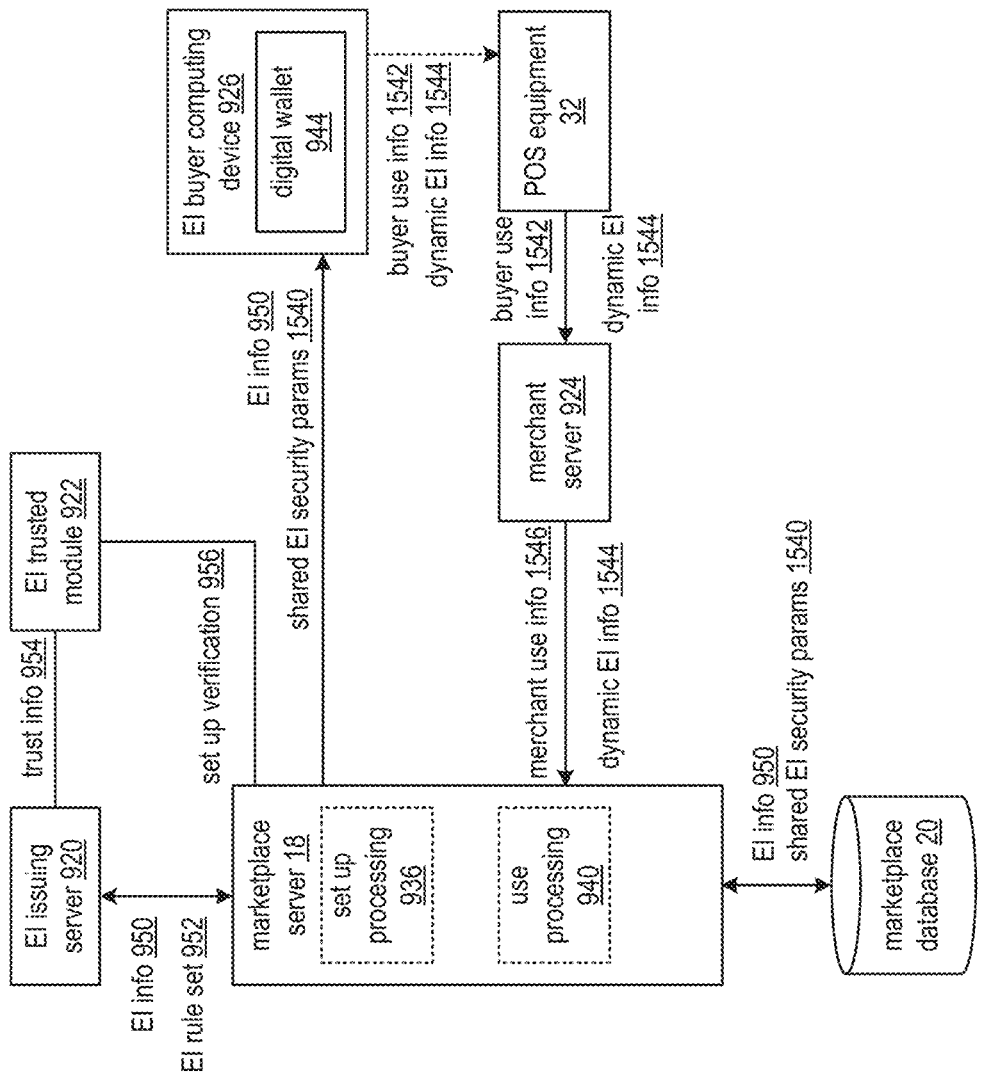
Figure 18B:
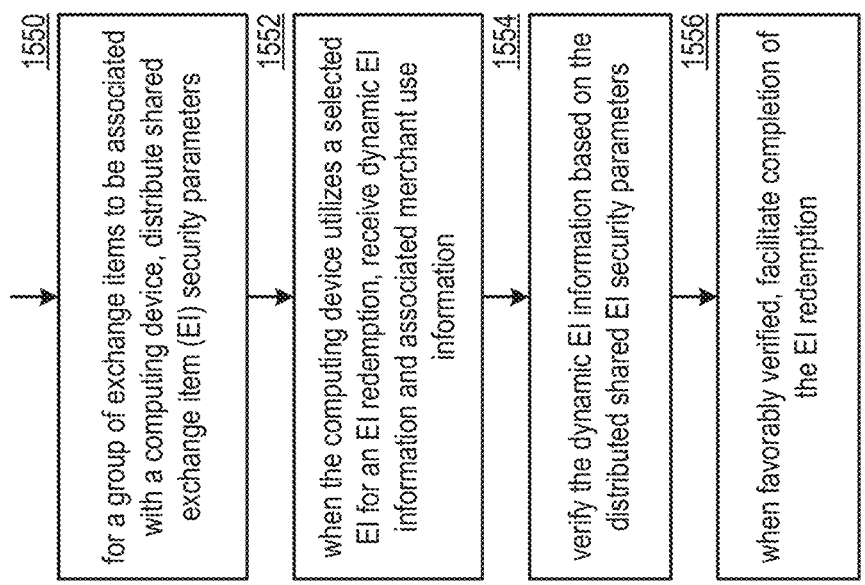
Figure 19A:
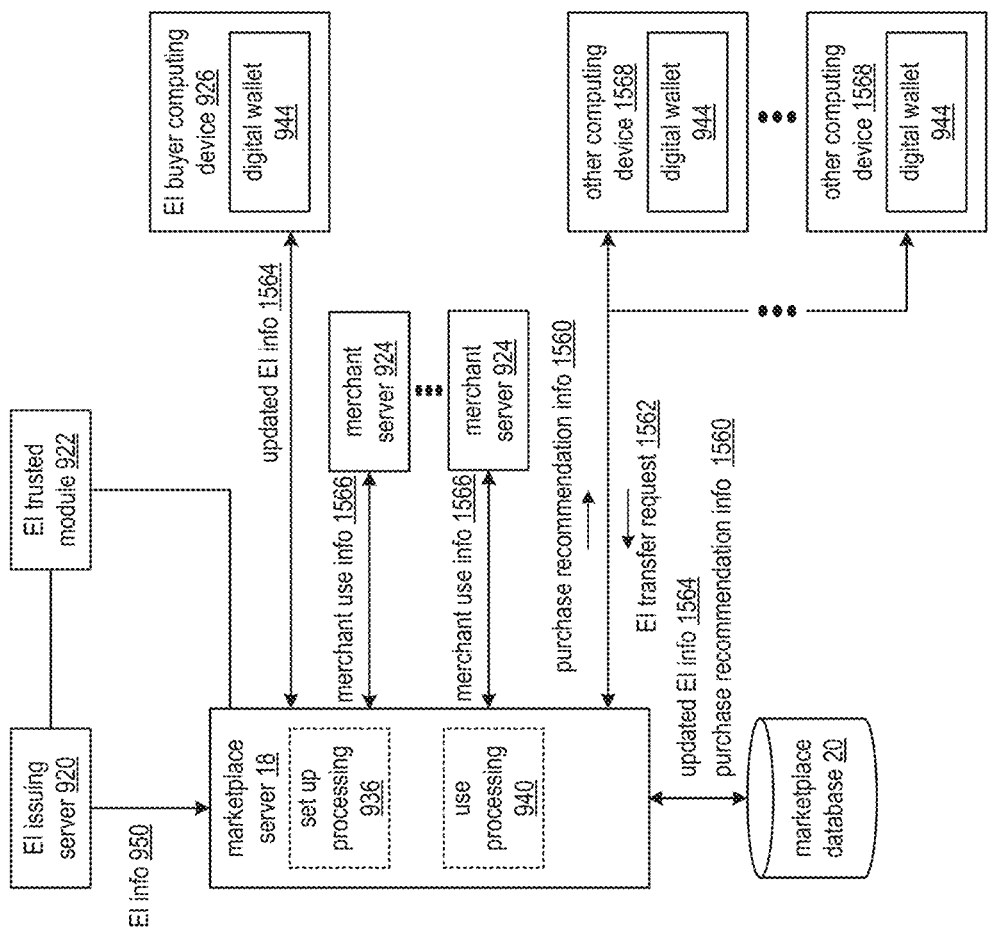
Figure 20A:
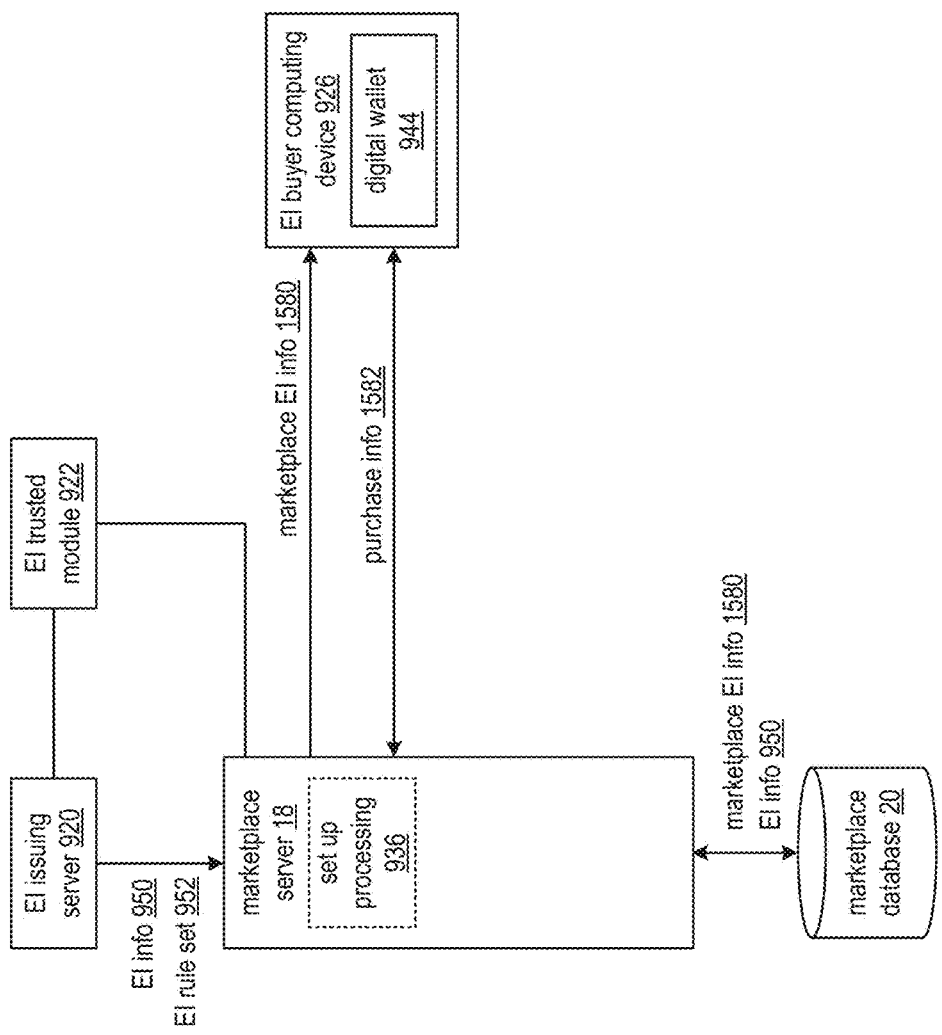
Figure 20B:
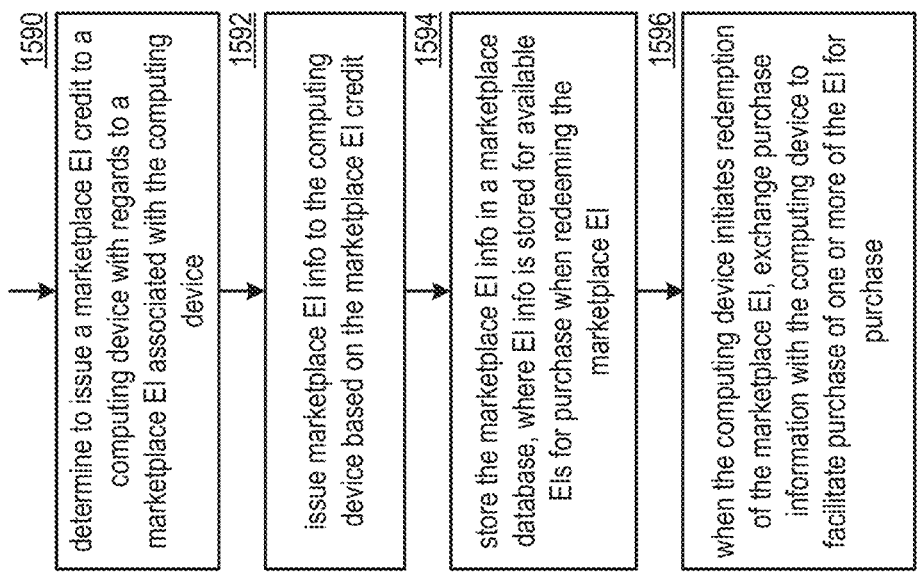
Figure 21A:
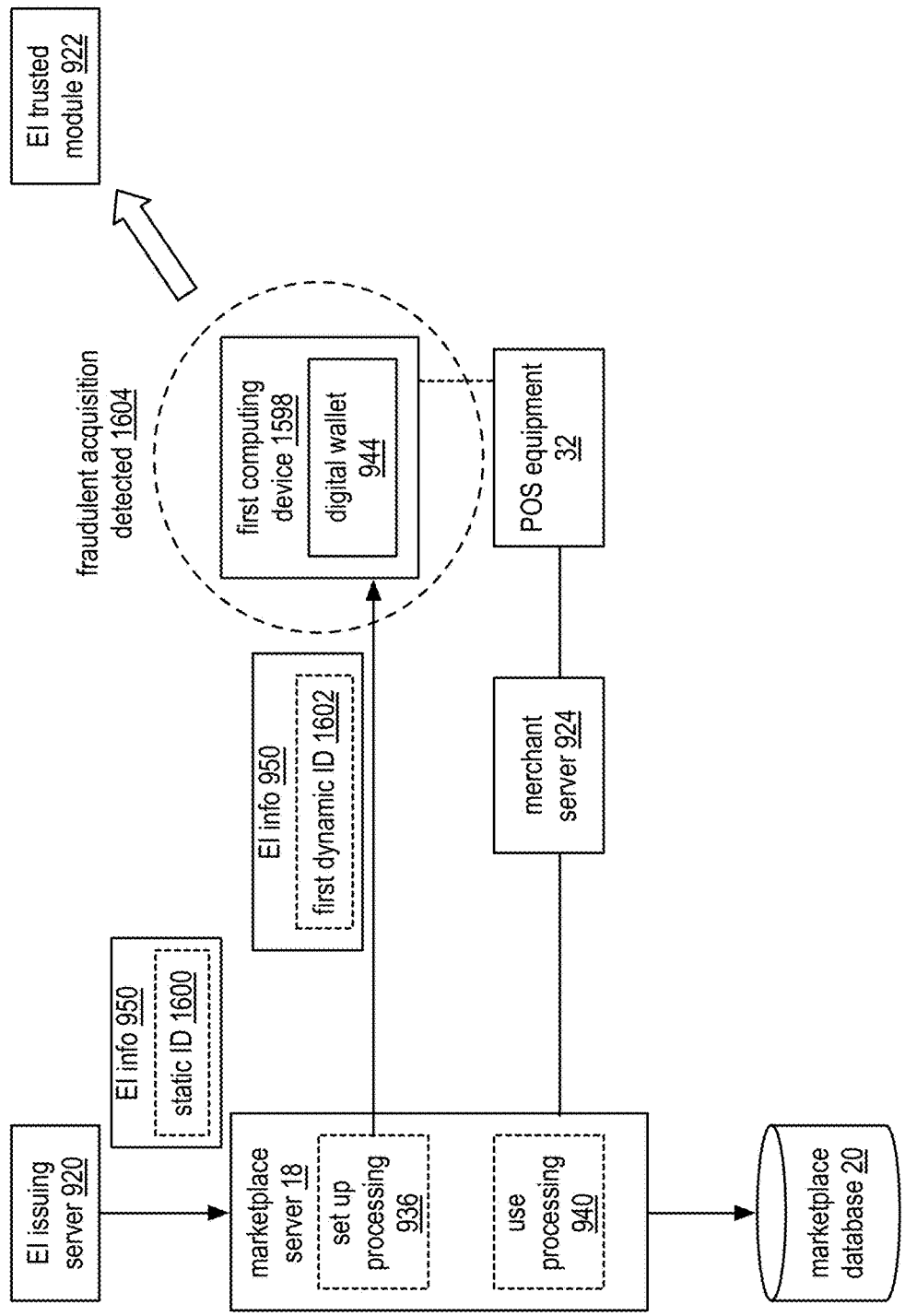
Figure 21B:
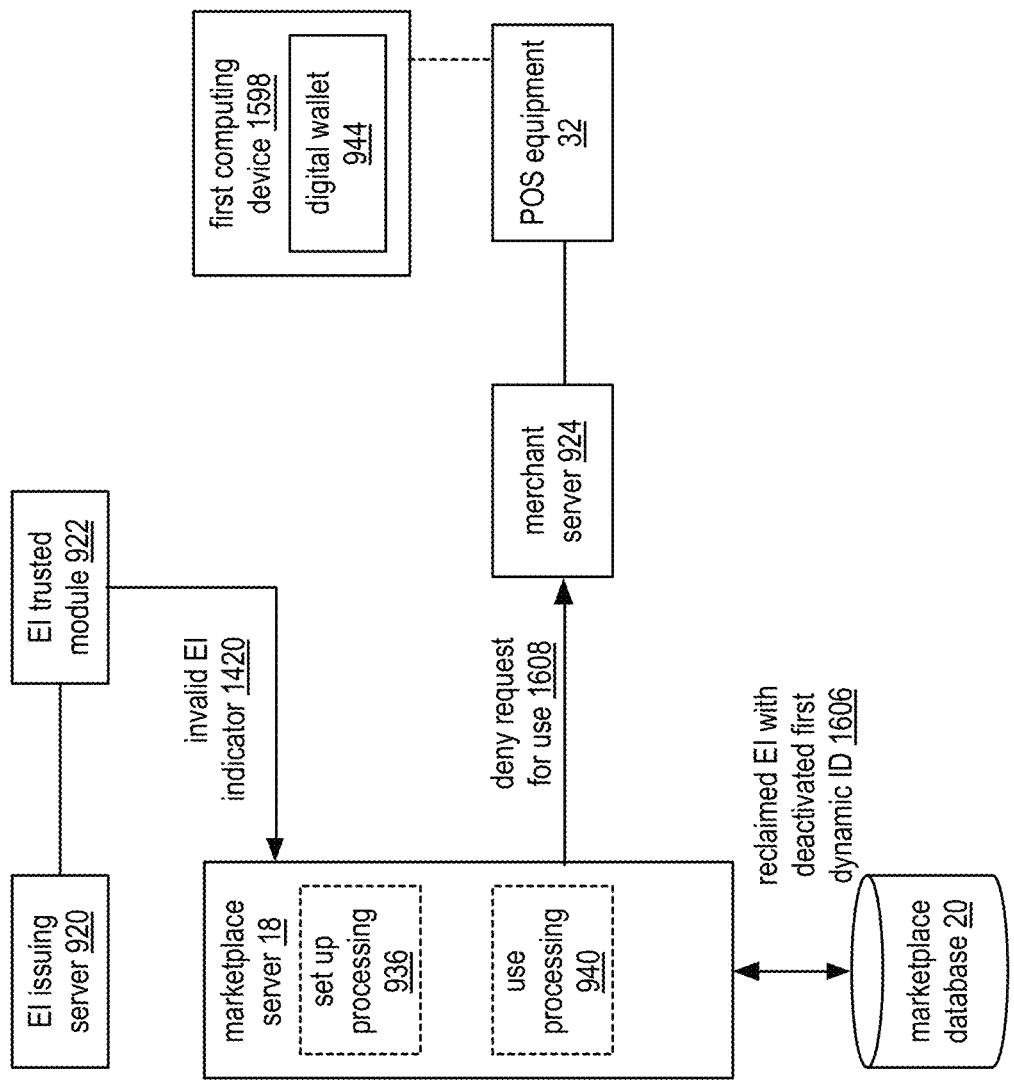
Figure 22:
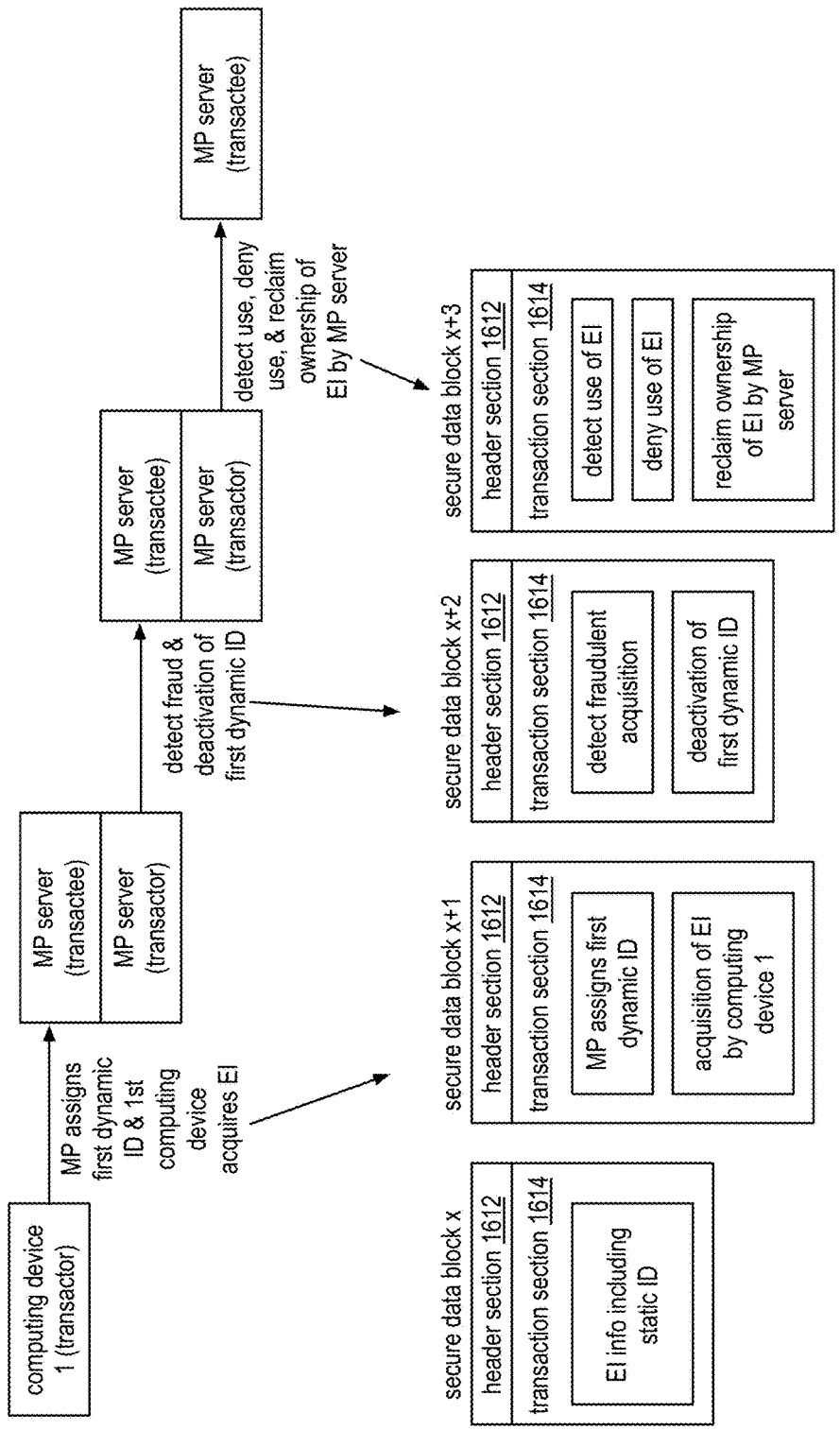
Figure 23:
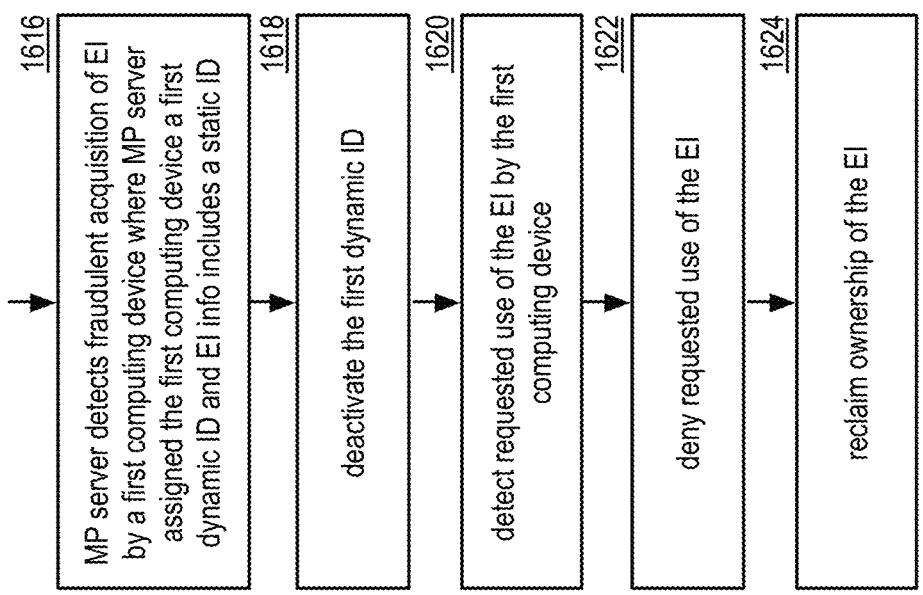

FIGS. 9A-B are schematic block diagrams of another embodiment of an exchange item marketplace network in accordance with the present invention;

FIG. 9C is a schematic block diagram of an embodiment of a use processing in accordance with the present invention;

FIG. 9D is a logic diagram of an embodiment of a method for authorizing exchange item redemption in an exchange item marketplace network in accordance with the present invention;

FIGS. 10A-B are schematic block diagrams of another embodiment of an exchange item marketplace network in accordance with the present invention;

FIG. 10C is a logic diagram of an embodiment of a method for abating fraudulent exchange item acquisition in an exchange item marketplace network in accordance with the present invention;

FIG. 11A is a schematic block diagram of another embodiment of an exchange item marketplace network in accordance with the present invention;

FIG. 11B is a logic diagram of an embodiment of a method for detecting fraudulent exchange item redemption in an exchange item marketplace network in accordance with the present invention;

FIG. 12A is a schematic block diagram of another embodiment of an exchange item marketplace network in accordance with the present invention;

FIG. 12B is a logic diagram of an embodiment of another method for abating fraudulent exchange item acquisition in an exchange item marketplace network in accordance with the present invention;

FIG. 13A is a schematic block diagram of another embodiment of an exchange item marketplace network in accordance with the present invention;

FIG. 13B is a logic diagram of an embodiment of a method for redistributing an exchange item in an exchange item marketplace network in accordance with the present invention;

FIG. 14A is a schematic block diagram of another embodiment of an exchange item marketplace network in accordance with the present invention;

FIG. 14B is a logic diagram of an embodiment of a method for converting an exchange item identification approach in an exchange item marketplace network in accordance with the present invention;

FIG. 15A is a schematic block diagram of another embodiment of an exchange item marketplace network in accordance with the present invention;

FIG. 15B is a logic diagram of an embodiment of a method for sharing an exchange item in an exchange item marketplace network in accordance with the present invention;

FIG. 16A is a schematic block diagram of another embodiment of an exchange item marketplace network in accordance with the present invention;

FIG. 16B is a logic diagram of an embodiment of a method for converting exchange item brand affiliation in an exchange item marketplace network in accordance with the present invention;

FIG. 17A is a schematic block diagram of another embodiment of an exchange item marketplace network in accordance with the present invention;

FIG. 17B is a logic diagram of an embodiment of a method for validating exchange item redemption in an exchange item marketplace network in accordance with the present invention;

FIG. 18A is a schematic block diagram of another embodiment of an exchange item marketplace network in accordance with the present invention;

FIG. 18B is a logic diagram of an embodiment of another method for converting an exchange item identification approach in an exchange item marketplace network in accordance with the present invention;

FIG. 19A is a schematic block diagram of another embodiment of an exchange item marketplace network in accordance with the present invention;

FIG. 19B is a logic diagram of an embodiment of a method for transferring an exchange item in an exchange item marketplace network in accordance with the present invention;

FIG. 20A is a schematic block diagram of another embodiment of an exchange item marketplace network in accordance with the present invention;

FIG. 20B is a logic diagram of an embodiment of a method for generating a marketplace credit in an exchange item marketplace network in accordance with the present invention;

FIG. 21A is a schematic block diagram of another embodiment of an exchange item marketplace network in accordance with the present invention;

FIG. 21B is a schematic block diagram of another embodiment of an exchange item marketplace network in accordance with the present invention;

FIG. 22 is a schematic block diagram a secure chain of custody of an exchange item in accordance with the present invention; and FIG. 23 is a logic diagram of an example of protecting an exchange item from fraudulent acquisition in accordance with the present invention.

DETAILED DESCRIPTION OF THE INVENTION

Figure 1:
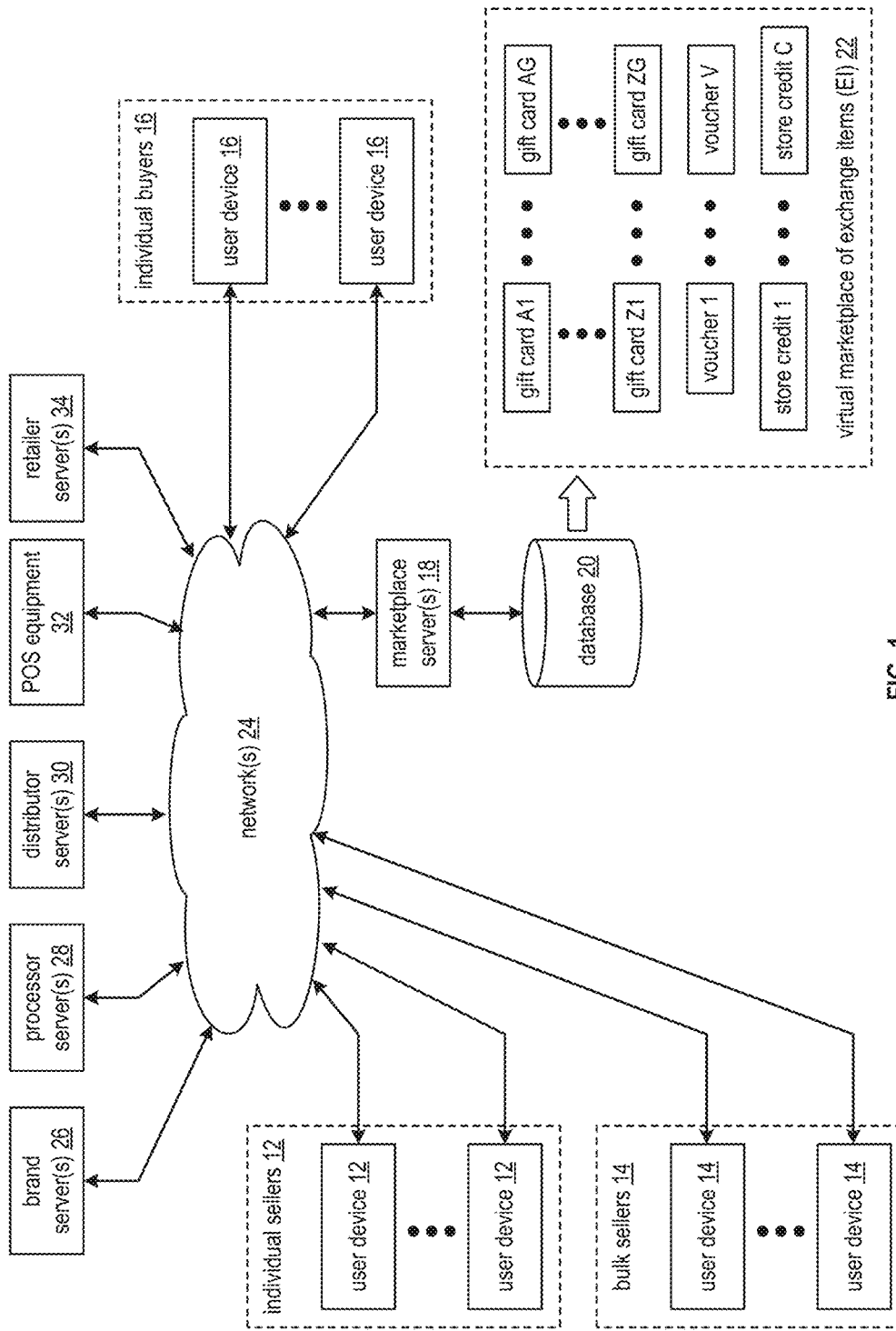
FIG. 1 is a schematic block diagram of an embodiment of an exchange item marketplace network in accordance with the present invention.
Figure 3:
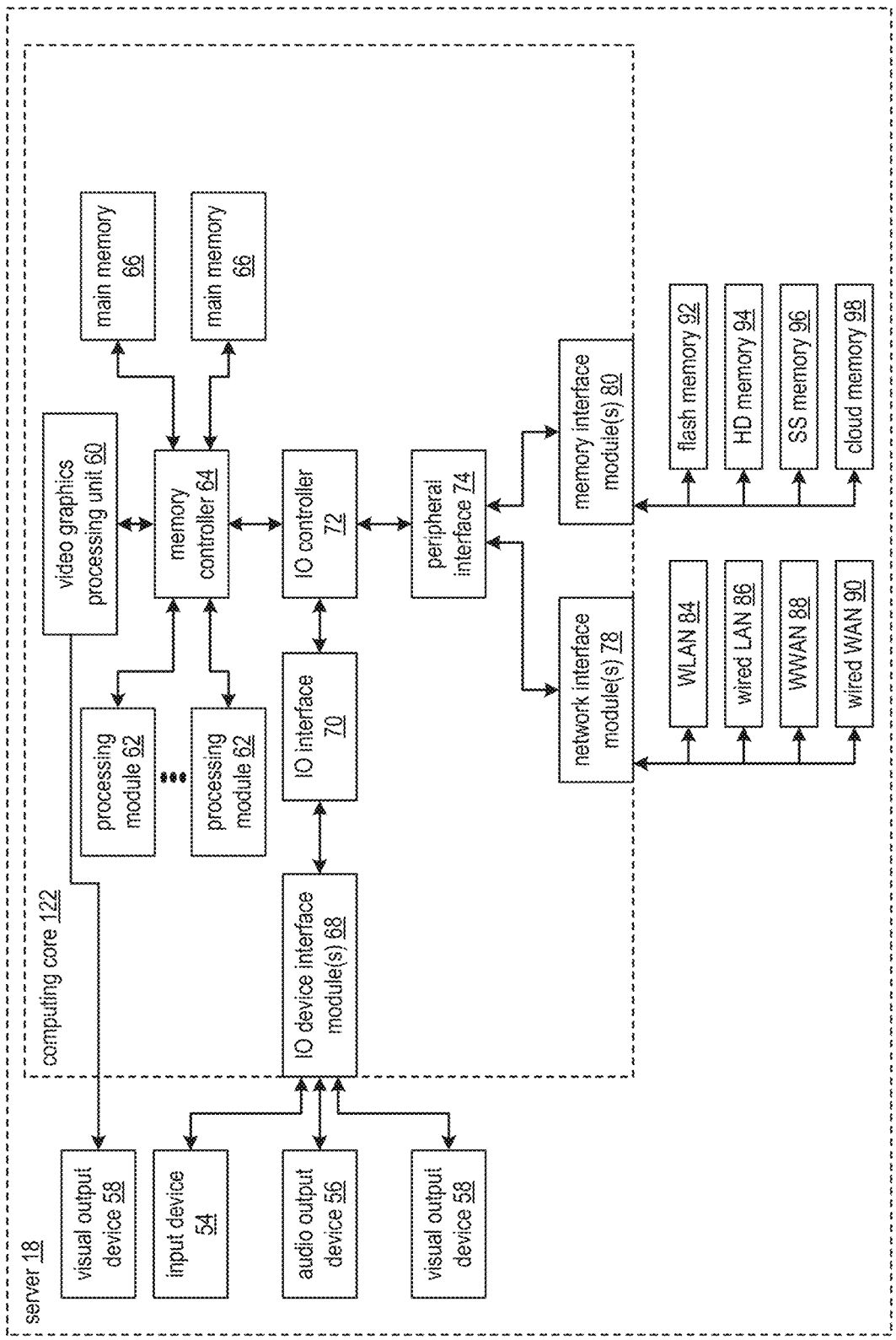
FIG. 3 is a schematic block diagram of an embodiment of a marketplace server of exchange item marketplace network in accordance with the present invention.

FIG. 1 is a schematic block diagram of an embodiment of an exchange item marketplace network 10 that includes user devices 12 of individual sellers, user devices 14 of bulk sellers, user devices 16 of individual buyers, one or more marketplace servers 18 (an example embodiment is shown in FIG. 3), one or more databases 20, one or more networks 24, one or more brand server(s) 26, one or more processor servers 28, one or more distributor servers 30, point of sale (POS) equipment 32, and one or more retailer servers 34. Hereafter, the exchange item marketplace network 10 may be interchangeably referred to as a marketplace network, a system, a communication system, a data communication system, and a communication network. The one or more marketplace servers 18 process, and the one or more databases 20 store a virtual marketplace of exchange items 22. Hereafter, the virtual marketplace of exchange items 22 may be interchangeably referred to as a virtual marketplace, a marketplace, and exchange items.

Each of the user devices 12, 14, and 16 is a computing device that includes a computing core. In general, a computing device is any electronic device that can communicate data, process data, and/or store data. A further generality of a computing device is that it includes a central processing unit (CPU), a memory system, user input/output interfaces, peripheral device interfaces, and an interconnecting bus structure.

As specific examples, each of the user devices 12-16 may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment that includes a computing core. An embodiment of a computing device 12-16 is further described below with reference to FIG. 2.

The exchange item marketplace network 10 supports the selling and purchasing of exchange items. An exchange item is a closed loop financial instrument and/or other digital goods. For example, a closed loop financial instrument is a gift card, a voucher, a store credit, and/or other brand company (or merchant) sponsored form of credit for a specific use (e.g., in a specific store, in a specific chain of stores, for a particular type of goods, etc.). A closed loop financial instrument is distinguished from an open loop financial instrument, such as a credit card.

A digital good is digital item that can legally be sold or resold by an individual. For example, the digital item may be an original digital book, an original digital photograph, an original video clip, a purchased video game, a purchased software application, a purchase video, a purchased music file, a purchased digital book, a purchased audio book, etc.

In support of selling an exchange item, the marketplace server 18 communicates with a user device of a seller (e.g., individual or bulk) to verify the user device (and the seller) and to ascertain information regarding the exchange item being offered for sale. For example, the marketplace server 18 verifies user information (e.g., the seller's name, account, personal identification number (PIN), a user identification number (ID), payment account information (e.g., a credit card number, checking or savings account information), seller's mailing address, etc.) and device information (e.g., an IP address, device serial number, a marketplace application ID, etc.) of the seller's computing device. Verification of the seller and corresponding computing device is discussed in greater detail with reference to FIG. 6A.

Upon receiving the information regarding the exchange item, which includes a brand name (e.g., a coffee franchise, a sporting good franchise, an electronics store, etc.), a serial number, a selling price, a remaining balance, restrictions of use, a bar code, and/or other pertinent information, the marketplace server 18 verifies it. When the seller and the information regarding the exchange item are verified, the marketplace server 18 posts it in the virtual marketplace of exchange items 22, which is stored in database 20.

The marketplace server 18 posts the exchange item in the virtual marketplace 22 by creating a digital representation of the exchange item. To do this, the server creates a digital image of the exchange item, determines the brand of the exchange item, and the information regarding the exchange item (e.g., a brief description, brand, selling price, balance, serial number, restrictions (if any), expiration date (if any), and/or any other pertinent information). In accordance with an organization protocol of the virtual marketplace, the digital representation of the exchange item is added. For instance, the organization protocol groups exchange items by types (e.g., restaurants, sporting goods, coffee shops, automotive goods, etc.), by brands (e.g., a sporting goods chain, a coffee shop chain, etc.), by sales price, by balance of the exchange item, by a savings value (e.g., a difference between the balance and the sales price), by expiration date, by date offered for sale, by special promotions, by seller, by restrictions, by a brief description (e.g., title of a video for resale), and/or any other organization scheme that lends itself to searching for particular items.

As such, for a particular exchange item offered for sale, its digital representation is added to the database 20 and will be displayed within a grouping per the organization protocol when a potential buyer or other user of the system 10 selects the grouping. In one example, if the exchange item is a gift card, a digital image of the gift card is displayed along with at least some of the related information (e.g., sales price, balance, etc.). If the gift card includes a logo of the branded company offering the gift card, the logo is often displayed in accordance with requirements of the branded company.

A potential buyer of an exchange item offered for sale accesses the system 10 using its user device 16. For example, the user device 16 logs into the system 10. If the user device 16 is associated with a buyer that does not have an account with the system 10, the buyer creates one through the user device 16 with the system. For buyers with an account, the marketplace server 18 verifies the buyer user device 16 before allowing it access to the virtual marketplace 22. The buyer verification process is discussed in greater detail with reference to FIG. 4.

Once the buyer is verified, the buyer computing device 16 is allowed access the virtual marketplace 22. The buyer computing device 16 uses searching criteria that are in accordance with the organization protocol to search the virtual marketplace 22 for exchange items of interest. The marketplace server 18 provides video-graphics data to the buyer computing device 16 in accordance with the searching. When the buyer computing device 16 finds exchange items of interest, it displays the video-graphics of the corresponding exchange items (e.g., a grouping of gift cards).

The buyer computing device 16 receives an input corresponding to a selection of one of the exchange items of interest for purchase. The buyer computing device 16 sends the selected exchange item to the marketplace server 18 for processing.

The marketplace server 18 processes the selected exchange item via a multiple step process. One step includes verifying that the buyer is authorized to purchase the exchange item (e.g., has the financial resources, is not limited by buying restrictions (e.g., dollar amount, quantity, type, etc.), is a legitimate buyer, etc.). Another step includes verifying integrity of the information of the selected exchange item (e.g., balance remaining is accurate, the offer to sell the exchange item has not been withdrawn, the exchange item is not currently being processed for sale to another buyer, the exchange item is not expired, the exchange item has not been voided by the branded company, etc.).

When the buyer is authorized and the information regarding the selected exchange item has been verified, another step includes removing the exchange item from the virtual marketplace 22. Another step includes processing payment for the selected exchange item. The multiple step buying process is further described with reference to FIG. 4.

Figure 2:
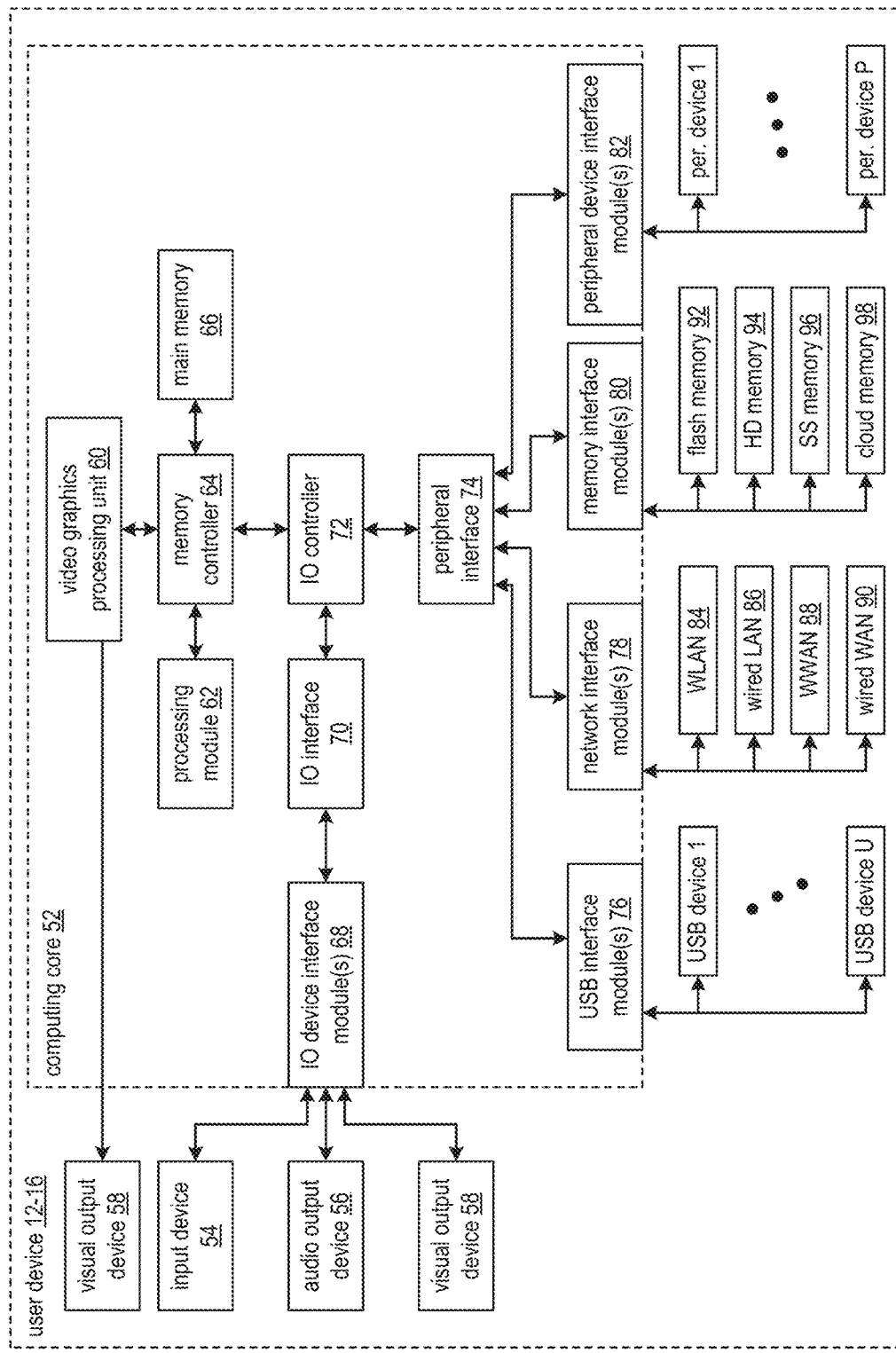
FIG. 2 is a schematic block diagram of an embodiment of user device of exchange item marketplace network in accordance with the present invention.

FIG. 2 is a schematic block diagram of an embodiment of computing device 12-16 of exchange item marketplace network 10. The computing device 12-16 includes a computing core 52, one or more input devices 54 (e.g., keypad, keyboard, touchscreen, voice to text, etc.), one or more audio output devices 56 (e.g., speaker(s), headphone jack, etc.), one or more visual output devices 58 (e.g., video graphics display, touchscreen, etc.), one or more universal serial bus (USB) devices, one or more networking devices (e.g., a wireless local area network (WLAN) device 84, a wired LAN device 86, a wireless wide area network (WWAN) device 88 (e.g., a cellular telephone transceiver, a wireless data network transceiver, etc.), and/or a wired WAN device 90), one or more memory devices (e.g., a flash memory device 92, one or more hard drives 94, one or more solid state (SS) memory devices 96, and/or cloud memory 98), and one or more peripheral devices.

The computing core 52 includes a video graphics processing unit 60, one or more processing modules 62, a memory controller 64, main memory 66 (e.g., RAM), one or more input/output (I/O) device interface module 68, an input/output (I/O) interface 70, an input/output (I/O) controller 72, a peripheral interface 74, one or more USB interface modules 76, one or more network interface modules 78, one or more memory interface modules 80, and/or one or more peripheral device interface modules 82. Each of the interface modules 68, 76, 78, 80, and 82 includes a combination of hardware (e.g., connectors, wiring, etc.) and operational instructions stored on memory (e.g., driver software) that is executed by the processing module 62 and/or a processing circuit within the interface module. Each of the interface modules couples to one or more components of the computing device 12-16. For example, one of the JO device interface modules 68 couples to an audio output device 56. As another example, one of the memory interface modules 80 couples to flash memory 92 and another one of the memory interface modules 80 couples to cloud memory 98 (e.g., an on-line storage system and/or on-line backup system).

FIG. 3 is a schematic block diagram of an embodiment of a marketplace server 18 of exchange item marketplace network 10. The server 18 includes a computing core 122, one or more input devices 54 (e.g., keypad, keyboard, touchscreen, voice to text, etc.), one or more audio output devices 56 (e.g., speaker(s), headphone jack, etc.), one or more visual output devices 58 (e.g., video graphics display, touchscreen, etc.), one or more networking devices (e.g., a wireless local area network (WLAN) device 84, a wired LAN device 86, a wireless wide area network (WWAN) device 88 (e.g., a cellular telephone transceiver, a wireless data network transceiver, etc.), and/or a wired WAN device 90), one or more memory devices (e.g., a flash memory device 92, one or more hard drives 94, one or more solid state (SS) memory devices 96, and/or cloud memory 98), and one or more peripheral devices. Note that the server 18 may include more or less devices than shown in this example embodiment of a server.

The computing core 122 includes a video graphics processing unit 60, a plurality of processing modules 62, a memory controller 64, a plurality of main memories 66 (e.g., RAM), one or more input/output (I/O) device interface module 68, an input/output (I/O) interface 70, an input/output (I/O) controller 72, a peripheral interface 74, one or more network interface modules 78, and/or one or more memory interface module 80.

Figure 4:
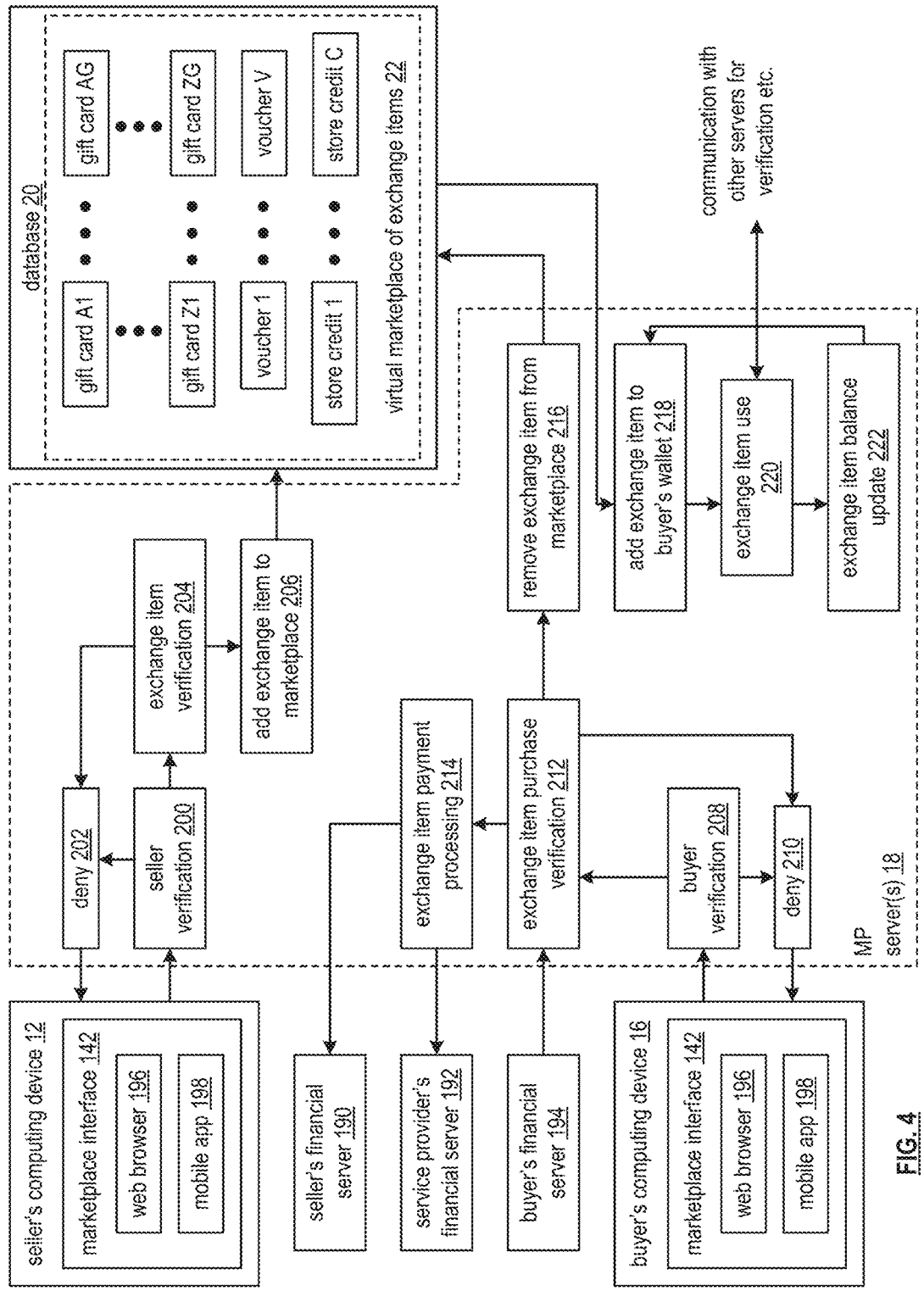
FIG. 4 is a schematic block diagram of another embodiment of an exchange item marketplace network in accordance with the present invention.

FIG. 4 is a schematic block diagram of another embodiment of an exchange item (EI) marketplace (MP) network that includes the seller's computing device 12, the buyer's computing device 16, a seller's financial server 190, a service provider's financial server 192, a buyer's financial server 194, the marketplace (MP) server(s) 18, and the database 20, which includes the virtual marketplace of exchange items 22. Each of the seller's computing device 12 and buyer's computing device 16 includes a marketplace interface 142, which includes a web browser 196 and a mobile application 198.

The MP server 18 performs function blocks that includes a seller verification 200, a deny 202, an exchange item verification 204, an add exchange item to marketplace 206, a buyer verification 208, a deny 210, an exchange item purchase verification 212, an exchange item payment processing 214, a remove exchange item from marketplace 216, an add exchange item to buyer's wallet 218, an exchange item use 220, and an exchange item balance update 222.

As an example of operation, the mobile application 198 of the seller's computing device 12 sends a request to sell an exchange item to the marketplace (MP) server(s) 18. The server 18 performs the seller verification 200 functional block to determine whether the seller and/or the seller's computing device 12 are a valid seller (e.g., device and/or seller are valid). When invalid, the server(s) 18 performs the deny 202 functional block to communicate a denial of the request to sell the exchange item to the seller's computing device 12.

When the seller is verified, the server performs the exchange item verification 204 functional block to determine whether the exchange item is valid (e.g., is a valid exchange item, perform a balance check with an associated entity, i.e., a retailer, etc.). When invalid, the server(s) perform the deny 202 functional block. When the exchange item is valid, the server(s) 18 perform the add exchange item to marketplace 206 functional block to add a digital representation of the exchange item to the virtual marketplace of exchange items 22 (e.g., creates a new entry for inventory within the virtual marketplace of exchange items 22).

When a buyer desires to purchase an exchange item, the mobile application 198 of the buyer's computing device 16 sends a request to buy a selected exchange item to the MP server(s) 18. The server(s) 18 perform the buyer verification 208 functional block to determine whether the buyer is valid (e.g., the user and/or buyer computing device are valid). When invalid, the server(s) 18 perform the deny 210 functional block to issue a denial of the purchase request to the buyer's computing device 16.

When the buyer is validated, the server(s) 18 perform the exchange item purchase verification 212 functional block to verify that the buyer, via the buyer's computing device, has sufficient means (e.g., money, credit, valid credit card, valid debit card, etc.) to pay for the selected exchange item. For example, the exchange item purchase verification 212 functional block enables the server 18 to receive buyer information from the buyer's financial server 194 verifying payment and/or verifying an ability to pay. When unable to purchase the selected exchange item, the server 18 performs the deny 210 functional block.

When the buyer is able to purchase the selected exchange item, the server 18 performs the exchange item payment processing 214 functional block to process payment for the selected exchange item. For example, the server 18 collects payment from the buyer's e-wallet, the buyer's computing device 16, or the buyer's financial server 194, issues a payment to the seller's e-wallet, to the seller's computing device, or to the seller's financial server 190, and issues a commission payment to the service provider's financial server 192.

After processing payment or concurrent with the processing of the payment, the server 18 performs the remove exchange item from marketplace 216 functional block to remove the selected exchange item from the virtual marketplace of exchange items 22. For example, the server 18 deletes an entry associated with the selected exchange item from the database 20.

The server 18 performs the add exchange item to the buyer's wallet 218 functional block to facilitate adding the exchange item to a buyer's e-wallet. For example, the server 18 updates a representation of the buyer's wallet within the database 20 to include a digital representation of the purchased exchange item and issues a message to the mobile application 198 to store a local copy of the digital representation within the buyer's computing device 16.

When the buyer desires to purchase something using an exchange item, the mobile application 198 communicates a utilization message to the server 18. The server 18 evokes the exchange item use 220 functional block to receive the utilization message and to facilitate communication with other servers for verification and transaction execution. For example, the server 18 forwards the utilization message to a retailer server associated with the exchange item to initiate execution of the transaction. Having successfully used the exchange item, the server 18, via the exchange item balance update 222 functional block, updates the buyer's wallet to indicate that the exchange item has been utilized and to update the balance remaining on the exchange item, when appropriate.

Figure 5:
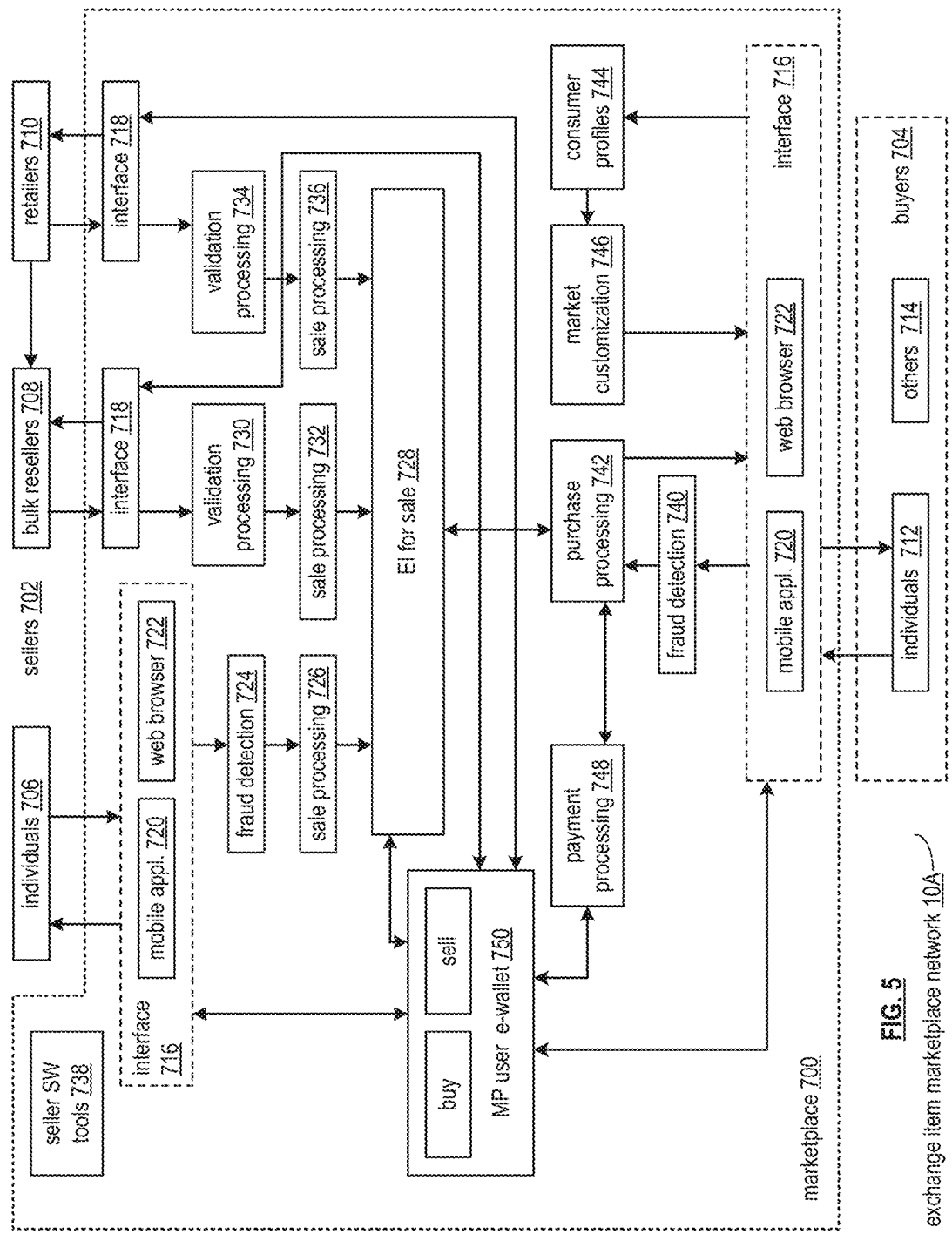
FIG. 5 is a schematic block diagram of another embodiment of an exchange item marketplace network in accordance with the present invention.

FIG. 5 is a schematic block diagram of another embodiment of an exchange item marketplace network 10A that includes a plurality of sellers 702, a plurality of buyers 704, and an on-line exchange item marketplace 700. Hereafter, the exchange item marketplace network 10A may be interchangeably referred to as a system, a communication system, and a communication network. The sellers 702 include individual sellers 706, bulk resellers 708, and retailers 710. The buyers 704 include individual buyers 712 and other types of buyers 714 (e.g., bulk buyers, resale buyers, etc.).

Each seller 702 and each buyer 704 corresponds to a computing device 12-16 that includes a marketplace interface module 716 that enables the computing device access to the marketplace 700 and to function therein. The marketplace interface module 716 includes a browser application 722, a mobile device application 720, and/or any type of application that enables access to the marketplace 700. The computing core 52 of the user device executes one or more of these applications. For instance, each of the applications includes operational instructions that are stored in memory (e.g., main memory, flash memory, SS memory, HD memory, and/or cloud memory) and executed by the processing module 62 of the computing core 52.

Alternatively, the marketplace interface module 716 includes a processing circuit and memory, wherein the memory stores and the processing circuit executes the operational instructions of the application. As yet another alternative, the processing circuit of the marketplace interface module 716 and the processing module 62 of the computing core 52 co-process the operational instructions of one or more of the applications. Interface 718 functions in a similar manner to provide bulk resellers 708 and/or retailers 710 access and function within the marketplace 700.

One or more marketplace servers 18 supports the on-line exchange item (EI) marketplace 700 by performing the functions of the corresponding functional blocks. The functional blocks include seller software tools 738, individual seller fraud detection 724, individual sale processing 726, bulk seller verification processing 730, bulk sale processing 732, retailer verification processing 734, retailer sale processing 736, displaying exchange items for sale 728 in the marketplace 700, payment processing 748, MP user e-wallet 750, buyer fraud detection 740, purchase processing 742, consumer profiles 744, and market customization 746. A functional block includes one or more of a standalone processing module that executes operational instructions to perform the corresponding functions of the block, a software algorithm executed by the computer core of the server to perform the corresponding functions of the block, and/or a combination thereof.

The server(s) 18 perform the marketplace user e-wallet functional block 750 to create and maintain an e-wallet for a user of the marketplace 700. The e-wallet is essentially a file for an individual user (e.g., a person, a legal entity, etc.) that stores information regarding exchange items bought, sold, and/or used by the user. For example, the e-wallet stores a digital representation of each purchased exchange item that has a value greater than zero. For example, a digital representation of a gift card is displayed in an asset section of the e-wallet while the gift card has a balance above zero and the gift card has not expired. When the balance is zero or the gift card expires, the digital representation is removed and the information regarding the gift card is stored in an archive section of the e-wallet.

The e-wallet is further capable of storing and tracking marketplace credit. For example, a user may purchase marketplace credit that is subsequently used to purchase an exchange item. In addition, a seller of an exchange item may be paid in marketplace credit that the seller may use to purchase an exchange item or cash out.

The e-wallet further functions to archive data regarding previous exchange item purchases and/or previous exchange item sales. The amount of data stored for each exchange item purchase or sale may be user defined or set based on a system default setting. For example, the data for a purchase includes one or more of a purchase price, the exchange item ID, a serial number, a brand name, a purchase date, the value of the exchange item, restrictions of the exchange item, and an expiration date. The data for a purchased exchange item may further include use information (e.g., when the exchanged item was used, the amount of value used, the date of use, the place of use, etc.) and/or remaining value information.

As another example, the data for a sale includes one or more of an asking selling price, a sold price, the exchange item ID, a serial number, a brand name, an offer for sale time stamp, a sold time stamp, the value of the exchange item, restrictions of the exchange item, and an expiration date. The data for a sold exchange item may further include price reduction information (e.g., the amount of the change, a change time stamp, etc.) and/or information regarding a withdrawal of an offer for sale.

The server(s) 18 perform the seller software tools functional block 738 to assist a seller (e.g., individual, bulk, or retailer) in setting a price for an exchange item. For example, the server(s) 18 record data regarding exchange items offered for sale, data regarding purchases of exchange items, and data regarding exchange items for which the offer for sale was withdrawn. From this data, the server(s) 18 determines predictive sales information. For example, the server(s) 18 determines for a particular type of exchange item (e.g., a gift card for a particular franchise) a correlation between the value of the exchange item and duration in the marketplace (e.g., a $250 gift card has an average duration of 1 day, a $100 gift card has an average duration of 12 hours, a $50 gift card has an average duration of 5 hours, etc.).

As another example of predictive sales information, the server(s) 18 determine a correlation between sales price and duration in the marketplace (e.g., a 5% discount has an average duration of 12.5 hours, a 3% discount has an average of 1 day, and a 10% discount has an average duration of 1.5 hours). As yet another example, the server(s) 18 determine a periodic sales volume for a particular exchange item (e.g., how many sold in an hour, six hours, a day, etc.). As yet another example, the server(s) 18 determine a current quantity of the particular exchange items for sale (e.g., how many are currently being offered for sale, at what sales price, the current average duration in the marketplace, etc.). The server(s) 18 may further analyze any type of data maintained by the system 10A to assist in the creation of predictive sales information.

In addition to creating the predictive sales information, the server(s) 18 generate a seller's profile, which includes information regarding the sales tendencies and/or preferences of a particular seller. For example, the seller's profile includes information regarding one or more of the types of exchange items offered for sale, information regarding if and when exchange item offers for sale are withdrawn, initial asking prices for exchange items offered for sale, actual sales price information and corresponding discounted percentage, frequency for which initial asking price is adjusted, average duration of exchange items in the marketplace, standard deviation of duration of exchange items in the marketplace, etc.

From the predictive sales information and the seller's profile, the server(s) 18 provide a suggested sales price for a particular exchange item. For example, the seller profile indicates that the seller has a tendency to offer a particular exchange item with a minimal discount and prefers that the exchange item remain in the marketplace for less than 6 hours. Further, the predictive sales information for the particular exchange item indicates that there is currently above normal quantity of the exchange item for sale, the current asking price has a greater discount than the seller's preference, and the current average duration in the marketplace is 7 hours, the server(s) 18 provides one or more recommendations and corresponding predictive outcomes (e.g., an initial asking price below the seller's profile to sell the exchange item within 6 hours, an initial asking price corresponding to the seller's profile to sell the exchange item within 11 hours, etc.). The server(s) 18 may further provide the predictive sales information to the seller's computing device.

The server(s) 18 perform the individual seller fraud detection functional block 724 to automate detection of a fraudulent seller and/or a fraudulent exchange item. This includes the seller verification and the exchange item verification as discussed in FIG. 4. The fraud detection further includes an automated process for resolving a potential fraud issue. For example, when a verification of seller falls between verified and not verified, the server(s) 18 evoke a process to render a definitive verification decision. As another example, when the verification of an exchange item falls between verified and not verified, the server(s) 18 evoke a process to render a definitive verification decision.

To extend the use of the marketplace to retailers or branded companies (i.e., the entity that initiates a gift card and ultimately accepts the gift card as payment), the server(s) 18 perform the retailer verification processing functional block 734 and the retailer sale processing functional block 736. The retailer verification processing functional block 734 includes one or more of setting up an account for a retailer to sell exchange items via the marketplace, verifying the retailer at least at the setup of the account and potentially for each transaction conducted via the marketplace, verifying the exchange items being offered for sale, and/or other verification mechanisms. As an example, a secure portal is established between the retailer seller and the marketplace server(s) 18 such that any communications via the secure portal is at least initially deemed a valid communication.

The retailer sale processing functional block 736 includes one or more of creating digital representations of the exchange items offered for sale, determining selling parameters and posting the digital representations and the parameters in the marketplace. The selling parameters include one or more of sales price, listing duration before changing price, restrictions, withdraw procedures, etc.

The server(s) 18 perform the buyer fraud detection functional block 740 to automate detection of a fraudulent buyer and/or fraudulent financial information used for purchasing. This includes the buyer verification and the purchase verification as discussed in FIG. 4. The fraud detection further includes an automated process for resolving a potential fraud issue. For example, when a verification of buyer falls between verified and not verified, the server(s) 18 evoke a process to render a definitive verification decision. As another example, when the verification of financial information falls between verified and not verified, the server(s) 18 evoke a process to render a definitive verification decision.

The server(s) 18 perform the payment processing functional block 748 to process payment through the user e-wallets of the seller and of the buyer. For instance, payment by the buyer is made from the buyer's e-wallet by debiting a credit card, a checking account, a savings account, a currency balance (e.g., money on account for purchases), and/or marketplace credit. Payment to the seller is made by crediting the seller's e-wallet with currency, marketplace credit, and/or some form of financial receipt. The mechanics of the payment process include the functionality described in FIG. 4.

The server(s) 18 perform the consumer profiles functional block 744 for a buyer. For the buyer, its consumer profile includes data regarding exchange item purchases of the buyer. The data includes one or more of the exchange items purchased, frequency of purchases, average purchase price, average value of purchased like exchange items (e.g., coffee shop gift cards), preferred discounts, etc. Note that this may be included in the buyer's e-wallet or maintained as a separate file.

The server(s) 18 perform the market customization functional block 746 to customize marketing of exchange items being offered for sale to particular buyers based on their buyer profiles. The market customization functional block 746 further includes determining a type and a quantity of exchange items a retailer should offer for sale and directing marketing efforts to a particular segment of buyers. In this manner, the system 10A efficiently and effectively couples exchange items for sale to buyers who typically buy such exchange items.

The server(s) 18 perform the individual sales processing function block 726, the bulk seller verification processing functional block 730, the bulk sale processing functional block 732, and the purchase processing functional block 742 as described with reference to one or more of FIGS. 1 and 4. The server(s) 18 also perform the displaying exchange items for sale functional block 728 to add/remove/edit an exchange item in the marketplace 700 as described with reference to one or more of FIGS. 1 and 4.

Figure 6:
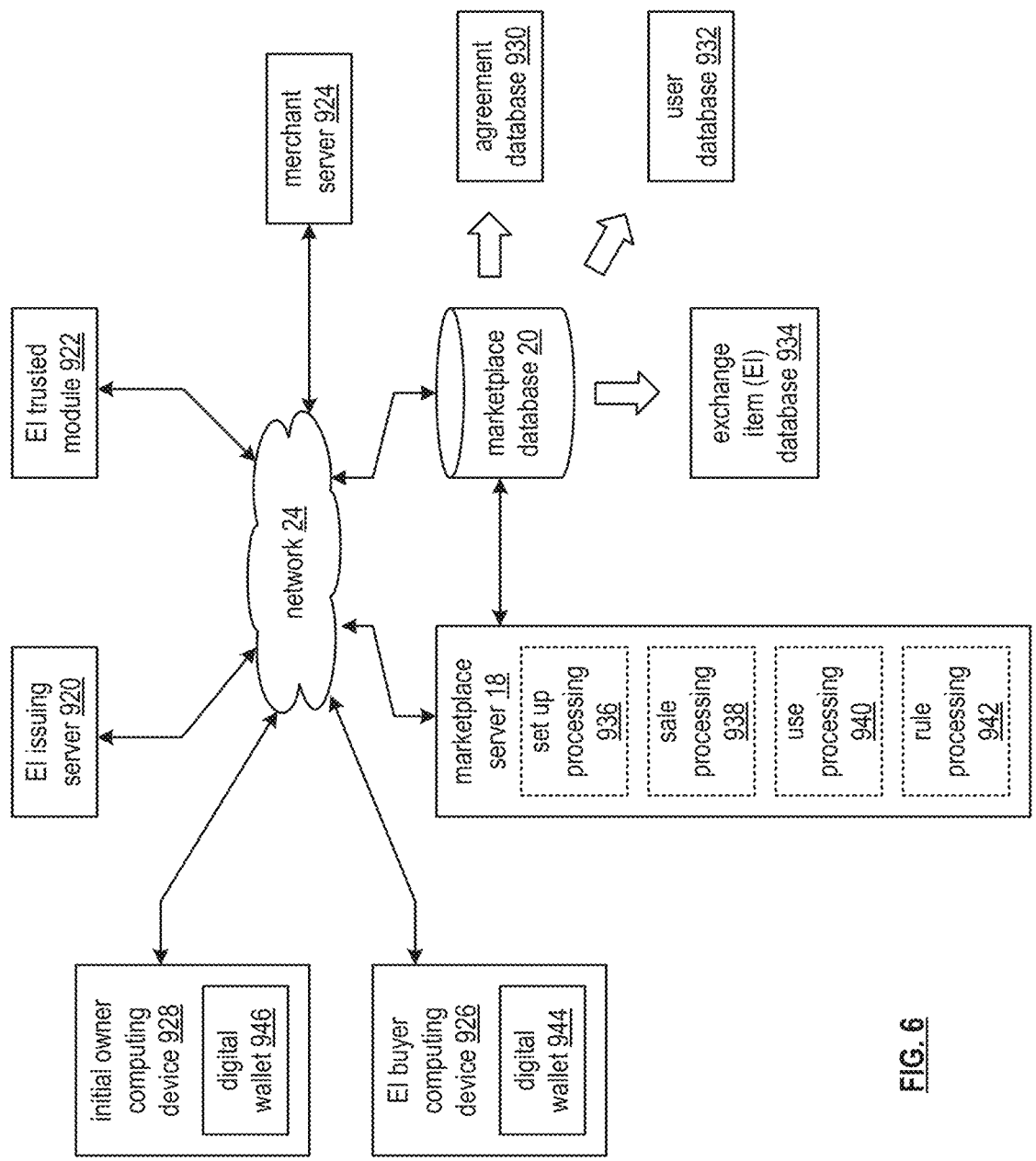
FIG. 6 is a schematic block diagram of another embodiment of an exchange item marketplace network in accordance with the present invention.

FIG. 6 is a schematic block diagram of another embodiment of an exchange item marketplace network that includes the network 24 of FIG. 1, an exchange item (EI) issuing server 920, and EI trusted module 922, a merchant server 924, the marketplace database 20 of FIG. 1, the marketplace server 18 and FIG. 1, an EI buyer computing device 926, and an initial owner computing device 928. The EI issuing server 920 may be implemented utilizing one or more of the brand server(s) 26 of FIG. 1, the processor server 28 of FIG. 1, and the distributor server 30 FIG. 1. The EI trusted module 922 may be implemented within one or more of the EI issuing server 920, the merchant server 924, and the marketplace server 18. The merchant server 924 may be implemented utilizing one or more of the retail server 34 of FIG. 1 and the point-of-sale equipment 32 of FIG. 1. The EI buyer computing device 926 may be implemented utilizing the buyer's computing device 16 of FIG. 4. The initial owner computing device 928 may be implemented utilizing the seller's computing device 12 of FIG. 4.

The marketplace database 20 includes a variety of databases, such as an agreement database 930, a user database 932, and an exchange item database 934. Each of the databases will be discussed in greater detail with reference to following figures. The marketplace server 18 includes a variety of processing capability, which may be implemented as a plurality of processing modules. In an embodiment, the marketplace server 18 includes a set of processing 936, a sale processing 938, a use processing 940, and a rule processing 942. Each of the processing modules will be discussed in greater detail with reference to following figures.

The EI buyer computing device 926 includes a digital wallet 944 and the initial owner computing device 928 includes another digital wallet 946. Each of the digital wallets 944-946 is utilized to store a variety of information associated with one or more exchange items, such as balance information, pricing information, history of sale, brand affiliation, rules, conditions, use options, owner information, and security information to ensure trust of the content of the digital wallet.

Figure 7A:
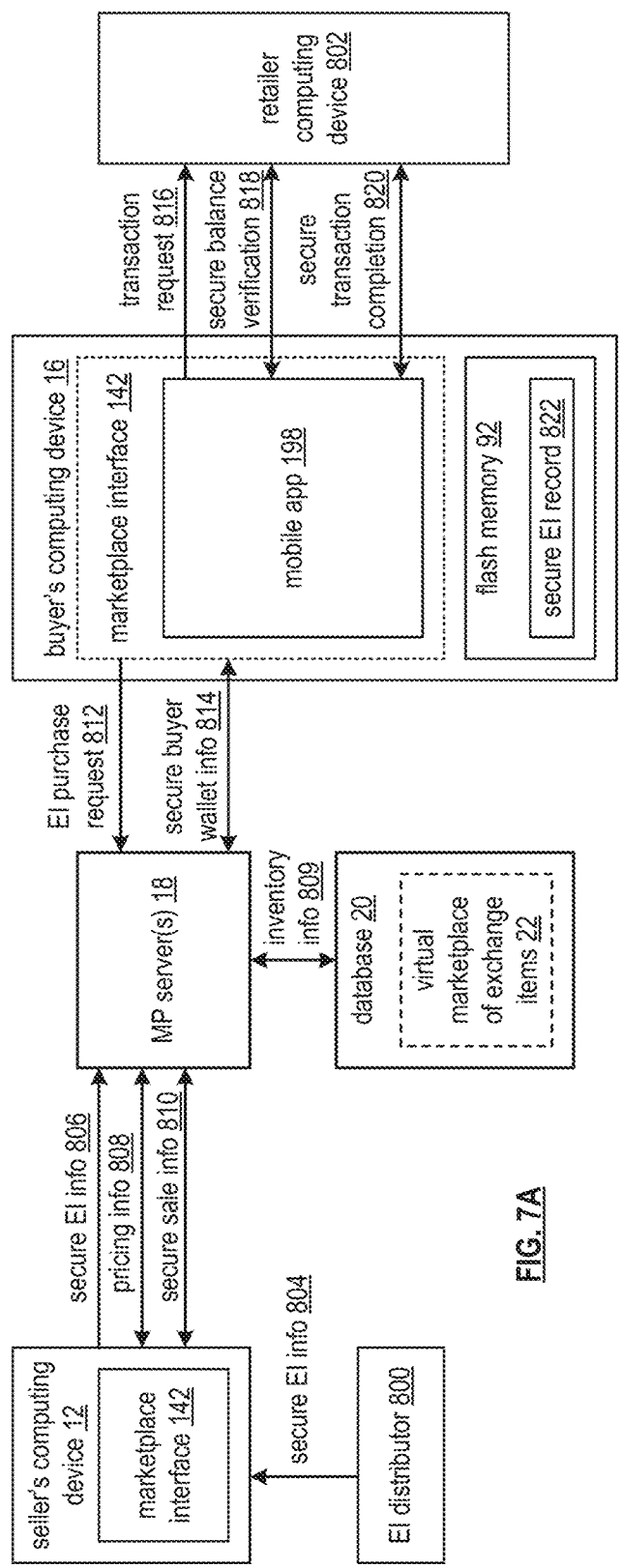
FIG. 7A is a schematic block diagram of another embodiment of an exchange item marketplace network in accordance with the present invention.

FIG. 7A is a schematic block diagram of another embodiment of an exchange item marketplace network that includes an EI distributor 800, the seller's computing device 12, the MP server(s) 18, the database 20, the buyer's computing device 16, and a retailer computing device 802. Alternatively, the MP server may include the database 20, where the virtual marketplace of exchange items 22 is stored as one or more transaction blockchains of a secure custody protocol. The EI distributor 800 may be implemented utilizing one or more of the distributor servers 30 of FIG. 1, the brand server(s) 26 of FIG. 1, the MP server 18, and a merchant server (e.g., any entity acting on behalf of a brand in a distributor role). The retailer computing device 802 may be implemented utilizing one or more of the point-of-sale (POS) equipment 32 of FIG. 1, a merchant server, and the retail servers 34 of FIG. 1. The seller's computing device 12 includes the marketplace interface 142. The buyer's computing device 16 includes the marketplace interface 142 and the flash memory 92 of FIG. 2. The marketplace interface 142 includes the mobile app 198 of FIG. 4. The exchange item marketplace network functions to generate a transactions blockchain while facilitating a plurality of exchange item transactions. For example, a transactions blockchain is maintained for each exchange item. As another example, the transactions blockchain is maintained for a plurality of exchange items. As yet another example, a single transactions blockchain is maintained for all the exchange items for the entire virtual marketplace of exchange items 22. The transactions blockchain includes a block associated with each transaction of the plurality of exchange item transactions. Each block includes a header section and a transaction section. A structure of the transactions blockchain is discussed in greater detail with reference to FIGS. 7B-C.

In an example of operation of the generating of the transactions blockchain, the EI distributor 800 generates a block 0 of the transactions blockchain to establish exchange item (EI) information when determining to offer an exchange item for sale. The determining may be based on one or more of receiving a purchase request from the seller's computing device 12, receiving a bulk EI creation request, receiving the EI information from one or more of a branded company server and a processor service, and interpreting a schedule. For example, the EI distributor 800 determines to establish the EI information when receiving, via the processor service, EI information for a plurality of exchange items from the branded company server. As another example, the EI distributor 800 determines to establish the EI information when receiving, via a retail point-of-sale device, a purchase request for the EI from the seller's computing device 12.

Having determined to offer the EI for sale, the EI distributor 800 obtains the EI information. The obtaining includes receiving the EI information from the processor service and generating the EI information. The generating the EI information includes obtaining one or more of available balance, serial number, personal identification number (PIN), brand, EI type, expiration date, pricing approach, purchase restrictions, a hash of one or more of the elements of the EI information (e.g., a secure hash of the EI type using a private key of a private/public key pair of the brand server(s) 26), and the public key of the private/public key pair of the brand server(s) 26. Having obtained the EI information, the EI distributor 800 generates the block 0 to include the EI information.

The generating of the block 0 includes populating the block zero with a representation of the EI information and establishing trust for the block 0 utilizing a trust approach. The trust approach includes at least one of a digital signature approach utilizing a private key of a private/public key pair of the EI distributor 800 and encrypting the EI information utilizing the private key of the private/public key pair of the EI distributor 800 to produce the representation of the EI information. For example, the EI distributor 800 encrypts the EI information and the public key of the EI distributor 800 utilizing the private key of the EI distributor 800 to produce the transaction section of the block 0 when utilizing the encryption trust approach. As another example, the EI distributor 800 utilizes the private key of the EI distributor 800 to generate a digital signature over the EI information and the public key of the EI distributor 800 to produce the transaction section of the block 0.

When receiving the EI purchase request from the seller's computing device 12, the EI distributor 800 generates a block 1 of the EI transactions chain to indicate that the seller's computing device 12 is purchasing the EI from the EI distributor 800, where the block 1 is chained to the block 0 in accordance with a trusted chaining approach, and where the block 1 is generated utilizing the trust approach (e.g., as utilized when generating the block 0). The trusted chaining approach is discussed in greater detail with reference to FIG. 7C.

The generating of the block 1 includes generating seller to distributor payment information 1 (e.g., purchase price of this transaction, a timestamp of this transaction, purchaser identifier, and the transaction portion of the previous block), and establishing trust for the block 1 utilizing the trust approach. For example, the EI distributor 800 obtains a public key of a private/public key pair of the seller's computing device 12, encrypts the seller to distributor payment information 1 and the public key of the seller's computing device 12 utilizing the private key of the EI distributor 800 to produce the transaction portion of the block 1 when utilizing the encryption trust approach. As another example, the EI distributor 800 utilizes the private key of the EI distributor 800 to generate a digital signature over the seller to distributor payment information 1 and the public key of the seller's computing device 12 to produce the transaction section of the block 1.

Having generated the block 1 chained to the block 0, the EI distributor 800 issues secure EI information 804 to the seller's computing device 12. The issuing includes generating the secure EI information 804 to include the EI transactions chain (e.g., blocks 0-1) and sending the secure EI information 804 to the seller's computing device 12.

When determining to offer the EI for sale via the virtual marketplace of exchange items 22, the seller's computing device 12 issues secure EI information 806 to the MP servers 18, where the secure EI information 806 includes one or more of the secure EI information 804 and a request to sell the EI via the virtual marketplace of exchange items 22. Having received the secure EI information 806, MP servers 18 communicates pricing information 808 with the seller's computing device 12, where the pricing information 808 includes one or more of a desired price, a desired price range, a recommended price range, a recommended price, and a confirmed price.

Having communicated the confirmed price, the seller's computing device 12 and the MP servers 18 communicates secure sale information 810. For example, the MP servers 18 updates inventory information 809 (e.g., brand, balance, price, expiration date, volume, pricing rules by brand, etc.) to provide a representation of the EI for storage in the database 20 based on the transaction portion of the block 1, the MP servers 18 provides a public key of a private/public key pair of the MP servers 18 to the seller's computing device 12, and the seller's computing device 12 generates a block 2 of the EI transactions chain to indicate that the MP servers 18 is representing the EI for purchase by a buyer's computing device 16, where the block 2 is chained to the block 1 in accordance with the trusted chaining approach, and where the block 2 is generated utilizing the trust approach (e.g., as utilized when generating the block 1).

The generating of the block 2 includes generating a marketplace to seller representation and/or payment information 2 (e.g., desired price, a timestamp of this transaction, purchaser identifier, and the transaction portion of the previous block), and establishing trust for the block 2 utilizing the trust approach. For example, the seller's computing device 12 obtains the public key of a private/public key pair of the MP servers 18, encrypts the seller representation and/or payment information 2 and the public key of the MP servers 18 utilizing the private key of the seller's computing device 12 to produce the transaction section of the block 2 when utilizing the encryption trust approach. As another example, the seller's computing device 12 utilizes the private key of the seller's computer device 12 to generate a digital signature over the seller representation and/or payment information 2 and the public key of the MP servers 18 to produce the transaction portion of the block 2.

Having generated the block 2 chained to the block 1, the seller's computing device 12 issues the secure sale information 810 to the MP servers 18. The issuing includes generating the secure sale information 810 to include the EI transactions chain (e.g., blocks 0-2) and sending the secure sale information 810 to the MP servers 18.

When determining to purchase the EI for sale via the virtual marketplace of exchange items 22, the buyer's computing device 16 issues an EI purchase request 812 to the MP servers 18, where the EI purchase request 812 includes a request to purchase the EI (e.g., buyer's computing device 16 identifier, public key of a private/public key pair of the buyer's computing device 16, a purchase price, etc.). Having received the EI purchase request 812, the MP servers 18 communicate secure buyer wallet information 814 with the buyer's computing device 16. For example, the buyer's computing device 16 sends payment instructions to the MP servers 18 (e.g., purchase price, payment account information), the MP servers 18 generates a block 3 of the EI transactions chain to indicate that the buyer's computing device 16 is purchasing the EI for the purchase price amount, where the block 3 is chained to the block 2 in accordance with the trusted chaining approach, and where the block 3 is generated utilizing the trust approach (e.g., as utilized when generating the block 2).

The generating of the block 3 includes generating buyer to marketplace payment information 3 (e.g., a confirmed purchase price, payment instructions, a timestamp of this transaction, purchaser identifier, and the transaction portion of the previous block), and establishing trust for the block 3 utilizing the trust approach. For example, the MP servers 18 obtains the public key of the private/public key pair of the buyer's computing device 16, encrypts the buyer to marketplace payment information 3 and the public key of the buyer's computing device 16 utilizing the private key of the MP servers 18 to produce the transaction section of the block 3 when utilizing the encryption trust approach. As another example, the MP servers 18 utilizes the private key of the MP servers 18 to generate a digital signature over the buyer to marketplace payment information 3 and the public key of the buyer's computing device 16 to produce the transaction section of the block 3.

Having generated the block 3 chained to the block 2, the MP servers 18 issues secure buyer wallet information 814 to the buyers computing device 16. The issuing includes generating the secure buyer wallet information 814 to include the EI transactions chain (e.g., blocks 0-3) and sending the secure buyer wallet information 814 to buyer's computing device 16, where the mobile app 198 facilitates storage of the transactions chain as a secure EI record 822 in the flash memory 92.

When the buyer's computing device 16 determines to utilize the EI for payment of a transaction with the retailer computing device 802, the buyer's computing device 16 sends a transaction request 816 to the retailer computing device 802, where the transaction request 816 includes one or more of a retail transaction identifier of the transaction with the retailer computing device 802, and payment instructions that identifies the EI.

Having received the transaction request 816, the retailer computing device 802 and the buyer's computing device 16 communicate secure balance verification 818. The communicating of the secure balance verification information 818 includes the buyer's computing device 16 sending one or more of the secure EI record 822 (e.g., blocks 0-3) to the retailer computing device 802 and the public key of the private/public key pair of the MP servers 18.

Having received the secure EI record 822, the retailer computing device 802 verifies that a sufficient balance level is associated with the secure EI record 822 to facilitate completion of the transaction request 816. For example, the retailer computing device 802 decrypts the secure transaction section of the secure EI record 822 utilizing the public key of the MP servers 18 to reveal the balance level and a public key of the buyer's computing device 16 for verification with a public key received directly from the buyer's computing device 16. The retailer computing device 802 indicates favorable verification when the revealed balance level is sufficient and the received public key from the buyer's computing device 16 compares favorably (e.g., substantially the same) to the revealed public key from the secure EI record 822. As another example, the retailer computing device 802 verifies a signature over the secure transaction portion of the secure EI record 822 utilizing the public key of the MP servers 18 to verify the balance level and to verify the public key of the buyer's computing device 16. The retailer computing device 802 indicates favorable verification when the verified balance level is sufficient and the public key from the buyer's computing device 16 is verified from the secure EI record 822. As yet another verification example, the retail computing device 802 decrypts the hash of the one or more of the elements of the EI information using the private key of the EI distributor 800 (e.g., or a brand server(s) 26) and indicates favorable verification when the decrypted hash is substantially the same as a calculated hash over the one or more of the elements of the EI information. As such, the EI can be considered a legitimately issued EI from the brand server(s) 26 (e.g., from the brand owner).

When the verifications are favorable, the retailer computing device 802 and the buyer's computing device 16 communicate secure transaction completion 820. For example, the buyer's computing device 16 sends payment instructions to the retailer computing device 802 (e.g., purchase price, EI information), the buyer's computing device 16 generates a block 4 of the EI transactions chain to indicate that the buyer's computing device 16 is utilizing the EI for the purchase price amount, where the block 4 is chained to the block 3 in accordance with the trusted chaining approach, and where the block 4 is generated utilizing the trust approach (e.g., as utilized when generating the block 3).

The generating of the block 4 includes generating buyer to retailer payment information 4 (e.g., a confirmed purchase price, payment instructions utilizing the EI, a timestamp of this transaction, purchaser identifier, and the transaction portion of the previous block), and establishing trust for the block 4 utilizing the trust approach. For example, the buyer's computing device 16 obtains the public key of the private/public key pair of the retailer computing device 802, encrypts the buyer to retailer payment information 4 and the public key of the retailer computing device 802 utilizing the private key of the buyer's computing device 16 to produce the transaction section of the block 4 when utilizing the encryption trust approach. As another example, the buyer's computing device 16 utilizes the private key of the buyer's computing device 16 to generate a digital signature over the buyer to retailer payment information 4 and the public key of the retailer computing device 802 to produce the transaction section of the block 4.

Having generated the block 4 chained to the block 3, the buyer's computing device 16 issues the secure transaction completion 820 to the retailer computing device 802. The issuing includes generating the secure transaction completion 820 to include the EI transactions chain (e.g., blocks 0-4) and sending the secure transaction completion 820 to the retailer computing device 802, where the mobile app 198 may facilitate storage of an updated transactions chain as an updated secure EI record 822 in the flash memory 92. Alternatively, or in addition to, each of the seller's computing device 12, the MP servers 18, and the buyer's computing device 16 may validate information within the EI transactions chain by validating the chaining of each block to a next block utilizing the trusted chaining approach and may further validate information with the EI transactions chain by validating integrity of the transaction section of one or more of the blocks utilizing the trust approach (e.g., verifying a signature, decrypting an encrypted transaction to reveal a public key for verification).

In another example of operation of the generating of the transactions blockchain, at least one of the EI distributor 800, the seller's computing device 12, and the MP server(s) 18, authenticates value of an exchange item to produce an authenticated value of the exchange item. The exchange item includes one of a closed loop financial instrument and a digital good. The authenticating of the value includes a variety of authenticating approaches.

A first authenticating approach includes the seller's computing device 12 authenticating the value of the exchange item via a communication with a brand server (e.g., issue an authentication request, interpret a received verification response to identify an available balance of the exchange item associated with the brand server), generating a secure exchange item package, and securely passing, by the seller's computing device 12 to the marketplace servers 18, control over the secure exchange item package such that the marketplace server 18 obtains the control over the secure exchange item package. The securely passing includes updating a transaction section of the secure exchange item package by including a public key of a recipient device (e.g., the marketplace servers 18) of the secure exchange item package and signing the secure exchange item package by a transferring device (e.g., the seller's computing device 12) of the secure exchange item package. The secure exchange item package includes a header section and a transaction section. The secure exchange item package is discussed in greater detail with reference to FIG. 7C. A second authenticating approach includes the MP server(s) 18 authenticating the value of the exchange item via the communication with the brand server, generating the secure exchange item package, and obtaining control over the secure exchange item package as a result of being an originator of the secure exchange item package.

With the authenticated value of the exchange item produced, the marketplace servers 18 obtains control over the secure exchange item package, where the secure exchange item package includes identity of the exchange item, identity of an authenticated owner of the exchange item, identity of the marketplace server, and the authenticated value (e.g., face value of the exchange item or remaining balance of the exchange item) of the exchange item and where only a device possessing control over the secure exchange item package may modify the secure exchange item package.

As an example of the obtaining of the control, the marketplace servers 18 receives from the seller's computing device 12, a request to sell the exchange item (e.g., receives the secure EI information 806). In response to valid processing of the request to sell (e.g., communicating pricing information 808), the seller's computing device 12 securely passes, to the marketplace servers 18, control over the secure exchange item package (e.g., communicates secure sale information 810). Having obtained control, the marketplace servers 18 lists a representation of the exchange item for sale by storing associated inventory information 809 in the database 20 to update the virtual marketplace of exchange items 22.

With the exchange item represented within the virtual marketplace of exchange items 22, the marketplace server 18 receives, from the buyer's computing device 16, a request to purchase the exchange item (e.g., the EI purchase request 812). Having received the request to purchase the exchange item, the marketplace servers 18, in response to valid processing of the request to purchase the exchange item (e.g., exchanging secure buyer wallet information 814), securely passes to the buyer computing device 16, control over the secure exchange item package (e.g., via the secure buyer wallet information 814). Having received the secure buyer wallet information 814, the mobile app 198 stores the secure buyer wallet information 814 as the secure EI record 822 in the flash memory 92.

For use of the exchange item (e.g., as initiated with the transaction request 816), the buyer computing device 16 securely passes, to the retailer computing device 802 (e.g., the merchant server), control over the secure exchange item package. The use may further include the retailer computing device 802 into verifying that the balance of the exchange item is sufficient for a purchase transaction by communicating secure balance verification 818 with the buyer's computing device 16.

With control over the secure exchange item package, the merchant server (e.g., the retailer computing device 802) executes use of the exchange item by updating the value of the exchange item to produce an updated value of the exchange item. For example, the retailer computing device 802 subtracts an amount of the purchase transaction (e.g., for goods provided by a retailer to a user of the buyer's computing device 16) from the value of the exchange item to produce the updated value of the exchange item.

Having generated the updated value of the exchange item, the retailer computing device 802 generates an updated secure exchange item package, where the updated secure exchange item package includes identity of the exchange item, identity of the merchant server, identity of the buyer computing device, and the updated value of the exchange item. Having generated the updated secure exchange item package, the merchant server (e.g., the retailer computing device 802) securely passes control over the updated secure exchange item package to the buyer's computing device 16 (e.g., by communicating the secure transaction completion 820).

Alternatively, or in addition to, for a second use of the exchange item, the buyer's computing device 16 securely passes, to a second merchant server, control over the updated secure exchange item package. The second merchant server executes the second use of the exchange item by updating the updated value of the exchange item to produce a second updated value of the exchange item, generating a second updated secure exchange item package, where the second updated secure exchange item package includes identity of the exchange item, identity of the second merchant server, identity of the buyer's computing device 16, and the second updated value of the exchange item, and securely passes, to the buyer's computing device 16, control over the second updated secure exchange item package.

Figure 7B:
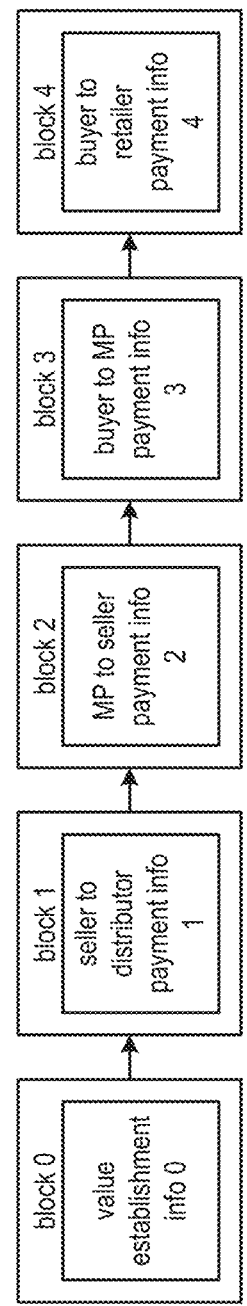
FIG. 7B is a schematic block diagram of a transactions blockchain in accordance with the present invention.

FIG. 7B is a schematic block diagram of a transactions blockchain where the transactions blockchain includes a plurality of blocks. The transactions blockchain represents an exchange item (EI) transaction chain when the plurality of blocks include exchange item transaction sections. Each block includes a header section and a transaction section. Each other portion links one block to other block in a sequential fashion. The linking is discussed in greater detail with reference to FIG. 7C. The transaction section includes EI transaction information associated with an EI transaction between two or more entities of an exchange item marketplace. For example, the block 0 includes valuable establishment 0 transaction information with regards to a genesis of a particular exchange item to be available to entities of the exchange item marketplace, the block 1 includes seller to distributor payment information 1 transaction information with regards to the seller's computing device 12 purchasing the EI from the EI distributor 800, the block 2 includes marketplace servers 18 to seller representation/payment information 2 transaction information with regards to the seller's computing device 12 offering the EI for sale utilizing the MP servers 18, the block 3 includes buyer to marketplace payment information 3 transaction information with regards to the buyer's computing device 16 purchasing the EI via the MP servers 18 from the seller's computing device 12, and the block 4 includes buyer to retailer payment information 4 transaction information with regards to the buyer's computing device 16 utilizing the EI to complete a desired purchase transaction with the retailer computing device 802.

Figure 7C:
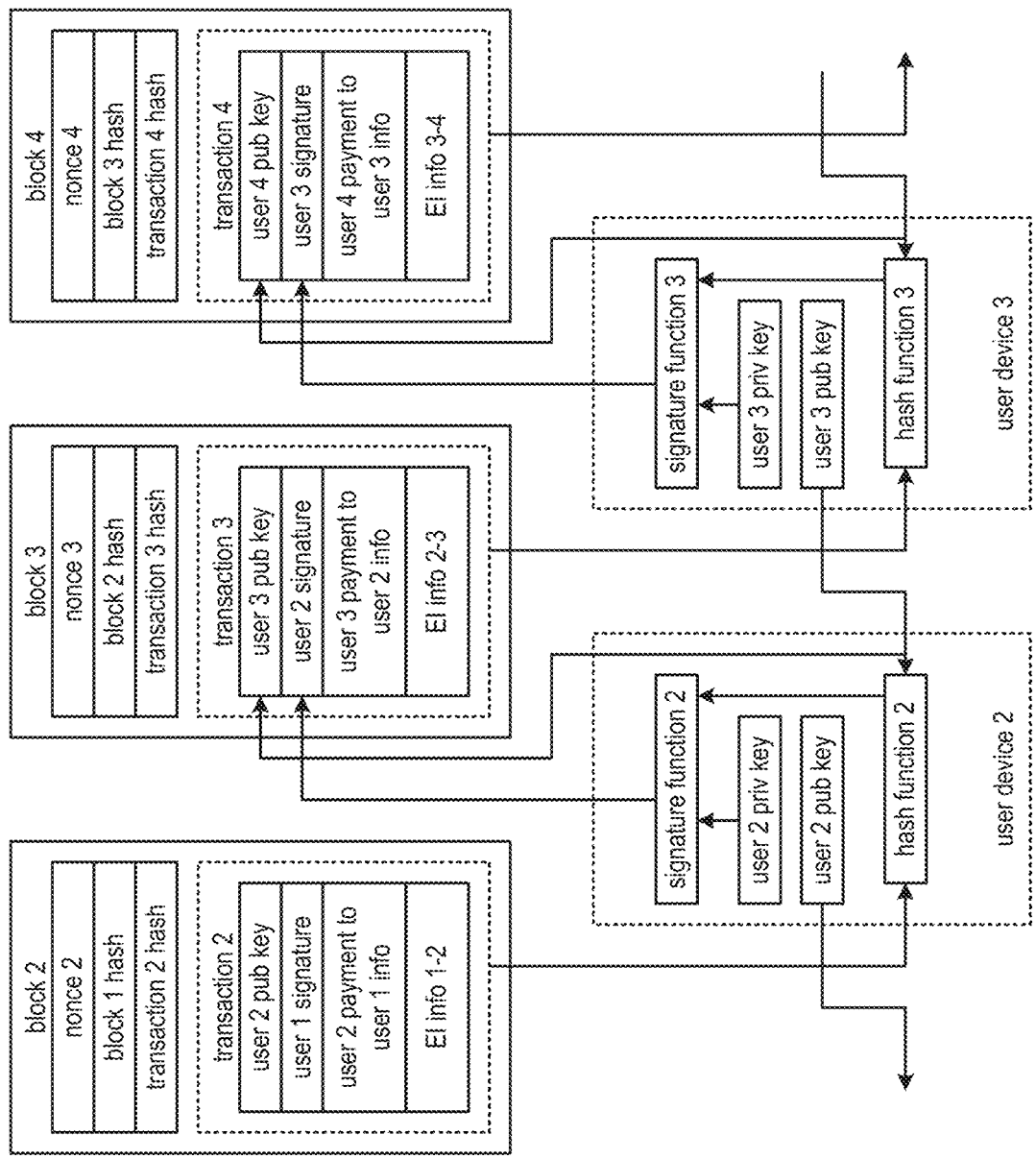
FIG. 7C is another schematic block diagram of a transactions blockchain in accordance with the present invention.

FIG. 7C is another schematic block diagram of a transactions blockchain. The transactions blockchain includes a plurality of blocks, where each block includes a secure exchange item package. Each secure exchange item package includes a header section and a transaction section. The header section includes one or more of a nonce, a hash of a preceding block of the secure exchange item package, where the preceding block was under control of a preceding device in a chain of control of the secure exchange item package, and a hash of a current block (e.g., a current transaction section) of the secure exchange item package, where the current block is under control of a current device in the chain of control of the secure exchange item package. The transaction section includes one or more of a public key of the current device, a signature of the preceding device, payment information regarding a change of control from the preceding device to the current device, and exchange item information that includes at least some of the identity of the exchange item, a brand of the exchange item, time restrictions of the exchange item, a digital image of the exchange item, the authenticated value, and use restrictions of the exchange item.

FIG. 7C further includes user devices 2-3 (e.g., the seller's computing device 12, the MP servers 18, the buyer's computing device 16, the retailer computing device 802) to facilitate illustration of generation of the secure exchange item package. Each user device includes a hash function, a signature function, and storage for a public/private key pair generated by the user device.

An example of operation of the generating of the secure exchange item package, when the user device 2 has control of the secure exchange item package and is passing control of the secure exchange item package to the user device 3 (e.g., the user device 3 is transacting an exchange with the user device 2), the user device 2 obtains the user 3 public key from the user device 3, performs a hash function 2 over the user 3 public key and the transaction 2 to produce a hashing resultant (e.g., preceding transaction to user device 2) and performs a signature function 2 over the hashing resultant utilizing a user 2 private key to produce a user 2 signature. Having produced the user 2 signature, the user device 2 generates the transaction 3 to include the user 3 public key, the user 2 signature, user 3 payment to the user 2 information, and EI information 2-3. The user 3 payment to the user 2 information includes payment instructions from user 3 to user 2. The EI information 2-3 includes an updated balance of the exchange item (e.g., after the transaction between the user device 3 and the user device 2), a serial number of the exchange item, an expiration date of the exchange item, a type of the exchange item, a brand identifier, an image, a personal identification number, and utilization rules for the exchange item.

Having produced the transaction 3 section of the block 3 (e.g., a secure exchange item package 3), a processing module (e.g., of the user device 2, of the user device 3, of a transaction mining server, of the marketplace server 18) generates the header section by performing a hashing function over the transaction section 3 to produce a transaction 3 hash, performing the hashing function over the preceding secure exchange item package (e.g., block 2) to produce a block 2 hash. The performing of the hashing function may include generating a nonce such that when performing the hashing function to include the nonce of the header section, a desired characteristic of the resulting hash is achieved (e.g., a desired number of preceding zeros is produced in the resulting hash).

Having produced the secure exchange item package 3, the user device 2 sends the secure exchange item package 3 to the user device 3. Having received the secure exchange item package 3, the user device 3 validates the received secure exchange item package 3. The validating includes one or more of verifying the user 2 signature over the preceding transaction section (e.g., transaction 2) and the actual user 3 public key utilizing the user 2 public key (e.g., a re-created signature function result compares favorably to user 2 signature) and verifying that an extracted user 3 public key of the transaction 3 compares favorably to the user 3 public key held by the user device 3. The user device 3 considers the received secure exchange item package 3 validated when the verifications are favorable (e.g., the available balance of the exchange item is trusted).

Figure 7D:
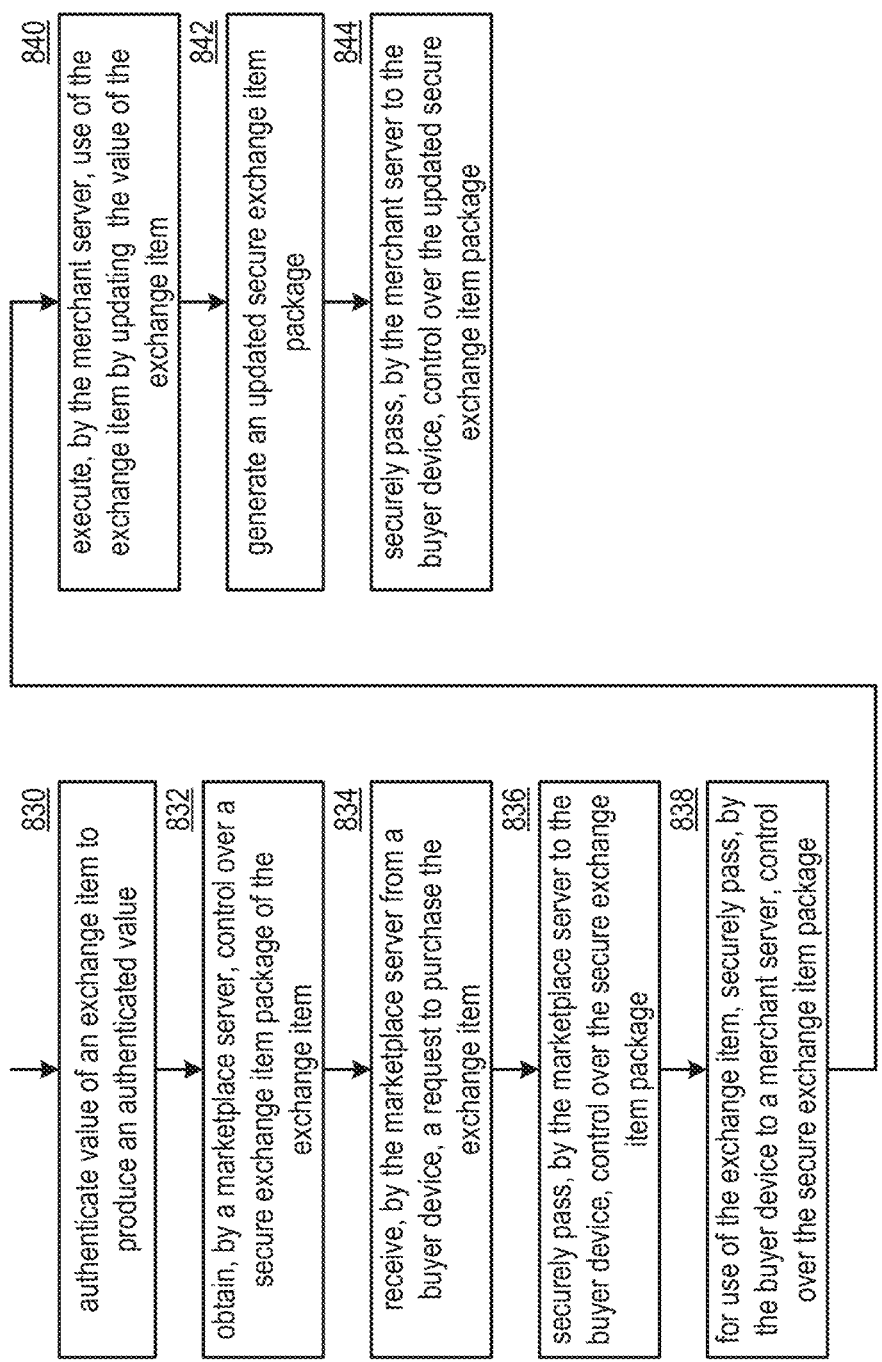
FIG. 7D is a logic diagram of an embodiment of a method for generating a transactions blockchain in accordance with the present invention.

FIG. 7D is a logic diagram of an embodiment of a method for generating a transactions blockchain. In particular, a method is presented for use in conjunction with one or more functions and features described in conjunction with FIGS. 1-6, 7A-C, and also FIG. 7D. The method includes step 830 where a processing module of a computing device of one or more computing devices of an exchange item marketplace network authenticates value of an exchange item to produce an authenticated value of the exchange item, where the exchange item includes one of a closed loop financial instrument and a digital good.

As an example of the authenticating the value of the exchange item, a seller device authenticates the value of the exchange item via a communication with a brand server, generates a secure exchange item package, and securely passes, to the marketplace server, control over the secure exchange item package such that the marketplace server obtains the control over the secure exchange item package. The securely passing includes updating a transaction section of the secure exchange item package by including a public key of a recipient device of the secure exchange item package and signing the secure exchange item package by a transferring device of the secure exchange item package. The secure exchange item package includes a header section and a transaction section. As another example of the authenticating the value of the exchange item, the marketplace server authenticates the value of the exchange item via a communication with the brand server, generates the secure exchange item package, and obtains control over the secure exchange item package as a result of being an originator of the secure exchange item package.

The method continues at step 832 where the marketplace server obtains control over the secure exchange item package, where the secure exchange item package includes identity of the exchange item, identity of an authenticated owner of the exchange item, identity of the marketplace server, and the authenticated value (e.g., face value of the exchange item and/or a remaining balance of the exchange item) of the exchange item and where only a device possessing control over the secure exchange item package may modify the secure exchange item package. As an example of the obtaining of the control, the marketplace server receives, from the seller device, a request to sell the exchange item and in response to valid processing of the request to sell, the seller device securely passes, to the marketplace server, control over the secure exchange item package.

The method continues at step 834 where the marketplace server receives, from a buyer device, a request to purchase the exchange item. In response to valid processing of the request to purchase the exchange item, the method continues at step 836 where the marketplace server securely passes, to the buyer device, control over the secure exchange item package. For use of the exchange item, the method continues at step 838 where the buyer device securely passes, to a merchant server, control over the secure exchange item package.

The method continues at step 840 where the margin server executes use of the exchange item by updating the value of the exchange item to produce an updated value of the exchange item (e.g., deducting a purchase price of a purchase transaction from the value of the exchange item to produce the updated value the exchange item). The method continues at step 842 where the merchant server generates an updated secure exchange item package, where the updated secure exchange item package includes identity of the exchange item, identity of the merchant server, identity of the buyer device, and the updated value of the exchange item. The method continues at step 844 where the merchant server securely passes, to the buyer device, control over the updated secure exchange item package.

Alternatively, or in addition to, for a second use of the exchange item, the buyer device securely passes, to a second merchant server, control over the updated secure exchange item package. The second merchant server executes the second use of the exchange item by updating the updated value of the exchange item to produce a second updated value of the exchange item, generates a second updated secure exchange item package, where the second updated secure exchange item package includes identity of the exchange item, identity of the second merchant server, identity of the buyer device, and the second updated value of the exchange item, and securely passing, to the buyer device, control over the second updated secure exchange item package.

The method described above in conjunction with one or more of the processing module, the seller device, the marketplace server, the buyer device, the merchant server, the second merchant server, can alternatively be performed by other modules of the exchange item marketplace network or by other devices. In addition, at least one memory section (e.g., a non-transitory computer readable storage medium, a computer readable memory) that stores operational instructions can, when executed by one or more processing modules of one or more computing devices of the exchange item marketplace network, cause the one or more computing devices to perform any or all of the method steps described above.

Figure 7E:
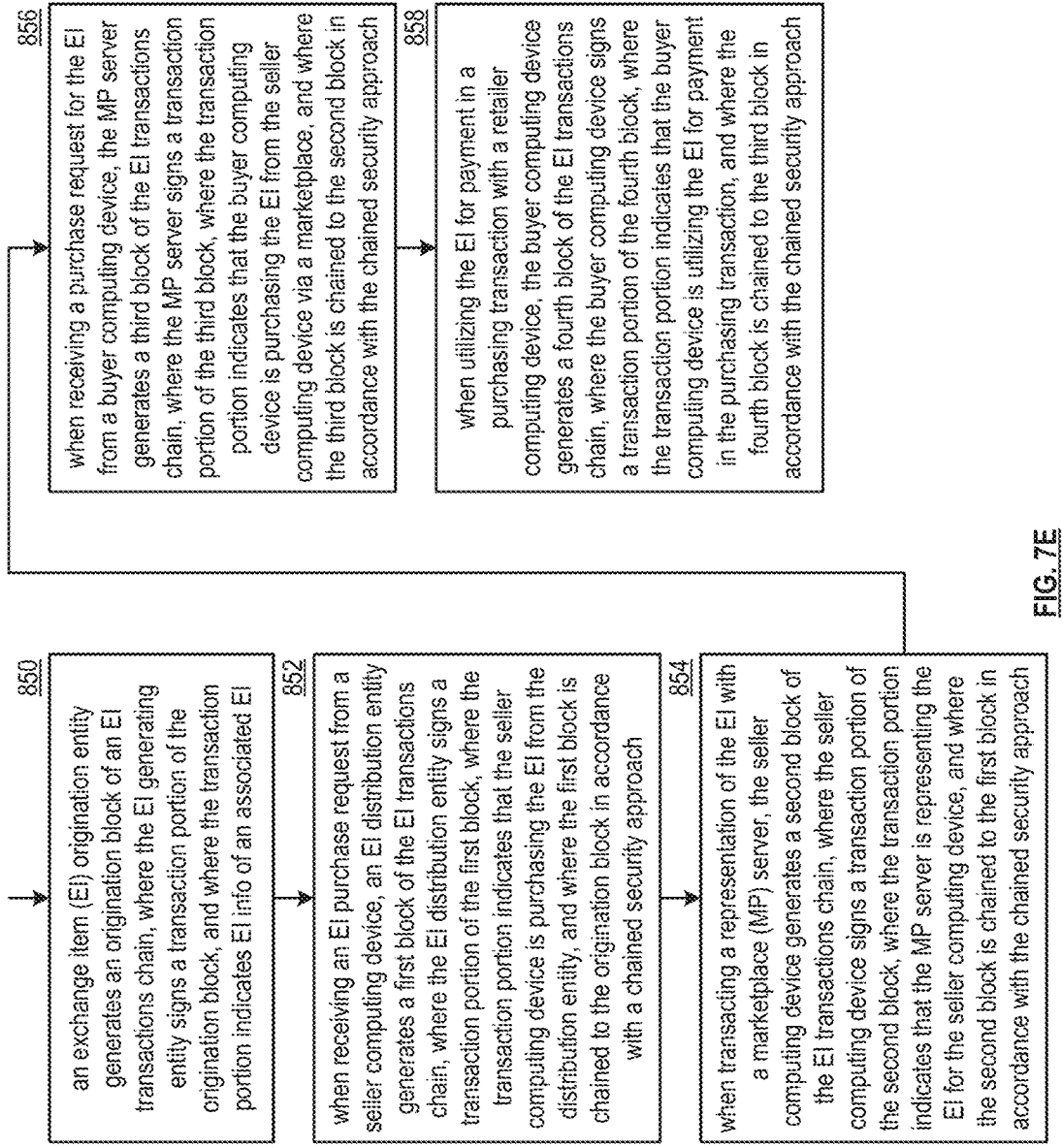
FIG. 7E is a logic diagram of another embodiment of a method for generating a transactions blockchain in accordance with the present invention.

FIG. 7E is a logic diagram of another embodiment of a method for generating a transactions blockchain. In particular, a method is presented for use in conjunction with one or more functions and features described in conjunction with FIGS. 1-6, 7A-D, and also FIG. 7E. The method includes step 850 where a processing module of a computing device (e.g., of an exchange item origination entity) of one or more computing devices of an exchange item marketplace network generates an origination block of an EI transaction chain, where the EI origination entity signs a transaction portion of the origination block, and where the transaction portion indicates EI information of an associated EI. For example, the origination entity generates value establishment information in accordance with a trust approach (e.g., self-signing over the value establishment information to produce the transaction portion, signing the value establishment information, that includes a public key of a private/public key pair of the EI origination entity, utilizing the private key to produce the transaction portion).

When receiving an EI purchase request from a seller computing device, the method continues at step 852 where a processing module of an EI distribution entity generates a first block of the EI transactions chain, where the EI distribution entity signs the transaction portion of the first block, where the transaction portion indicates that the seller computing device is purchasing the EI from the distribution entity, and where the first block is chained to the origination block in accordance with a chained security approach (e.g., hash of transaction portion, hash of a previous block). The EI distribution entity may be implemented utilizing the EI origination entity. For example, the EI distribution entity signs the transaction portion utilizing a private key of a private/public key pair of the seller computing device to produce the transaction portion of the first block.

When transacting a representation of the EI with a marketplace server, the method continues at step 854 where the seller computing device generates a second block of the EI transactions chain, where the seller computing device signs a transaction portion of the second block, where the transaction portion indicates that the MP server is representing the EI for the seller computing device, and where the second block is chained to the first block in accordance with the chained security approach. For example, the MP server receives secured EI information from the seller computing device (e.g., an offer for sale), provides pricing information to the seller computing device, receives a confirmed price from the seller computing device, issues secure sale information to the seller computing device, and updates inventory information within a virtual exchange item marketplace, where the secure sale information includes the second block of the EI transactions chain and a public key of the MP server.

When receiving a purchase request for the EI from a buyer computing device, the method continues at step 856 where the MP server generates a third block of the EI transactions chain, where the MP server signs a transaction portion of the third block, where the transaction portion indicates that the buyer computing device is purchasing the EI from the seller computing device via the marketplace, and where the third block is chained to the second block in accordance with the chained security approach. For example, the buyer computing device issues an EI purchase request to the MP server based on received inventory information from the MP server, the MP server generates secure buyer wallet information, the buyer computing device stores a security EI record, where the secure buyer wallet information includes the third block of the EI transactions chain and the secure EI record includes the EI transactions chain. For instance, the MP server signs a public key of the buyer computing device and the transaction portion utilizing a private key of a private/public key pair of the MP server to produce the transaction portion of the third block.

When utilizing the EI for payment in a purchasing transaction with a retailer computing device, the method continues at step 858 where the buyer computing device generates a fourth block of the EI transactions chain, where the buyer computing device signs a transaction portion of the fourth block, where the transaction portion indicates that the buyer computing device is utilizing the EI for payment in the purchasing transaction, and where the fourth block is chained to the third block in accordance with the chained security approach. For example, the buyer computing device issues a transaction request to the retailer computing device, the retailer computing device exchanges secure balance information with the buyer computing device (e.g., verifies the trust of the EI transactions chain, where the EI transactions chain indicates an available balance of the EI verifying that an available balance is sufficient), the retailer computing device issues secure transaction completion information to the buyer computing device, where the secure transaction completion information includes the fourth block of the EI transactions chain. The buyer computing device signs the public key of the retailer computing device and the transaction portion to produce a transaction portion of the fourth block. Alternatively, or in addition to, each entity of the plurality of transactions may verify the EI transactions chain by verifying a stored public key matches to recovered public keys when validating signatures over associated blocks.

The method described above in conjunction with the exchange item origination entity, the seller computing device, the buyer computing device, and the retailer computing device can alternatively be performed by other modules of the exchange item marketplace network or by other devices. In addition, at least one memory section (e.g., a non-transitory computer readable storage medium, a computer readable memory) that stores operational instructions can, when executed by one or more processing modules of one or more computing devices of the exchange item marketplace network, cause the one or more computing devices to perform any or all of the method steps described above.

Figure 8A:
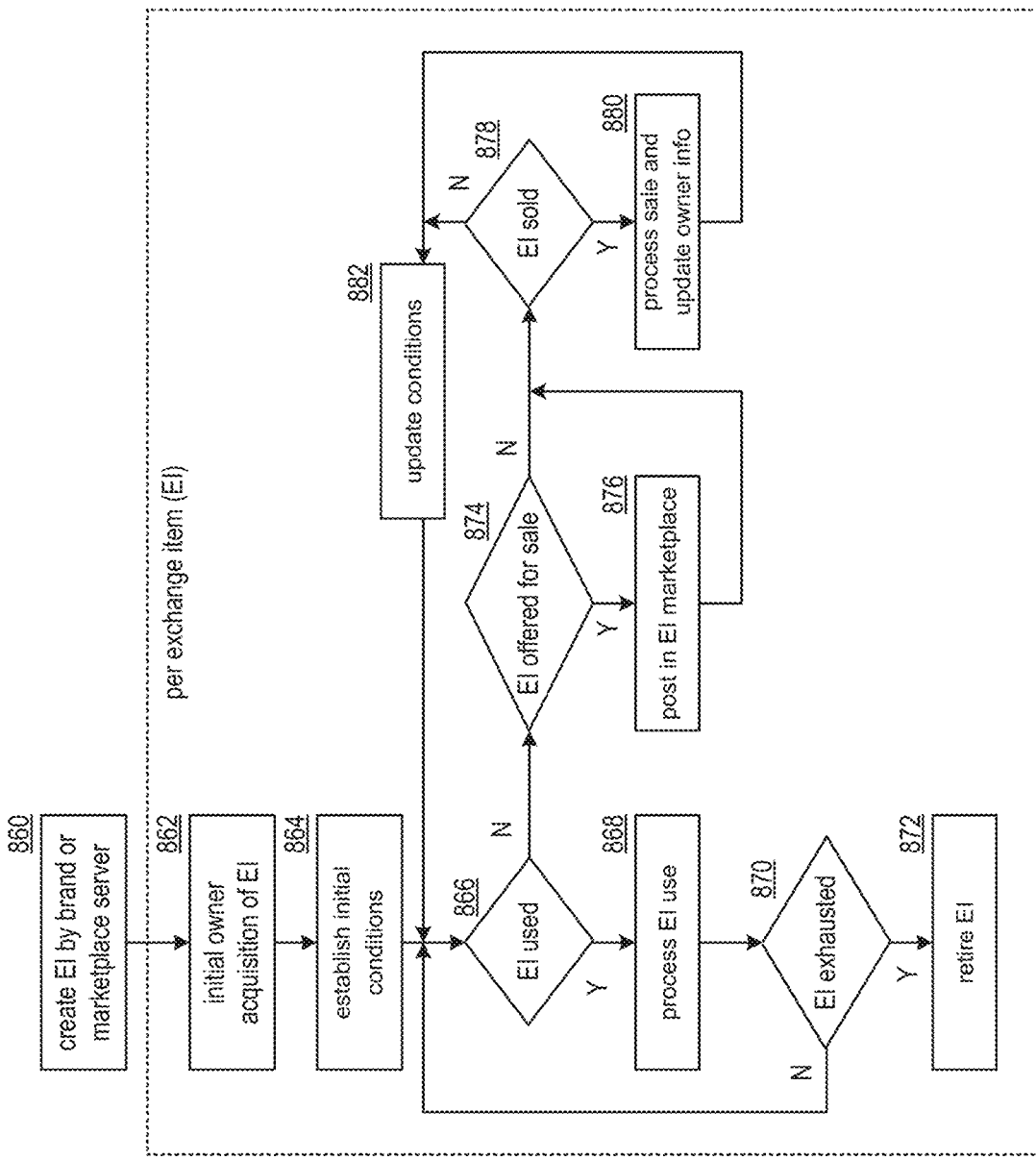
FIG. 8A is a logic diagram of an embodiment of a method for utilizing an exchange item in an exchange item marketplace network in accordance with the present invention.

FIG. 8A is a logic diagram of an embodiment of a method for utilizing an exchange item in an exchange item marketplace network. The method includes step 860 where a processing module (e.g., of a brand server, of a marketplace server) creates one or more exchange items to be offered for sale through the exchange item marketplace network. The method continues at step 862 where an initial owner acquires at least one of the EIs. The method continues at step 864 where a processing module of the exchange item marketplace network establishes initial conditions. Conditions includes types of conditions and values for the types of conditions. For example, a weather condition is associated with a value of a current temperature. As another example, a sports team score is associated with a particular game outcome. Other examples of condition types include stock prices, world events, purchase history of users associated with the exchange item marketplace, pricing history associated with exchange items, a physical location, a customer name, a merchant name, a brand-name, a date, a time, etc.

The establishing of the conditions includes utilizing the predetermination, interpreting the lookup, interpreting a query response, receiving the conditions, identifying the conditions based on or more of identification of the initial owner, identification of the brand of the EI, an EI type indicator, and EI serial number, and an EI utilization rule, etc. For example, the marketplace server performs a lookup based on a serial number of the exchange item to establish the initial conditions.

The method continues at step 866 where the processing module determines whether the EI has been used (e.g., redeemed, utilized for making a purchase, bartered, etc.). The determining includes interpreting a status associated with the EI of an exchange item database, interpreting a received a use message, receiving purchase transaction information, etc. the method branches to step 874 when the processing module determines that the EI has not been used. The method continues to step 868 when the processing module determines that the EI has been used.

When the EI has been used, the method continues at step 868 where the processing module processes the EI use. The processing includes one or more of facilitating completion of a purchase transaction, facilitating payment distribution, and updating the exchange item database to indicate the use. The method continues at step 870 where the processing module determines whether the EI is exhausted (e.g., no value left). The determining includes comparing a balance value associated with the EI to a minimum threshold level (e.g., zero dollars). For example, the processing module indicates that the EI has been exhausted when the balance value is zero. The method looks back to step 866 when the EI is not exhausted. The method continues to step 872 when the EI is exhausted where the EI is retired. Alternatively, and in accordance with a rule associated with exchange item, the processing module maintains the zero balance exchange item without retiring the exchange item (e.g., to keep open an opportunity to refresh the exchange item). The retiring includes the processing module updating the exchange item database to indicate that the EI has been exhausted and retired from use.

When the EI has not been utilized, the method continues at step 874 with a processing module determines whether the EI is to be offered for sale. The determining includes receiving a request to offer the EI for sale, interpreting a rule with regards to sale, interpreting a status associated with the EI, and receiving a purchase request for the EI. The method branches to step 878 when the EI is not to be offered for sale. The method continues to step 876 when the EI is to be offered for sale where the processing module posts the EI in the marketplace. For example, the processing module updates the exchange item database to indicate that the EI is for sale.

The mother continues at step 878 where the processing module determines whether the EI has been sold. The determining includes one or more of receiving purchase transaction information, interpreting a request for purchase of the EI, and interpreting a status associated with the EI in the exchange item database. The method branches to step 882 when the EI has not been sold. The method continues to step 880 when the EI has been sold where the processing module processes the sale and updates information. For example, the processing module updates the exchange item database to indicate that the EI has been sold, the purchase amount, and identification of the (new) owner.

The method continues at step 882 where the processing module updates the conditions. For example, the processing module obtains updated date and time information, sports scores, stock market information, world events information, and weather information. With the conditions updated, utilization and sale of other exchange items may be affected as different use rules associated with the different exchange items may unable shifts in parameters associated with exchange items. For example, an additional discount for a particular branded exchange item may be enabled when a temperature value of a temperature condition is less than a low threshold value. As another example, a balance of another exchange item may be increased by 10% for a two-hour time frame when a local baseball team wins a game and the exchange item is associated with a brand of the local baseball team. Having updated the conditions, the method loops back to step 866

Figure 8B:
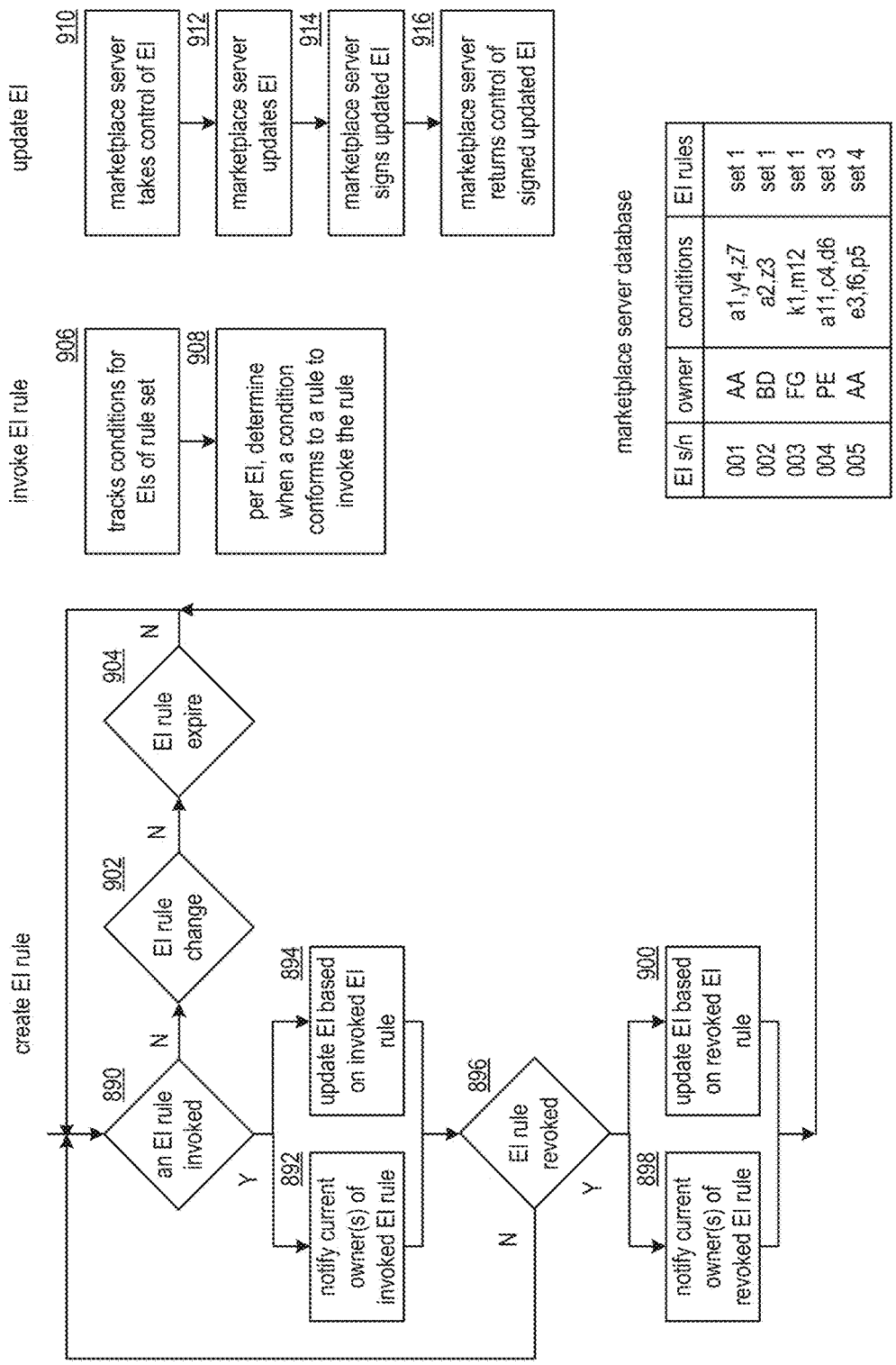
FIG. 8B is a logic diagram of an embodiment of a method for utilizing rules in an exchange item marketplace network in accordance with the present invention.

FIG. 8B is a logic diagram family of an embodiment of a method for utilizing rules in an exchange item (EI) marketplace network. A rule is associated with utilization of an exchange item. The rule may be imposed by one or more of an issuing brand, a merchant, an alternative brand, and by a marketplace server of the exchange item marketplace. A rule specifies allowable values or ranges of values of parameters associated with an exchange item is a function of one or more conditions and of one or more use options. Rules be imposed independently (e.g., alone without any interaction with other rules), in series (e.g., first rule invoked followed by a second rule invoked), in parallel (e.g., operating two or more rules together, and may interact where a first rule status may be utilized by a second rule), or in a nested fashion (e.g., where a rule is triggered when a value associated with a preceding rule compares favorably to a trigger threshold level). Each EI rule is associated with a rule lifecycle, which includes creation of the EI rule, and may include invoking of the EI rule and updating of the EI rule and/or of an associated EI of the EI rule (e.g., updating a marketplace server database).

A method associated with the creation of the EI rule includes step 890 where a processing module (e.g., by a brand server, by a marketplace server) determines whether an exchange item (EI) rule has been invoked. The determining may be based on one or more of interpreting values of conditions in accordance with the EI rule, receiving a message indicating that the rule has been invoked, and detecting an activity associated with the invoking of the rule. The method branches to steps 892 and 894 when the EI rule has been invoked. The method branches to step 902 when the EI rule has not been invoked where the processing module determines whether the EI rule has changed. The determining may be based on one or more of interpreting a change flag, receiving a change message, observing activity associated with a change of the rule, and comparing a previous EI rule to the EI rule. The method continues to step 904 when the EI rule has not been changed where the processing module determines whether the EI rule has expired (e.g., detecting that an active timeframe associated with the EI rule has elapsed). The method loops back to step 890 when the EI rule has not expired.

When the EI rule has been invoked, the method continues at step 892 where the processing module notifies a current owner of the invoked EI rule (e.g., issuing a message to a brand server that established (i.e., owner) the rule) and the method continues at step 894 where the processing module updates the EI based on the invoked EI rule. The updating includes modifying a record of the EI in the marketplace server database immediately or upon receiving a permissions grant from the owner, modifying the record of the EI in the marketplace server database.

The method continues at step 896 where the processing module determines whether the EI rule has been revoked. The determining may be based on one or more of interpreting updated conditions associated with the EI rule and indicating that the EI rule has been revoked and receiving a message indicating that the EI rule has been revoked (e.g., from a brand server). The method loops back to step 890 when the EI rule has not been revoked. The method continues to steps 898 and 900 when the EI rule has been revoked. The method continues at step 898 where the processing module notifies the current owner of the revoked EI rule (e.g., issuing an EI revoked message) and updates the associated EI based on the revoked EI rule (e.g., updates the marketplace server database).

A method associated with the invoking of the EI rule includes step 906 where the processing module tracks conditions for exchange items of a rule set. For example, the processing module receives conditions data associated with a plurality of conditions types and maps the conditions data a plurality of exchange items associated with rules that rely on the conditions to activate a course of action. The method continues at step 908 where the processing module, per exchange item, determines when a condition conforms to a rule to invoke the rule. For example, the processing module indicates to invoke the rule when a condition of the rule meets a threshold level.

A method associated with the updating of the EI rule includes step 910 where the marketplace server takes control of the exchange item. The taking of control includes invoking a rule that includes granting updating authority for the marketplace server. With the authority to update the exchange item in the marketplace server database, the marketplace server may modify a rule, add a rule, delete a rule, add conditions associated with a rule, delete conditions associated with a rule, and modify conditions associated with a rule.

The method continues at step 912 where the marketplace server updates the exchange item. For example, the marketplace server recovers a portion (e.g., a single transaction blockchain including a ledger of all exchange items) of the marketplace server database and modifies the recovered portion (e.g., modifies the blockchain) to produce an updated portion of the marketplace server database. The method continues at step 914 where the marketplace server signs the updated exchange item. For example, the marketplace server utilizes a private key of a public/private key pair of the marketplace server to electronically sign the updated exchange item to produce a signature of the marketplace server. The method continues at step 916 where the marketplace server returns control of the signed updated exchange item. For example, the marketplace server stores the signed updated exchange item into the marketplace or database and pushes the signed updated exchange item to one or more entities of the exchange item marketplace network. For instance, the marketplace server sends the signed updated exchange item to a computing device associated with purchase of the exchange item. As another instance, the marketplace server sends the signed updated exchange item to a brand server associated with the exchange item. Such a signed updated exchange item is illustrated where exchange item serial number 5, that is associated with owner AA, includes conditions e3, f6, p5 that is associated with the exchange item 5, and that now follows a rule set 4.

Figure 8D:
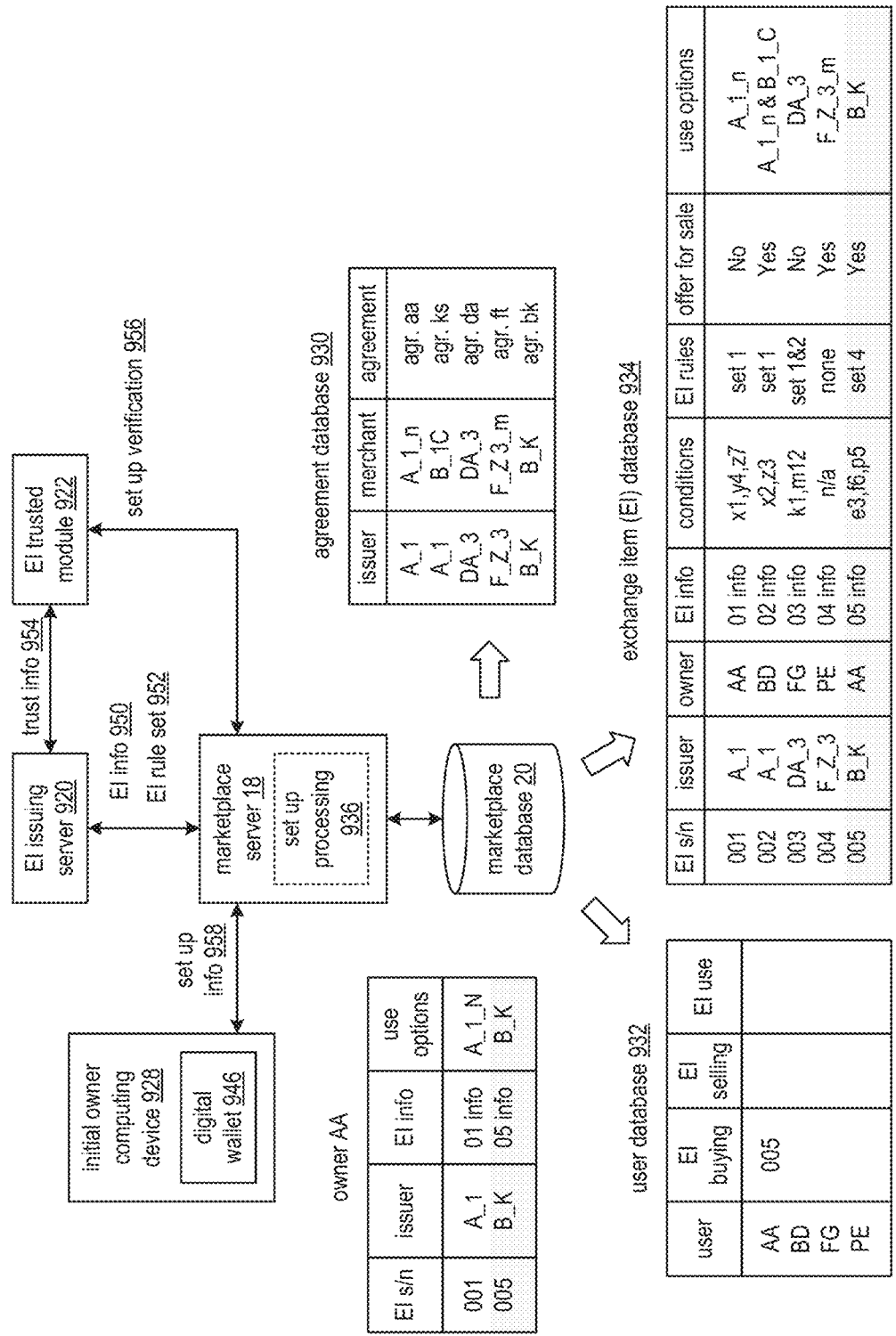
FIG. 8D is a schematic block diagram of another embodiment of an exchange item marketplace network in accordance with the present invention.

FIG. 8D is a schematic block diagram of another embodiment of an exchange item marketplace network that includes the initial owner computing device 928 of FIG. 6, the EI issuing server 920 of FIG. 6, the EI trusted module 922 of FIG. 6, the marketplace server 18 of FIG. 6, and the marketplace database 20 of FIG. 6. Entities of the exchange item marketplace network may be operably coupled through the network 24 of FIG. 6 or may be directly connected to each other. The exchange item marketplace functions to establish agreements and set up exchange items. Such agreements include terms for one or more of creation of exchange items (EI), creation of EI rules for the exchange items, identification of condition types and condition values to be utilized in conjunction with the EI rules, and facilitating payment for sale and/or utilization of an exchange item. The agreements may involve two or more parties, such as a brand, a merchant, and an alternative brand. For example, an agreement between a brand and a merchant associated with the brand indicates a discount range associated with a particular exchange item. As another example, an agreement between a brand and the alternative brand indicates which products may be purchased using an exchange item not associated with the product. Agreement information includes one or more agreement points of each agreement (e.g., value, discount, balance, permissions, etc.).

In an example of operation of the establishing of the agreements and setting up of the exchange items, the setup (i.e., or set up) processing 936 of the marketplace server 18 establishes the agreement database 930. The establishing includes receiving agreement information and updating the agreement database 930 within the marketplace database 20. For example, the marketplace server 18 issues a query to one or more of the EI issuing server 920, another issuing server, a merchant server, another merchant server; and receives a query response. As another example, the marketplace server 18 receives an unsolicited message including the agreement information. Having received the agreement information, the marketplace server updates the agreement database 930. The agreement database 930 correlates issuer information, merchant information, and agreement information. For example, the agreement database 930 associates issuer A_1 with a merchant A_1_n as bound by an agreement aa (e.g., including one or more agreement points).

Having established the agreements, the marketplace server 18 facilitates setting up of the exchange items to include establishment of exchange item (EI) rules. An initiating entity establishes a first rule for a new exchange item. The initiating entity includes at least one of the EI issuing server 920 and the set up processing 936 of the marketplace server 18. The first rule is associated with establishment of a security approach to ensure that and subsequent rules associated with the EI can be trusted by all marketplace participants as time proceeds. For example, the EI issuing server 920 establishes trust information 954 to include a first contract block of a contract blockchain, where private/public key pairs are utilized to ensure trust as previously discussed with reference to FIGS. 7A-E. The first contract block establishes the EI issuing server 920 as the owner (e.g., a root of the contract blockchain).

The initiating entity further establishes the new exchange item. For example, the EI issuing server 920 establishes EI information 950 (e.g., value, type, issuance date, expiration date, use parameters, etc.). The initiating entity further establishes content of the first rule, and further content of other rules as an EI rule set 952. For example, the EI issuing server 920 utilizes a fourth set of EI rules and an EI of serial number 5 for issuer B_K (e.g., identity of the EI issuing server 920) to include EI 05 info. The EI005 is to be for sale and is bound by a fourth set of EI rules which are associated with conditions e3, f6, p5 in accordance with use options of the issuer B_K. Having obtained the EI information 950 and the EI rule set 952, the set up processing 936 verifies the received EI information and set by exchanging set up verification 956 with the EI trusted module 922. For example, the EI trusted module 922 verifies the contract blockchain and sends an indication of a status of the verification to the marketplace server 18.

When the EI information 950 in the EI rule set 952 have been verified, set up processing 936 updates the exchange item database 934 of the marketplace database 20 with the EI information 950 in the EI rule set 952. For instance, the setup processing 936 establishes the role of the exchange item database 934 associated with the EI serial number 005. The set up processing 936 may further update the user database 932 to include a list of known users of the marketplace, a history of EI buying, selling, and using. For example, the set up processing 936 updates the user database 932 when the initial owner computing device 928 (e.g., owner AA) purchases the new EI by exchanging set up information 958 with the marketplace server 18. The initial owner computing device 928 updates a digital wallet 946 of the initial owner computing device 928 with an owner table. The owner table includes one or more of a list of EI serial numbers, and for each EI, an identifier of an issuer, associated EI information, use options, EI rules associated with the EI, and conditions associated with the EI. Alternatively, or in addition to, the marketplace server maintains a copy of the owner table in the marketplace database 20.

Figure 8E:
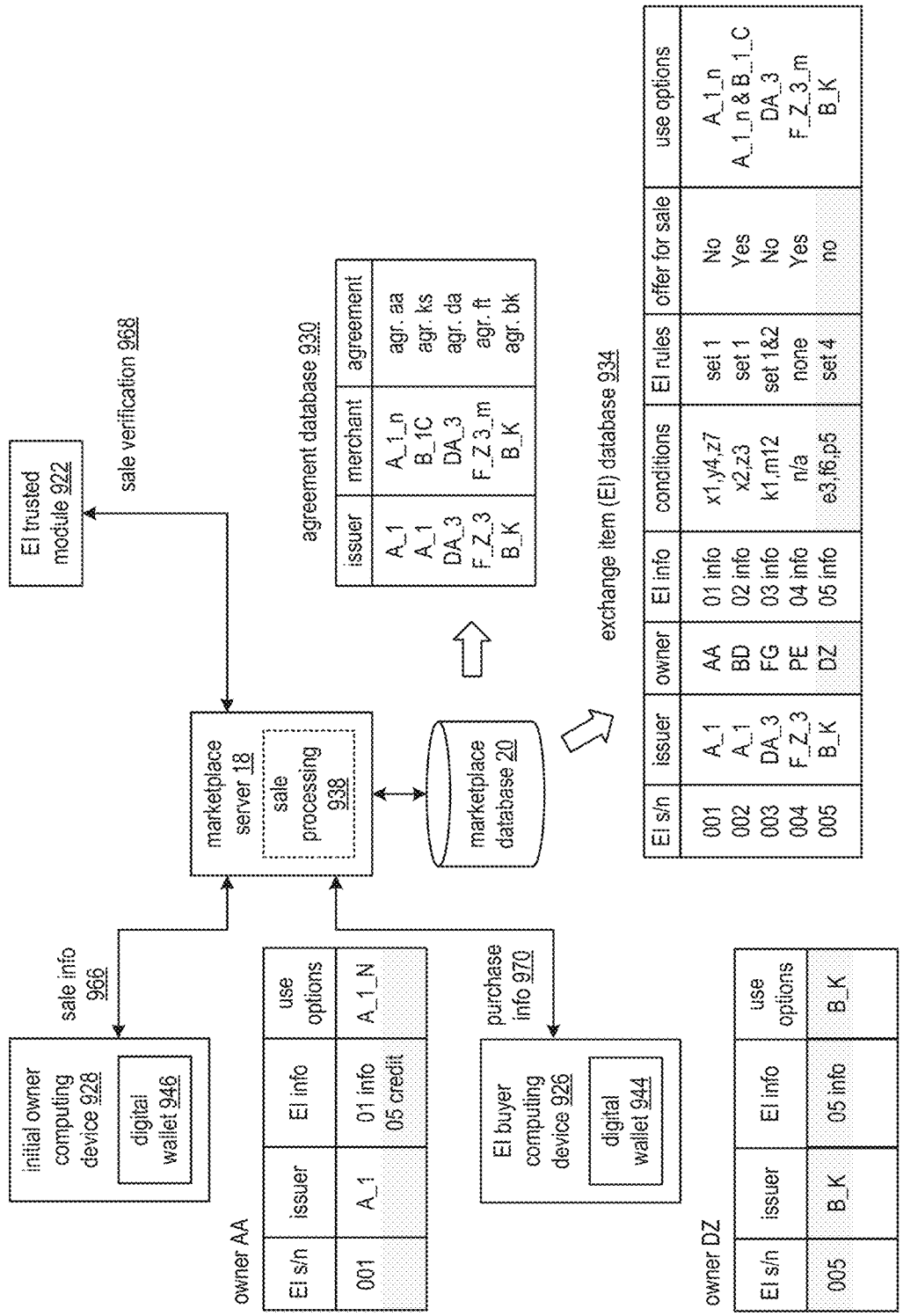
FIG. 8E is a schematic block diagram of another embodiment of an exchange item marketplace network in accordance with the present invention.

FIG. 8E is a schematic block diagram of another embodiment of an exchange item marketplace network that includes the initial owner computing device 928 of FIG. 6, the EI buyer computing device 926 of FIG. 6, the EI trusted module 922 of FIG. 6, the marketplace server 18 of FIG. 6, and the marketplace database 20 of FIG. 6. The exchange item marketplace functions to process a sale of an exchange item (EI) from the initial owner computing device 928 to the EI buyer computing device 926.

In an example of operation of the processing of the sale of the EI serial number 005 by the initial owner computing device 928 (e.g., owner AA) the EI buyer computing device 926 (e.g., owner DZ), the sale processing 938 of the marketplace server 18 exchanges sale information 966 with the initial owner computing device 928, where the sale information 966 includes one or more of the EI serial number 005, a sale price, use options, a commission amount (e.g., to the marketplace), and credit information (e.g., a 05 credit of generic value usable in the marketplace to purchase another EI or to be converted into another form of payment). The initial owner computing device 928 updates the digital wallet 946 to indicate that the EI serial number 005 has been sold and that the 05 credit is available.

The sale processing 938 further exchanges sale verification 968 with the EI trusted module 922. For example, the EI trusted module 922 verifies the contract blockchain and a transaction blockchain associated with the EI to ensure that the sale is within sale allowance parameters associated with the EI as imposed by one or more of an agreement, and EI rule, conditions, and use options. When verified, the EI trusted module 922 issues the sale verification 968 to the sale processing 938 indicating that the sale is verified.

The sale processing 938 further exchanges purchase information 970 with the EI buyer computing device 926, such that the EI buyer computing device 926 updates the digital wallet 944 indicating that owner DZ has the EI serial number 005. Having processed the sale of the EI 005, the sale processing 938 updates the marketplace database 20 indicating that the EI serial 005 is now associated with owner DZ and is not currently for sale.

Figure 8F:
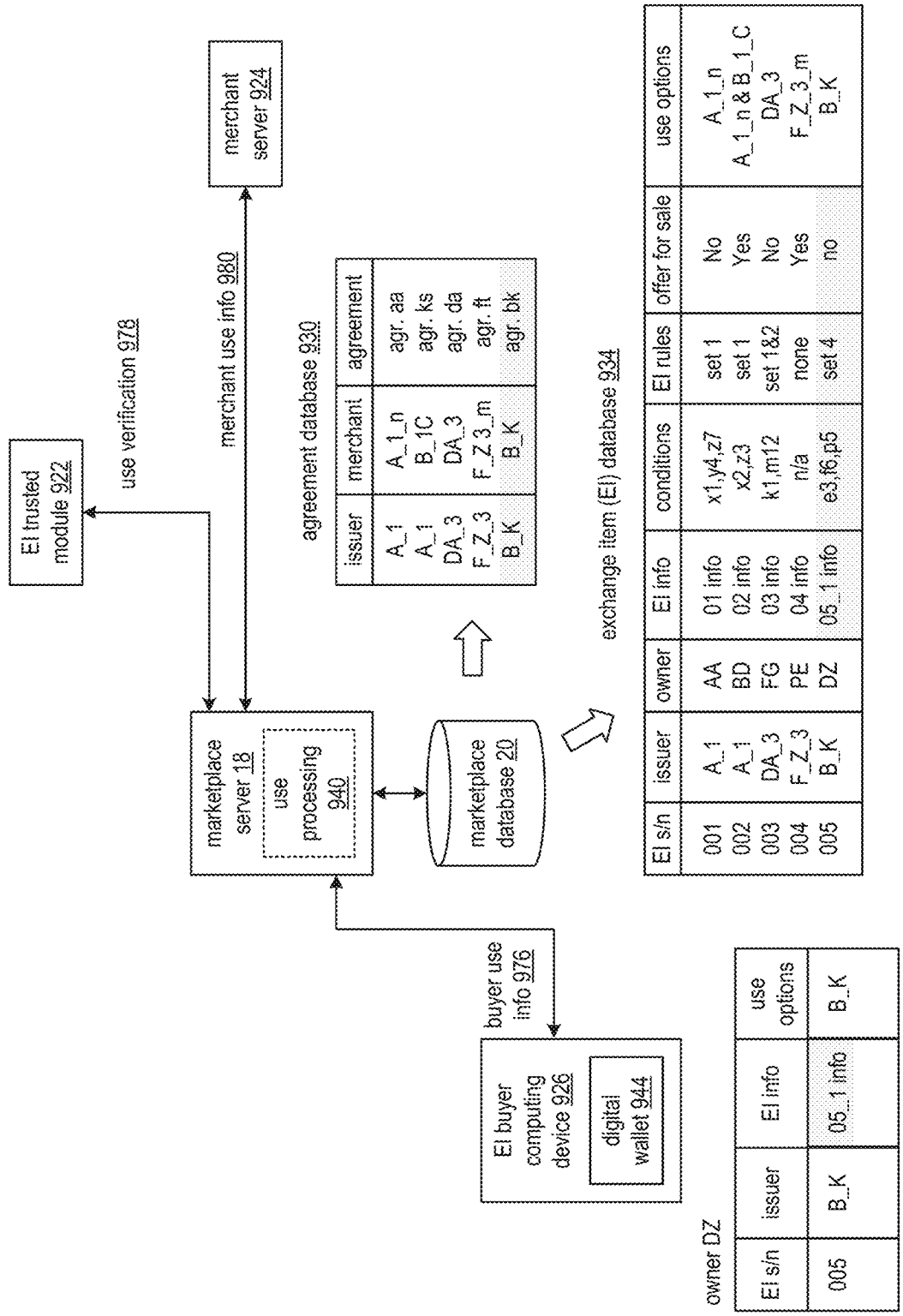
FIG. 8F is a schematic block diagram of another embodiment of an exchange item marketplace network in accordance with the present invention.

FIG. 8F is a schematic block diagram of another embodiment of an exchange item marketplace network that includes the EI buyer computing device 926 of FIG. 6, the EI trusted module 922 of FIG. 6, the merchant server 924 FIG. 6, the marketplace server 18 of FIG. 6, and the marketplace database 20 of FIG. 6. The exchange item marketplace functions to process use of an exchange item (EI) by the EI buyer computing device 926 with the merchant server 924.

In an example of operation of the use of the EI, the EI buyer computing device 926 obtains EI info from the digital wallet 944 to issue buyer use information 976 to the marketplace server 18 when desiring to utilize the exchange item (e.g., EI serial number 005) with a merchant associated with the merchant server 924 for purchase of goods and/or services. When receiving the buyer use information 976, the use processing 940 of the marketplace server 18 verifies the use by exchanging use verification 978 with the EI trusted module 922. The use verification 978 includes one or more of the buyer use information 976 and an associated row of the exchange item database 934 associated with the exchange item (e.g., the row associated with the exchange item serial number 005). For example, the EI trusted module 922 verifies that the use of the EI compares favorably with the associated rules, conditions, and use options.

When receiving favorable use verification 978, the use processing 940 exchanges merchant use information 980 with the merchant server 924 to complete the use of exchange item. Alternatively, the marketplace server 18 receives the merchant use information 980 from the merchant server 924 via the EI buyer computing device 926 as part of the buyer use information 976 (e.g., a secure blockchain element is generated by the merchant server 924 and communicated directly to the EI buyer computing device 926).

The merchant use information 980 includes one or more of the buyer use information 976, the use verification 978, and any additional information to complete the use of the EI. Upon completion of the use of the EI, the use processing 940 updates the exchange item database 934 indicating that the EI has been utilized (e.g., indicating an amount of an outstanding balance utilized and a remaining available balance etc.). Alternatively, or in addition to, the use processing 940 performs a merchant verification process in accordance with a rule associated with the exchange item. For example, the use processing 940 extracts security information from the merchant use information 980, exchanges use information 978 with the EI trusted module 922, and interprets a use verification 978 response from the EI trusted module 922 to determine whether the merchant server 924 is verified (e.g., non-fraudulent). The EI trusted module 922 may verify the merchant server 924 by a variety of approaches including accessing a database of fraudulent merchants, invoking a rule of an associated exchange item to test a plurality of parameters associated with the merchant use information 980, and requesting that the merchant server 924 electronically sign a message to verify that the merchant server 924 holds a correct private key associated with a previously verified merchant server 924.

Figure 8G:
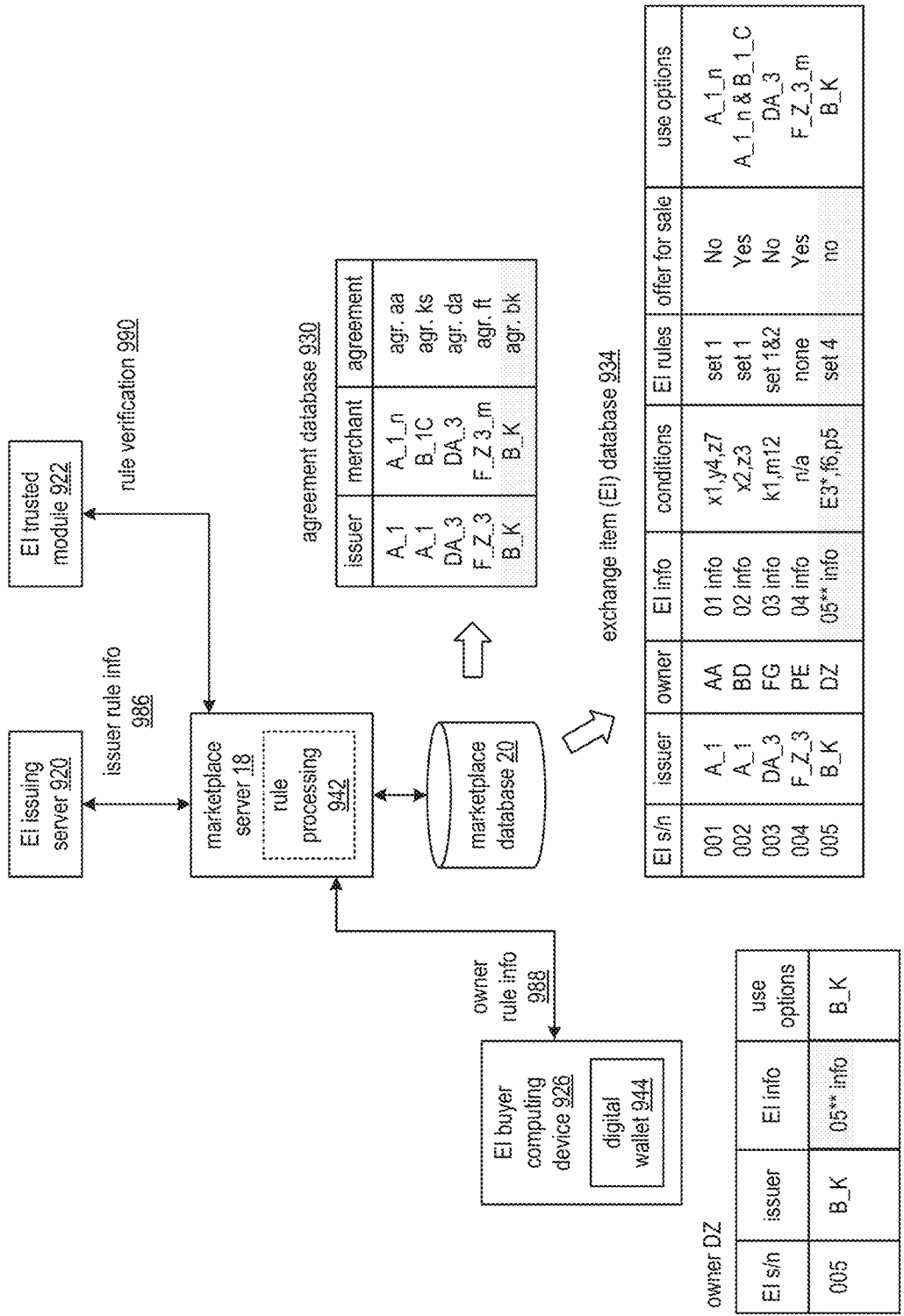
FIG. 8G is a schematic block diagram of another embodiment of an exchange item marketplace network in accordance with the present invention.

FIG. 8G is a schematic block diagram of another embodiment of an exchange item marketplace network that includes the EI buyer computing device 926 of FIG. 6, the EI issuing server 920, the EI trusted module 922 of FIG. 6, the marketplace server 18 of FIG. 6, and the marketplace database 20 of FIG. 6. The exchange item marketplace functions to process rules associated with an exchange item (EI).

In an example of operation of the processing of the rules, the rule processing 942 of the marketplace server 18 records conditions for a plurality exchange items. A condition of the conditions for the plurality of exchange items further includes one of a range of time, a range of dates, a geographic location, a building address, a list of items, a user tendency profile, and a user loyalty profile. For example, the marketplace server 18 obtains the condition from a corresponding condition source.

For an exchange item of the plurality of exchange items, where the exchange item has a quantifiable value (e.g., valid tender, offered something formally in writing, offered a sum for a settlement, same as money, offer made to settle something), a serial number, and a current owner, the rule processing 942 determines whether a corresponding condition of the exchange item is compliant with one or more rules of an applicable set of rules (e.g., a contract regarding the exchange item from the issuer, where a set of rules is utilized for each EI, or for a group of EIs, for each owner, by brand, by retailer, etc.). The determining includes utilizing a sliding scale of compliance (e.g., conditional chaining) based on one or more of a user profile, exchange item information, an exchange item issuer, limited exchange item use, and timing of use. For example, the rule processing 942 obtains information with regards to conditions and EI rules from the exchange item database 934 and interprets conditions data in accordance with the EI rules to determine the compliance. For example, the rule processing 942 indicates that a weather rule is compliant when a temperature condition indicates a temperature value that is greater than a temperature threshold value associated with the weather rule.

The rule processing 942 may verify the compliance with the EI rule by obtaining issuer rule information 986 from the EI issuing server 920 associated with the EI and by further verifying compliance by exchanging rule verification 990 with the EI trusted module 922. The verifying of compliance further includes verifying a security scheme (e.g., contract blockchain or the EI rules) and by checking that the EI rule compares favorably to the issuer rule information 986 from the EI issuing server 920.

The rule processing 942 may update the applicable set of rules based on one or more of a rule changing, a rule expiring, and a new rule being added to the set. For example, the rule processing 942 updates the exchange item database 934 and sends owner rule info 988 to the EI buyer computing device 926 to indicate an EI rule change associated with a particular EI when current conditions and a previous rule indicate changing the rule when the conditions are compliant.

The rule processing 942 may further determine a specific use as the one or more rules of the applicable rule set (e.g., for a specific product, a specific store, etc.). For example, the rule processing 942 identifies raising a discount level for the exchange item in accordance with the EI rule as the specific use in accordance with the EI rule and favorable conditions to alter the discount level. Alternatively, or in addition to, the rule processing 942 determines a specific time frame as the one or more rules of the applicable rule set (e.g., for a set period of time, a day, etc.). For example, the rule processing 942 identifies a two-hour time window for the raised discount level for the exchange item in accordance with the one or more rules.

When the corresponding condition of the exchange item is compliant with the one or more rules, the rule processing 942 establishes a secure communication with a computing device affiliated with a current owner (e.g., of the exchange item and/or of the contract blockchain) to take control of the exchange item (e.g., to update an exchange item record of the exchange item). Having control includes holding a private key associated with modifying a blockchain associated with the exchange item. For example, the rule processing 942 exchanges a secure owner rule information 988 with the EI buyer computing device 926 associated with an exchange item serial number 005, where the rule processing 942, in accordance with a security rule, is allowed to modify the contract blockchain with regards to the EI rules.

While having control over the exchange item, the rule processing 942 securely modifies the quantifiable value of the exchange item based on the one or more rules to produce a modified exchange item. For example, the rule processing 942 adds another contract block to the contract blockchain, where the additional contract block includes a modified exchange item as modified exchange item info serial number 005. The modifying of the quantifiable value includes increasing the quantifiable value for the specific use when the specific use is utilized as the one or more rules of the applicable rule set and securely modifying the quantifiable value of the exchange item in accordance with the blockchain protocol.

Having modified the quantifiable value of the modified exchange item, the rule processing 942 sends a notification message (e.g., owner rule information 988) to the computing device (e.g., the EI buyer computing device 926) regarding the increased quantifiable value and the specific use. Having received the notification message, the EI buyer computing device 926 stores the (modified) exchange item in accordance with the blockchain protocol (e.g., stores the contract blockchain including the new contract block in the digital wallet 944).

The modifying of the quantifiable value may further include increasing the quantifiable value for use during the specific time frame when the specific time frame is utilized as the one or more rules of the applicable rule set (e.g., an increase discount level for the next two hours). Having modified the quantifiable value, the rule processing 942 sends another notification message to the computing device regarding the increased quantifiable value and the specific time frame.

While having control over the exchange item, the rule processing 942 further prevents the computing device or another computing device from accessing the exchange item. For example, the rule processing 942 issues owner rule information 988 to the EI buyer computing device 926 indicating that the exchange item is not to be utilized while being modified. Alternatively, or in addition to, the rule processing 942 updates the exchange item database 934 indicating that the exchange item is not to be accessed while being modified. When completing the modification, the rule processing 942 releases, via the secure communication, control of the modified exchange item to the computing device affiliated with the current owner. For example, the rule processing 942 issues yet another owner rule information 988 to the EI buyer computing device 926 indicating that the exchange item has been updated and released.

With the exchange item updated, and when the specific time frame expires (e.g., when utilized) and the modified exchange item is unused (e.g., the EI buyer computing device 926 has not used the modified exchange item at all), the rule processing 942 facilitates reverting of the exchange item. The reverting of the exchange item includes one or more of establishing another secure communication with the computing device affiliated with exchange item to take control of the modified exchange item and while having control over the modified exchange item, decreasing the increased quantifiable value to the quantifiable value to produce a reverted exchange item, preventing the computing device or another computing device from accessing the exchange item, releasing, via the other secure communication, control of the reverted exchange item to the computing device affiliated with the current owner, and sending another notification message to the computing device regarding the reverted exchange item.

Alternatively, when the specific time frame expires, and the modified exchange item was used but did not exhaust the quantifiable value, the rule processing 942 facilitates producing a further modified EI. The facilitating to produce the further modified EI includes one or more of identifying another rule of the applicable set of rules to further modify the modified exchange item, establishing another secure communication with the computing device affiliated to take control of the modified exchange item, and while having control over the modified exchange item, the rule processing 942 increases a remaining quantifiable value to produce a further modified exchange item, prevents the computing device or another computing device from accessing to the modified exchange item, releases, via the other secure communication, control of the further modified exchange item to the computing device affiliated with the current owner, and sends another notification message to the computing device regarding the further modified exchange item.

With the modified exchange item, the EI buyer computing device 926 may utilize the modified exchange item in conjunction with a purchase transaction from a merchant. For example, the EI buyer computing device 926 sends a use request to another server (e.g., a merchant server) regarding the modified exchange item (e.g., to utilize the modified EI for the purchase transaction). Having received the use request, the other server sends a use notification to the marketplace server 18. Having received the use notification, the rule processing 942 of the market place over 18 establishes a second secure communication with the computing device affiliated with the current owner to take control of the modified exchange item (e.g., exchanges owner rule information 988 with the EI buyer computing device 926).

While having control over the exchange item, the marketplace server 18 securely adjusts the quantifiable value of the exchange item based on the use notification to produce an adjusted exchange item (e.g., decrements a remaining balance by an amount of the purchase transaction and updates one or more of a transaction blockchain and the contract blockchain) and prevents the computing device, the other server, or other computing devices from accessing the exchange item. Once modified, the marketplace server 18 releases, via the second secure communication, control of the adjusted exchange item to the computing device affiliated with the current owner.

FIG. 8H is a diagram of an exchange item (EI) database 934 that includes a variety of fields. The variety of fields includes an EI serial number, and issuer, and owner, EI information, conditions, EI rules, offer for sale, use options, blockchain control, and blockchain location when a blockchain approach is utilized as a security mechanism for entities trading in the EI to verify attributes associated with the EI. For example, a transaction blockchain is associated with transactions from birth of the EI to complete utilization/retirement of the EI and a contract blockchain associated with EI rule changes as time progresses. A structure of the transaction blockchain and the contract blockchain is discussed in greater detail with reference to FIG. 8J.

To ensure favorable security, a controlling entity desiring to modify the blockchain must be associated with control of the blockchain as indicated by the blockchain control field of the exchange item database 934. The controlling entity may change from one entity to another during the EI lifecycle and may further be constrained as indicated by the EI rules. For example, a particular blockchain may be controlled by the EI issuer in the beginning and later controlled by the marketplace server in accordance with the EI rules established by the EI issuer. As another example, the blockchain may be controlled by the merchant server to update rules and conditions to support a particular promotion as allowed by the original and current EI rules.

A most recent revision of a particular blockchain may be temporarily stored in one or more entities of the exchange item marketplace as indicated by the blockchain location field. As such, the controlling entity may utilize the exchange item database 934 to identify the entity where the blockchain is temporarily stored to gain access to the blockchain for modification in accordance with the rules and conditions.

Figure 8J:
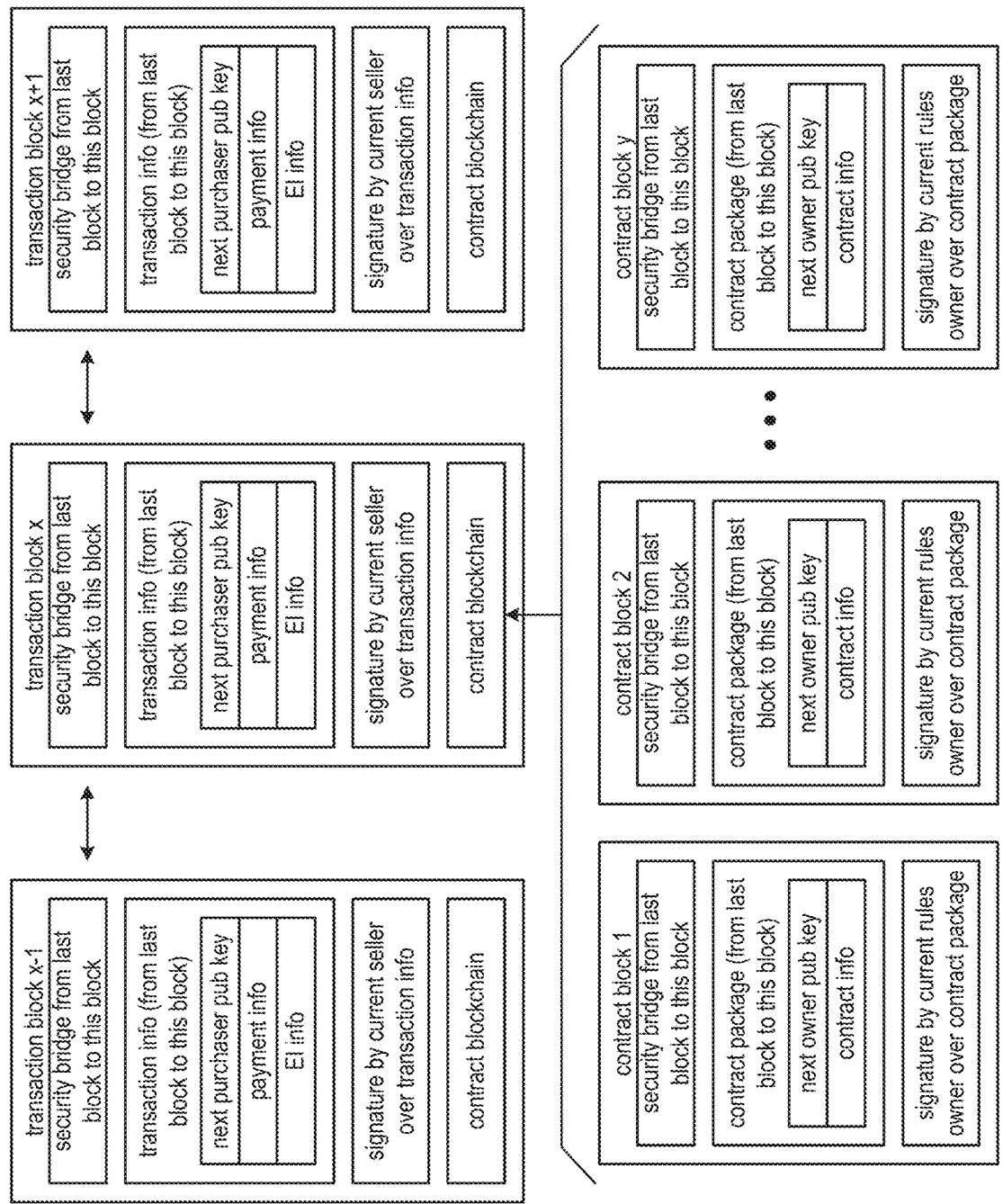
FIG. 8J is another schematic block diagram of a transactions blockchain in accordance with the present invention.

FIG. 8J is another schematic block diagram of a transactions blockchain that includes a series of transaction blocks. Each transaction block includes a security bridge from a last block to this block (e.g., hash over previous block and a previous nonce, and a hash over a current block and a current nonce), transaction information, a signature by a current seller over the transaction info, and a contract blockchain. The transaction information includes a next purchaser public key (e.g., a public key of a public/private key pair of the next purchaser associated with a next transaction), payment information, and EI information. The payment information includes payment information (e.g., payment amount, payment source, etc.) from the next purchaser to the current seller associated with the current block. The signature is created by the current seller signing the transaction information utilizing the private key of a public/private key pair of the current seller.

The contract blockchain includes one or more contract blocks representing changes to rules and/or conditions of the EI of the EI information. For example, the contract blockchain includes a complete contract blockchain for substantially all of the rules and/or conditions changes. As another example, the contract blockchain includes at least one contract block associated with the transaction block. Alternatively, or in addition to, the contract blockchain is maintained separately and is not included within the transaction block. Further alternatively, a single combined transaction and contract blockchain is maintained as one entity.

Each contract block includes a security bridge from a last block to this block, a contract package (from a last contract block to this contract block), and a signature by a current rules owner over the contract package. Each contract package includes at least one next owner public key (e.g., associated with an exchange item marketplace entity expected to be a next owner of the contract blockchain), and contract information. The contract information includes one or more of EI rules, conditions, use options, EI information, agreements, merchant identifiers, issuer identifier, EI serial number, owner identifier, an offer for sale indicator, etc. The signature over the contract packages created by a current owner of the contract blockchain signing the contract package utilizing a private key of a public/private key pair associated with the current owner of the contract blockchain. The or more blockchains may be verified from time to time utilizing industry-standard mining approaches and are applicable to both proof of work, proof of stake, and other hybrid mining techniques.

Figure 8K:
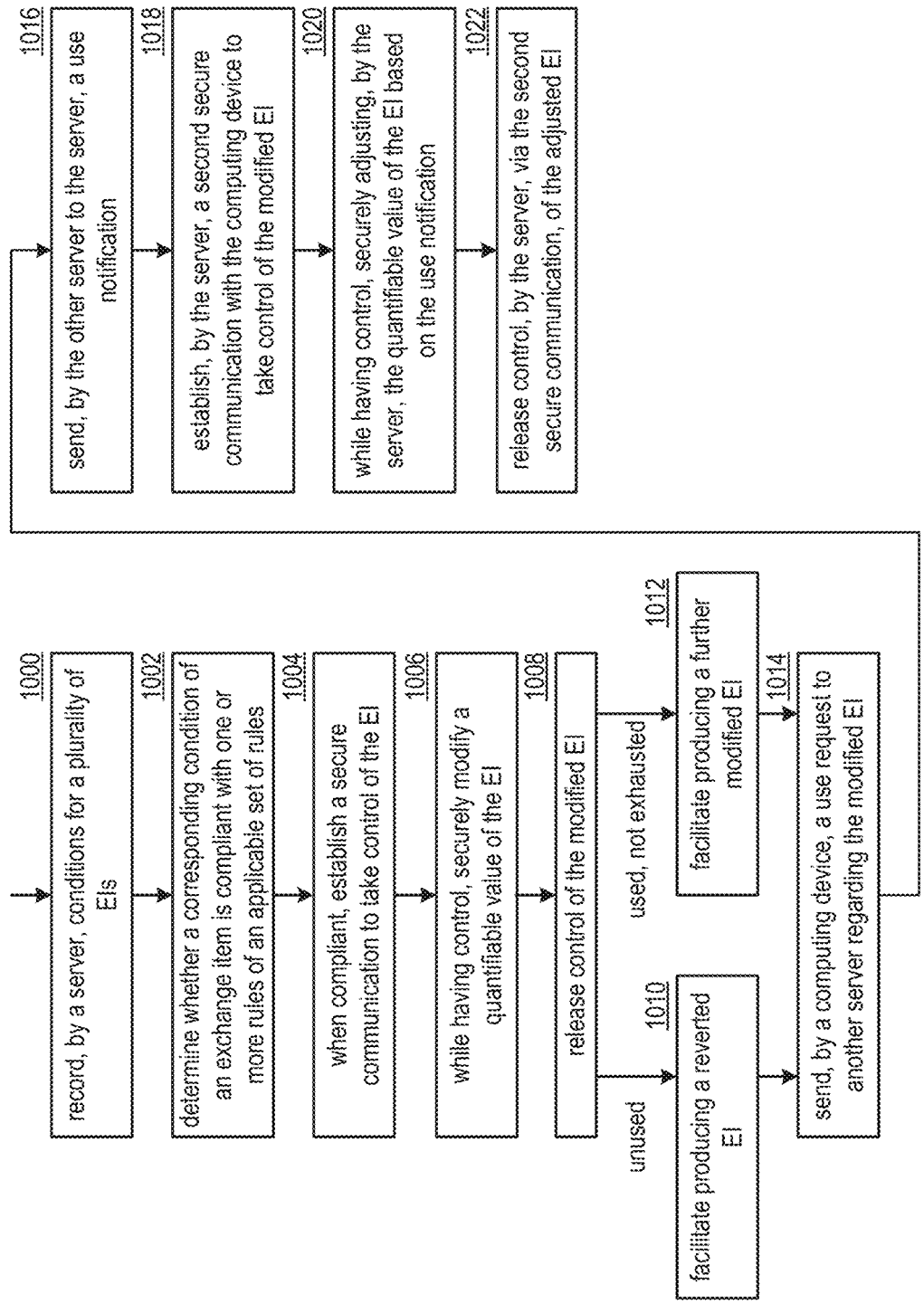
FIG. 8K is a logic diagram of an embodiment of a method for modifying an exchange item in an exchange item marketplace network in accordance with the present invention.

FIG. 8K is a logic diagram of an embodiment of a method for modifying an exchange item in an exchange item marketplace network. In particular, a method is presented for use in conjunction with one or more functions and features described in conjunction with FIGS. 1-7E, 8A-J, and also FIG. 8K. The method includes step 1000 where a processing module of a server (e.g., a marketplace server of a communication system) records conditions for a plurality of exchange items. For an exchange item of the plurality of exchange items, where the exchange item has a quantifiable value, a serial number, and a current owner, the method continues at step 1002 where the processing module determines whether a corresponding condition of the exchange item is compliant with one or more rules of an applicable set of rules. The determining may include determining a specific use as the one or more rules of the applicable rule set. The determining may further include determining a specific time frame as the one or more rules of the applicable rule set. The determining may yet further include utilizing a sliding scale of compliance based on one or more of a user profile, an exchange item information, exchange item issuer, limited exchange item use, and timing of use. The determining may still further include updating the applicable set of rules based on one or more of a rule changing, a rule expiring, and a new rule being added to the set. For example, updating the rules and utilizing the updated rules for a compliance determination.

When the corresponding condition of the exchange item is compliant with the one or more rules, the method continues at step 1004 where the processing module establishes a secure communication with a computing device affiliated with the current owner to take control of the exchange item. For example, the processing module accesses a contract blockchain currently possessed by the computing device.

While having control over the exchange item, the method continues at step 1006 where the processing module securely modifies the quantifiable value of the exchange item based on the one or more rules to produce a modified exchange item. The modifying may include modifying the quantifiable value by increasing the quantifiable value for the specific use when the specific use is utilized as the one or more rules of the applicable rule set and securely modifying the quantifiable value of the exchange item in accordance with a blockchain protocol (e.g., of the contract blockchain). The modifying may further include sending a notification message to the computing device regarding the increased quantifiable value and the specific use and storing, by the computing device, the exchange item in accordance with the blockchain protocol. The modifying of the quantifiable value may further include increasing the quantifiable value for use during the specific time frame (e.g., an increased discount for the next two hours) when the specific time frame is utilized as the one or more rules of the applicable rule set and sending a notification message to the computing device regarding the increased quantifiable value and the specific time frame. While having control over the exchange item, the processing module prevents the computing device or another computing device from accessing the exchange item (e.g., marking the modified exchange item as not accessible).

The method continues at step 1008 where the processing module releases, via the secure communication, control of the modified exchange item to the computing device affiliated with the current owner. For example, the processing module marks the modified exchange item as accessible enabling use of the modified exchange item by the computing device (e.g., to make a purchase transaction). When the specific time frame expires (e.g., two hours has elapsed), and the modified exchange item was used but did not exhaust the quantifiable value, the method branches to step 1012. When the specific time frame expires and the modified exchange item is unused, the method continues to step 1010.

When the specific time frame expires and the modified exchange item is unused, the method continues at step 1010 where the processing module facilitates producing a reverted EI. The facilitating includes establishing another secure communication with the computing device affiliated to take control of the modified exchange item. While having control over the modified exchange item, the processing module decreases the increased quantifiable value to the quantifiable value to produce a reverted exchange item, prevents the computing device or another computing device from accessing the exchange item, releases, via the other secure communication, control of the reverted exchange item to the computing device affiliated with the current owner, and sends another notification message to the computing device regarding the reverted exchange item. The method branches to step 1014.

When the specific time frame expires, and the modified exchange item was used but did not exhaust the quantifiable value, the method continues at step 1012 where the processing module facilitates producing a further modified EI. The facilitating of producing the further modified EI includes identifying another rule of the applicable set of rules to further modify the modified exchange item and establishing another secure communication with the computing device affiliated to take control of the modified exchange item. While having control over the modified exchange item, the processing module increases a remaining quantifiable value to produce a further modified exchange item, prevents the computing device or another computing device from accessing to the modified exchange item, releases, via the other secure communication, control of the further modified exchange item to the computing device affiliated with the current owner, and sends another notification message to the computing device regarding the further modified exchange item.

The method continues at 1014 where the computing device sends a use request to another server regarding the modified exchange item (e.g., to utilize the modified exchange item for a purchase transaction). The method continues at step 1016 where the other server sends a use notification to the other server (e.g., including information with regards to the purchase transaction). The method continues at step 1018 where the processing module of the server establishes a second secure communication with the computing device affiliated with the current owner to take control of the modified exchange item.

While having control over the exchange item, the method continues at step 1020 where the processing module of the server securely adjusts the quantifiable value of the exchange item based on the use notification to produce an adjusted exchange item (e.g., decrements a remaining balance by an amount of the purchase transaction). The adjusting may further include preventing the computing device, the other server, or other computing devices from accessing the exchange item during the adjusting. The method continues at step 1022 where the processing module of the server, and via the second secure communication, releases control of the adjusted exchange item to the computing device affiliated with the current owner.

The method described above in conjunction with the processing can alternatively be performed by other modules of the exchange item marketplace network or by other devices. In addition, at least one memory section (e.g., a computer readable memory, a non-transitory computer readable storage medium organized into a first memory section, a second memory section, a third memory section, a fourth memory section, etc.) that stores operational instructions can, when executed by one or more processing modules of one or more computing devices (e.g., one or more servers) of the exchange item marketplace network, cause the one or more computing devices to perform any or all of the method steps described above.

Figure 8L:
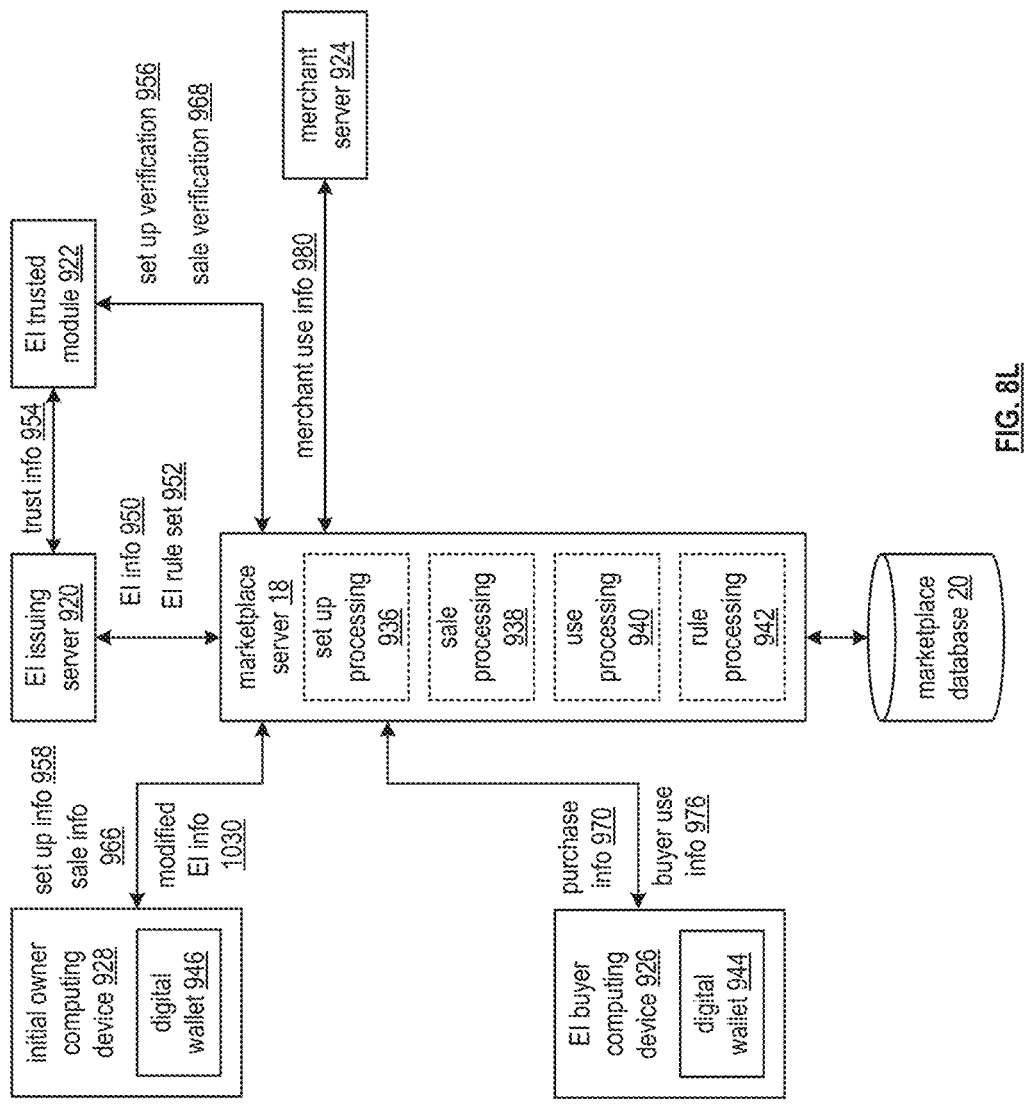
FIG. 8L is a schematic block diagram of another embodiment of an exchange item marketplace network in accordance with the present invention.

FIG. 8L is a schematic block diagram of another embodiment of an exchange item marketplace network (e.g., a data communication system) that includes the initial owner computing device 928 FIG. 6, the exchange item (EI) issuing server 920 of FIG. 6, the EI trusted module 922 of FIG. 6, the merchant server 924 of FIG. 6, marketplace server 18 FIG. 6, the marketplace database 20 of FIG. 6, and the EI buyer computing device 926 FIG. 6. Entities of the exchange item marketplace network may be operably coupled to each other via the network 24 of FIG. 6 or may be directly coupled. The initial owner computing device 928 includes the digital wallet 946 of FIG. 6 and the EI buyer computing device 926 includes the digital wallet 944 of FIG. 6. The marketplace server 18 includes the set up processing 936, the sale processing 938, the use processing 940, and the rule processing 942 all of FIG. 6. The exchange item marketplace network functions to transfer secure custody of an exchange item between entities in accordance with a secure custody protocol. The secure custody protocol includes utilizing one or more of a contract blockchain and a transaction blockchain as previously discussed.

In an example of operation of the transferring the secure custody of the exchange item between entities, the marketplace server 18 (e.g., the server) establishes an initial validity of the exchange item that includes data regarding a quantifiable value, a serial number, and issuance information, where the initial validity authenticates the exchange item and the data. The issuance information includes one or more of issuer identity, and issuance date, and expiration time frame, EI rules, and use parameters. The establishing may include receiving a plurality of exchange items from the EI issuing server 920, where the plurality of exchange items includes the exchange item, and establishing the initial validity of the exchange item with the EI issuing server 920. For example, the set up processing 936 receives EI information 950 and an EI rule set 952 from the EI issuing server 920, where the EI issuing server 920 issues trust information 954 (e.g., a first contract block of the contract blockchain) to the EI trusted module 922 while generating the EI information 950 and the EI rule set 952. Having received the EI information 950 and the EI rule set 952, the set up processing 936 exchanges set up verification 956 with the EI trusted module 922 to validate the EI information 950 and the EI rule set 952.

Having established the initial validity of the exchange item, the marketplace server 18 executes a secure custody protocol to establish that the initial owner computing device 928 (e.g., a first computing device) of the exchange item marketplace network (e.g., data communication system) has secure custody of the exchange item and to maintain validity of the exchange item. The secure custody protocol may further include one or more of a chain of custody mechanism (e.g., the blockchains), exchange item modification restrictions for computing devices of the data communication system (e.g., the initial owner computing device 928, the EI buyer computing device 926, the merchant server 924), and exchange item modification rights for servers of the data communication system. For example, the sale processing 938 exchanges set up information 958 with the initial owner computing device 928 (e.g., a request to purchase the exchange item, confirmation of sale, the EI info 950, one or more of the transaction blockchain and the contract blockchain).

Having executed the secure custody protocol, in response to an exchange item transfer and in accordance with the secure custody protocol, the marketplace server 18 facilitates transfer of the secure custody of the exchange item from the first computing device (e.g., the initial owner computing device 928) to the server or to a second computing device (e.g., the EI buyer computing device 926) of the data communication system. Such transfer supports one or more of a sale of the exchange item, use of the exchange item for a purchase transaction with a merchant associated with the merchant server 924, and modification of the exchange item in accordance with the EI rule set 952.

The transferring the secure custody of the exchange item from the initial owner computing device 928 to the EI buyer computing device 926 includes creating, by the sale processing 938, an offer for sale digital file for the exchange item in response to an offer for sale request from the initial owner computing device 928 and writing the offer for sale digital file for the exchange item to the marketplace database 20 (e.g., a virtual marketplace database) that includes a user interface for computing devices of the data communication system to view offer for sale digital files for a plurality of exchange items. The transferring further includes the sale processing 938 receiving purchase information 970 that includes a request to purchase the exchange item from the EI buyer computing device 926 and upon successful execution of the purchase, transferring the secure custody of the exchange item to the EI buyer computing device 926. For example, the sale processing 938 exchanges sale verification 968 with the EI trusted module 922 to update the transaction blockchain to indicate that the EI buyer computing device 926 is purchasing the exchange item from the initial owner computing device 928.

The transferring the secure custody of the exchange item from the first computing device to the second computing device may further include the sale processing 938 transferring, in response to another exchange item transfer and in accordance with the secure custody protocol, the secure custody of the exchange item from the second computing device to the marketplace server 18 or to a third computing device of the data communication system. The transferring the secure custody of the exchange item from the first computing device to the second computing device may still further include the initial owner computing device 928 sending a request to use the exchange item to the use processing 940 of the marketplace server 18, where the request to use the exchange item identifies the second computing device. When the use is authorized (e.g., the use processing 940 verifies that such use is authorized in accordance with the EI rule set 952), the use processing 940 transfers the secure custody of the exchange item to the second computing device for the second computing device to execute the use, where the second computing device changes the quantifiable value of the exchange item to produce a use modified exchange item (e.g., modified EI info 1030), and the use processing 940 transfers secure custody of the use modified EI info 1030 from the second computing device to the first computing device.

When transferring the secure custody of the exchange item from the initial owner computing device 928 (e.g., the first computing device) to the EI buyer computing device 926 (e.g., the second computing device), the rule processing 942 of the marketplace server 18 determines whether a change to the data of the exchange item occurred while the exchange item is in the secure custody of the second computer. For example, the rule processing 942 indicates the change to the data when the use processing 940 receives merchant use information 980 from the merchant server 924 in response to the EI buyer computer device 926 issuing buyer use information 976 to the use processing 940 to facilitate the purchase transaction with the merchant server 924.

When the change to the data of the exchange item occurred while the exchange item is in the secure custody of the second computer, the use processing 940 of the marketplace server 18 determines whether the exchange item is exhausted (e.g., a remaining balance of zero). When the exchange item is exhausted, the use processing 940 retires the exchange item (e.g., removes the exchange item from the marketplace database 20 and/or issues retirement information to a current owner of exchange item.

When the exchange item is in the secure custody of the server, the rule processing 942 of the marketplace server 18 may modify the data of the exchange item to produce a modified exchange item. The modifying of the data of the exchange item includes identifying a set of rules regarding the exchange item, where the set of rules includes one or more rules, where a rule of the set of rules includes an amount of data change and one or more conditions on when to apply the amount of change. The modifying further includes the rule processing 942 determining that a condition involving the first computing device conforms to the one or more conditions and when the condition involving the first computing device conforms to the one or more conditions, the rule processing 942 modifies the data of the exchange item in accordance with the amount of change (e.g., updates the marketplace database 20). Having modified the data of the exchange item, the rule processing 942 transfers secure custody of the modified exchange item to the initial owner computing device 928 device in accordance with the secure custody protocol.

Figure 8M:
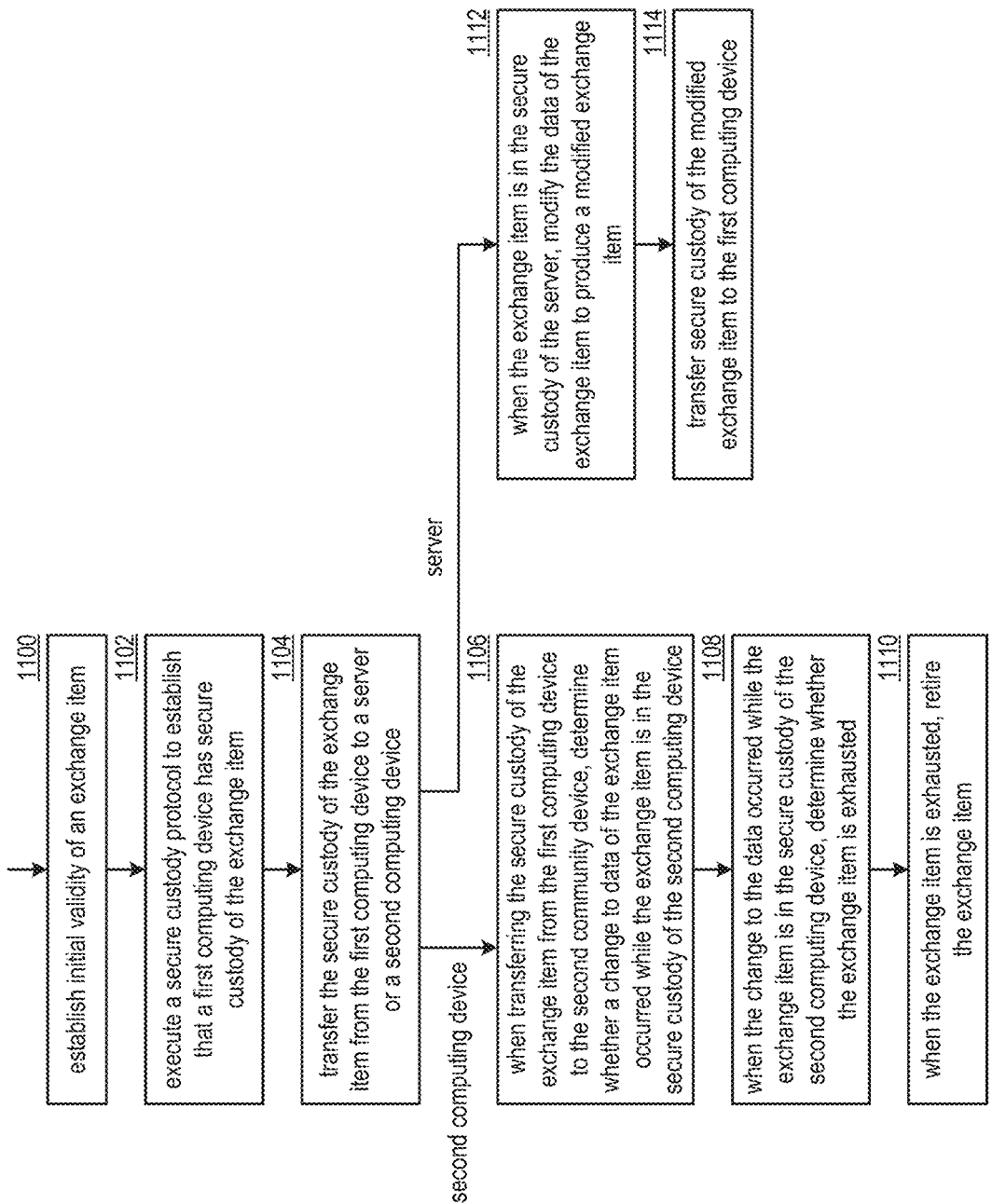
FIG. 8M is a logic diagram of an embodiment of a method for securely modifying an exchange item in an exchange item marketplace network in accordance with the present invention.

FIG. 8M is a logic diagram of an embodiment of another method for modifying an exchange item in an exchange item marketplace network. In particular, a method is presented for use in conjunction with one or more functions and features described in conjunction with FIGS. 1-7E, 8A-L, and also FIG. 8M. The method includes step 1100 where a processing module of a server (e.g., a marketplace server of a communication system) establishes an initial validity of an exchange item that includes data regarding a quantifiable value, a serial number, and issuance information, where the initial validity authenticates the exchange item and the data. The establishing may include receiving a plurality of exchange items from an issuing server, where the plurality of exchange items includes the exchange item, and establishing the initial validity of an exchange item with the issuing server.

The method continues at step 1102 where the processing module executes a secure custody protocol to establish that a first computing device of the data communication system has secure custody of the exchange item and to maintain validity of the exchange item. For example, the processing module generates a secure transaction block of a transaction blockchain, where the secure transaction block indicates that the first computing device has secure custody.

The method continues to step 1104 where the processing module transfers, in response to an exchange item transfer and in accordance with the secure custody protocol, the secure custody of the exchange item from the first computing device to the server or to a second computing device of the data communication system (e.g., for a sale, a purchase, or a modification). The method branches to step 1112 when transferring to the server. When transferring to the second computing device, the transferring the secure custody of the exchange item from the first computing device to the second computing device includes creating an offer for sale digital file for the exchange item in response to an offer for sale request from the first computing device the offer for sale digital file for the exchange item to a virtual marketplace database that includes a user interface for computing devices of the data communication system to view offer for sale digital files for a plurality of exchange items, receiving a request to purchase the exchange item from the second computing device, and upon successful execution of the purchase, transferring the secure custody of the exchange item to the second computing device.

The transferring the secure custody of the exchange item from the first computing device to the second computing device may further include transferring, in response to another exchange item transfer and in accordance with the secure custody protocol, the secure custody of the exchange item from the second computing device to the server or to a third computing device of the data communication system. The transferring the secure custody of the exchange item from the first computing device to the second computing device may still further include sending, by the first computing device, a request to use the exchange item to the server, where the request to use the exchange item identifies the second computing device. When the use is authorized, processing module transfers the secure custody of the exchange item to the second computing device for the second computing device to execute the use, where the second computing device changes the quantifiable value of the exchange item to produce a use modified exchange item, and transfers secure custody of the use modified exchange item from the second computing device to the first computing device.

When transferring the secure custody of the exchange item from the first computing device to the second computing device, the method continues at step 1106 where the processing module determines whether a change to the data of the exchange item occurred while the exchange item is in the secure custody of the second computing device (e.g., a lowering of a remaining balance based on usage of the exchange item). When the change to the data of the exchange item occurred while the exchange item is in the secure custody of the second computing device, the method continues at step 1108 where the processing module determines whether the exchange item is exhausted (e.g., remaining balance has reached zero). When the exchange item is exhausted, the method continues at step 1110 where the processing module retires the exchange item.

When the exchange item is in the secure custody of the server, the method continues at step 1112 or the processing module modifies the data of the exchange item to produce a modified exchange item. The modifying the data of the exchange item includes identifying a set of rules regarding the exchange item, where the set of rules includes one or more rules, where a rule of the set of rules includes an amount of data change and one or more conditions on when to apply the amount of change, determining that a condition involving the first computing device conforms to the one or more conditions, and when the condition involving the first computing device conforms to the one or more conditions, modifying the data of the exchange item in accordance with the amount of change. The method continues at step 1114 where the processing module transfers secure custody of the modified exchange item to the first computing device in accordance with the secure custody protocol.

The method described above in conjunction with the processing can alternatively be performed by other modules of the exchange item marketplace network or by other devices. In addition, at least one memory section (e.g., a computer readable memory, a non-transitory computer readable storage medium organized into a first memory section, a second memory section, a third memory section, a fourth memory section, a fifth memory section etc.) that stores operational instructions can, when executed by one or more processing modules of one or more computing devices (e.g., one or more servers) of the exchange item marketplace network, cause the one or more computing devices to perform any or all of the method steps described above.

Figure 8N:
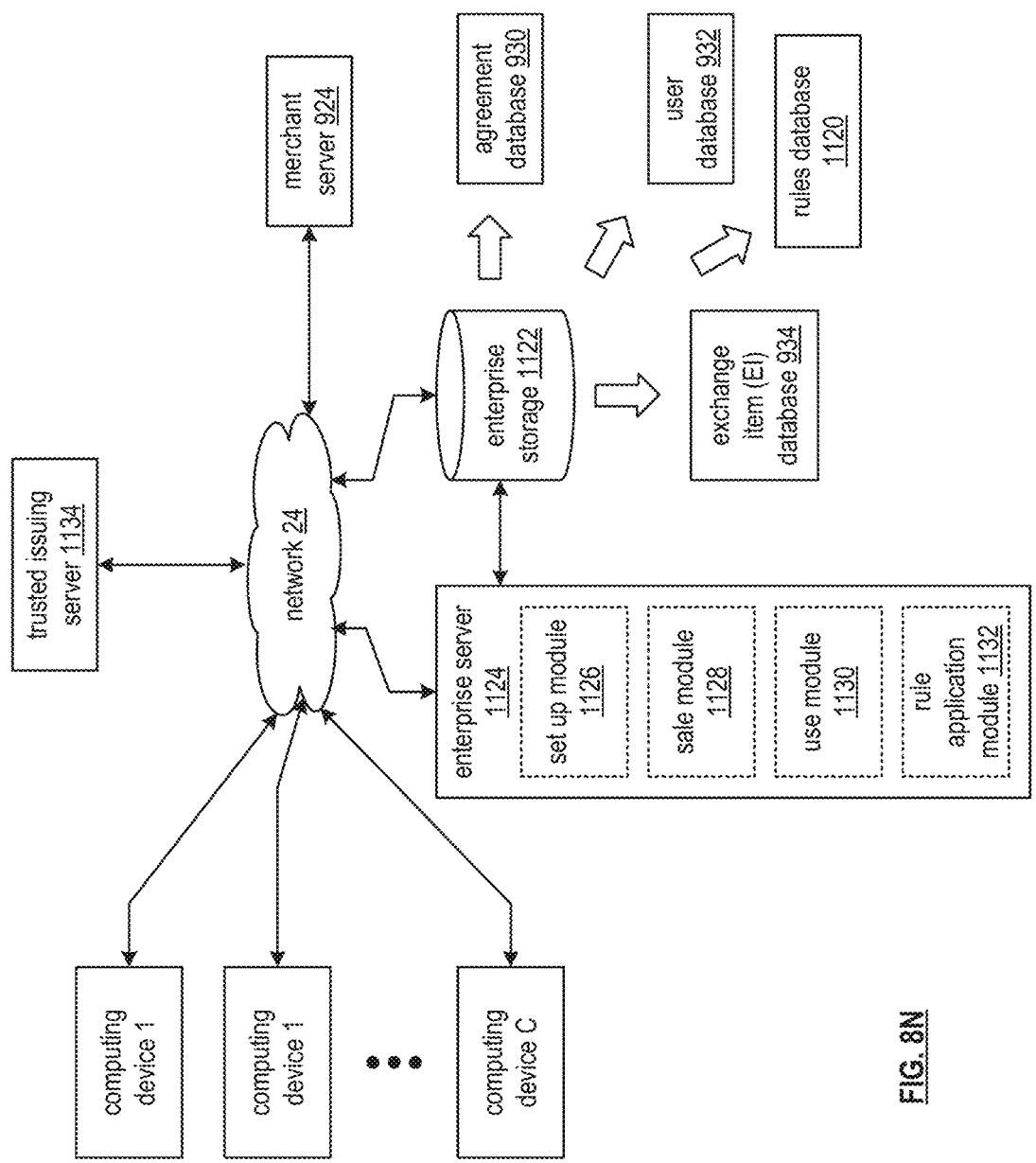
FIG. 8N is a schematic block diagram of another embodiment of an exchange item marketplace network in accordance with the present invention.

FIG. 8N is a schematic block diagram of another embodiment of an exchange item marketplace network (e.g., a data communication system, a network-based virtual exchange item marketplace) that includes the network 24 of FIG. 6, the merchant server 924 of FIG. 6, an enterprise storage 1122, an enterprise server 1124, a trusted issuing server 1134, and a plurality of computing devices 1-C. The trusted issuing server 1134 may be implemented utilizing one or more of a secure server, the exchange item (EI) issuing server 920 of FIG. 6, and the EI trusted module 922 of FIG. 6. The enterprise storage 1122 may be implemented utilizing a plurality of storage servers at a local or distributed level for storing large amounts of data. For example, the enterprise storage 1122 may be implemented utilizing the marketplace database 20 of FIG. 6. The enterprise server 1124 may be implemented utilizing one or more servers for processing large amounts of data. For example, the enterprise server 1124 may be implemented utilizing the marketplace server 18 of FIG. 6. The plurality of computing devices may include one or more of the initial owner computing device 928 of FIG. 6, the EI buyer computing device 926 of FIG. 6, and any other computer that is part of the data communication system.

The enterprise storage 1122 includes one or more of the agreement database 930 of FIG. 6, the user database 932 of FIG. 6, the exchange item database 934 of FIG. 6, and a rules database 1120. The enterprise server 1124 includes a network interface, a memory, and a processing module operably coupled to the network interface into the memory. The network interface may be implemented utilizing the network interface module(s) 78 of FIG. 3. The memory may be implemented utilizing one or more of the main memory 66 of FIG. 3, the memory interface module(s) 80 of FIG. 3, the flash memory 92 of FIG. 3, the HD memory 94 of FIG. 3, the SS memory 96 of FIG. 3, and the cloud memory 98 of FIG. 3. The processing module may be implemented utilizing the processing module 62 of FIG. 3 and may be utilized to implement one or more of a set up module 1126, a sale module 1128, a use module 1130, and a rule application module 1132.

The set up module 1126 functions to initially validate exchange items and create records in the exchange item database 934 for validated exchange items, where each of the exchange items includes data regarding a quantifiable value, a serial number, and issuance information. The sale module 1128 functions to securely transfer a selected exchange item from the first computing device to the second computing device. The use module 1130 functions to securely apply the selected exchange item to a closed loop digital transaction in accordance with an agreement of the agreements database 930. The rule application module 1132 functions to securely modify the data of the selected exchange item in accordance with an applicable set of rules from the rules database 1120. Examples of operation of the enterprise server 1124 are discussed in greater detail below.

The enterprise storage 1122 further functions to store the user database 932, where the user database 932 includes one or more of a user identifier field (e.g., identified person and associated computing devices), an exchange item buying information field; (e.g., which EIs the user buys), and exchange item use information field (e.g., how much, how often, and what types of EIs the user uses), and an exchange item selling information field.

To facilitate offering exchange items for sale, the processing module of the enterprise server 1124 accesses a record in the user database 932 of a user associated with a computing device, accesses one or more of the exchange item database, the agreements database, and the rules database to identify one or more exchange items of interest to the user, and sends, via the network interface, a message to the computing device regarding the one or more exchange items of interest.

When acquiring an exchange item, the computing device of the plurality of computing devices stores a user exchange item database (e.g., a portion of the exchange item database 934 that is pertinent to the user and computing device) that includes one or more of an exchange item identifier field, an issuer identifier field, an exchange item information field, a use options field, a control field, a location field, a status field, and a transaction field. The exchange item database 934 includes one or more records, where each record includes one or more of an exchange item identifier field, an issuer identifier field, a current owner identifier field, an exchange item information field (e.g., value, type, issuance date, expiration date, use parameters), a conditions field (e.g., tracks conditions of an owner regarding potential applicability of rules), a rules identifier field (e.g., identifies one or more applicable rule sets), an offer for sale field (e.g., an indication that current owner is offering the EI for sale, doesn't prohibit current owner from using EI), a use options field (e.g., identifies which merchants will accept the EI as a form of payment, this is determined based on content of the agreement database 930), a control field (e.g., identifies the entity that currently has the right to use or modify the EI), a location field (e.g., identifies the entity that currently has physical possession of the EI, which may be different than the entity that has control, for example, the server may have physical possession and a computing device may have control), a status field (e.g., identify the status of the EI such as active, inactive, valid, questionable validity, exhausted, expired, etc.), and a transaction field (e.g., a record of the transaction history of the EI, built into blockchain). Each field may include sub-fields to accommodate various pieces of information being recorded.

The agreements database includes one or more of an issuer identifier field, an exchange item type field (e.g., identifies the types of EI that are part of the agreement), a recipient entity identifier field (e.g., identifies the entities that will accept the EI as a form of payment), an agreement identifier field (e.g., agreement between issuer and recipient entity on use of EI), and a rules identifier field (e.g., if rules exist for EI, do they apply for use with the recipient, may vary from recipient to recipient). The rules database includes one or more of an issuer identifier field, an exchange item type field (e.g., per issuer), a rule set field (e.g., includes rules for a set of rules: discount, conditions to be met, etc.), and a rules applicability field (e.g., for an EI type, does the rule set apply or not).

When adding a new exchange item to the data communication system, the set up module 1126 establishes establish, via the network interface and the network 24, a secure communication link with the trusted issuing server 1134, where the issuing server 1134 performs one or more of creating the EI to put directly into the exchange item database, providing on-the-fly creation at request of a user or merchant, providing the EI as a location based promotion, and providing the EI as a user based promotion, etc. Having established the link, the set up module 1126 receives, via the network interface and the network 24, the data of the exchange item from the trusted issuing server 1134 in accordance with a secure custody protocol (e.g., utilizing a contract blockchain). Having received the data, the set up module 1126 establishes the enterprise server 1124 as having secure custody of the exchange item (e.g., as a current owner as noted within the contract blockchain). Having established the secure custody, the set up module 1126 creates a record in the exchange item database 934 for the exchange item.

When the exchange item is to be sold to a computing device, the sale module 1128 receives, via the network interface and the network 24, a request to sell a particular exchange item for a first computing device (e.g., computing device 1). Having received the request, the sale module 1128 verifies that the first computing device has secure custody of the particular exchange item in accordance with the secure custody protocol (e.g., verifies a signature of the computing device 1). When the first computing device has secure custody of the particular exchange item, the sale module 1128 verifies the data of the exchange item (e.g., verifies with the trusted issuing server 1134, verifies with the exchange item database 934, verifies a signature over the data). When the data of the exchange item is verified, the sale module 1128 adds an offer for sale digital record for the particular exchange item in the network-based virtual exchange item marketplace (e.g., indicates for sale in the exchange item database 934).

When the exchange item is to be sold from the first computing device to the second computing device, the sale module 1128 receives, via the network interface and the network 24, a request to purchase a particular exchange item from the second computing device (e.g., computing device 2) and authenticates the second computing device. When the second computing device is authenticated, the sale module 1128 transfers secure custody of the particular exchange item from the first computing device to the second computing device in accordance with the secure custody protocol (e.g., facilitates modification of the contract blockchain to indicate that the computing device 2 is the new owner), and removes the offer for sale digital record for the particular exchange item from the network-based virtual exchange item marketplace (e.g., updates the exchange item database 934).

When a computing device (e.g., computing device 2) utilizes an exchange item in a purchase transaction (e.g., a closed loop digital transaction), the use module 1130 receives, via the network interface and the network 24 from a computing device, a request to use the exchange item in a particular closed loop digital transaction with a recipient entity server (e.g., the merchant server 924). Having received the request, the use module 1130 accesses the agreements database 930 to determine whether an agreement exists between an issuing server (e.g., the trusted issuing server 1134) of the particular exchange item and the recipient entity server. When the agreement exists, the use module 1130 determines whether the particular closed loop digital transaction is in accordance with the agreement (e.g., user is allowed, the particular type of transaction is allowed, rules and conditions apply, etc.). When the particular closed loop digital transaction is in accordance with the agreement, the use module 1130 authorizes the particular closed loop transaction. When the agreement does not exist or the particular closed loop digital transaction is not in accordance with the agreement, use module 1130 denies the particular closed loop transaction.

From time to time, the rule application module 1132 considers modifying the data of the exchange item (e.g., based on one or more of interpreting a schedule, receiving a request, detecting a change in a condition). When considering the modifying of the data, the rule application module 1132 obtains condition information of a computing device having secure custody of a particular exchange item (e.g., condition from user profile and history provides the condition information, physical location, environmental conditions, etc.). The obtaining includes one or more of identifying a condition source, interpreting condition data from the identified condition source, receiving the condition information, performing a lookup, and generating the condition information based on condition data.

Having obtained the condition information, the rule application module 1132 accesses rules of the applicable set of rules associated with the particular exchange item from the rules database 1120. Having accessed the rules, the rule application module 1132 compares the condition information with the rules of the applicable set of rules. When the condition information compares favorably with the rules of the applicable set of rules, the rule application module 1132 obtains secure custody of the particular exchange item from the computing device in accordance with the secure custody protocol (e.g., physically take custody by a data transfer or update the exchange item database 934 to indicate that the enterprise server 1124 has secure custody). While having secure custody, the rule application module 1132 modifies the data of the particular exchange item in accordance with the rules of the application set of rules to produce a modified exchange item and transfers secure custody of the modified exchange item to the computing device.

Figure 8P:
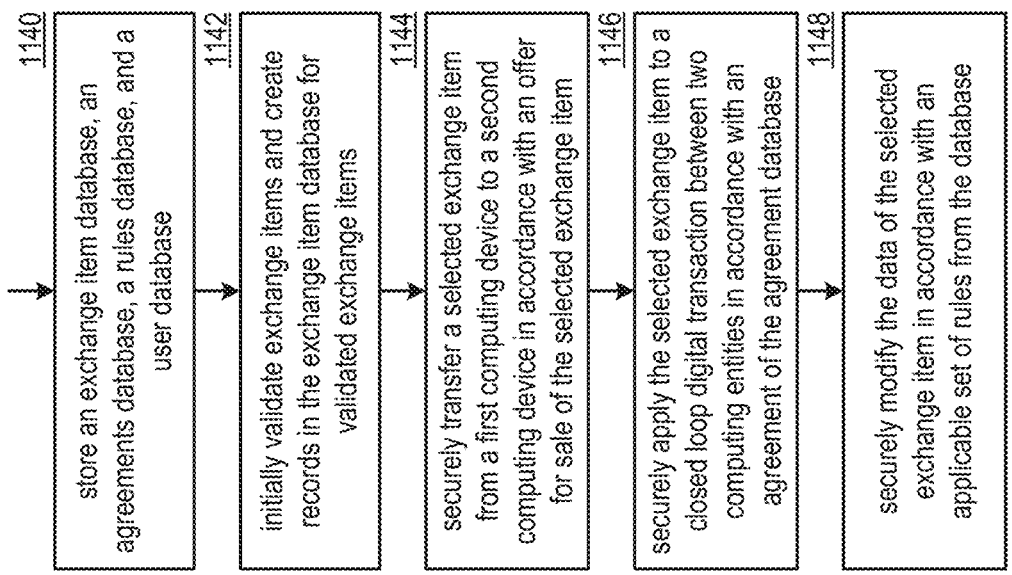
FIG. 8P is a logic diagram of an embodiment of a method for securely processing an exchange item in an exchange item marketplace network in accordance with the present invention.

FIG. 8P is a logic diagram of an embodiment of another method for securely processing an exchange item in an exchange item marketplace network. In particular, a method is presented for use in conjunction with one or more functions and features described in conjunction with FIGS. 1-7E, 8A-N, and also FIG. 8P. The method includes step 1140 where a processing module (e.g., of an enterprise server of a data communication system) stores an exchange item database, an agreements database, and a rules database in an enterprise storage. The storing may further include storing a user database in the enterprise storage and accessing a record in the user database of a user associated with a computing device of a plurality of computing devices. The storing may yet further include accessing a record in the user database of a user associated with a computing device, accessing one or more of the exchange item database, the agreements database, and the rules database to identify one or more exchange items of interest to the user, and sending a message to the computing device regarding the one or more exchange items of interest. The storing may still further include storing, by the computing device of the plurality of computing devices, a user exchange item database (e.g., a portion of the user database).

The method continues at step 1142 where the processing module initially validates exchange items and creates records in the exchange item database for validated exchange items, where each of the exchange items includes data regarding a quantifiable value, a serial number, and issuance information. The initially validating the exchange items and creating records in the exchange further includes establishing a secure communication link with a trusted issuing server, receiving the data of an exchange item from the issuing server in accordance with a secure custody protocol, establishing the enterprise server as having secure custody of the exchange item, and creating a record in the exchange item database for the exchange item.

The method continues to step 1144 where the processing module securely transfers a selected exchange item from a first computing device to a second computing device in accordance with an offer for sale of the selected exchange item. The secure transferring of the selected exchange item from the first computing device to the second computing device in accordance with the offer for sale of the selected exchange item further includes a variety of approaches. In a first approach, the processing module receives a request to sell the selected exchange item from the first computing device, and verifies that the first computing device has secure custody of the particular exchange item in accordance with a secure custody protocol. When the first computing device has secure custody of the particular exchange item, the processing module verifies the data of the exchange item. When the data of the exchange item is verified, the processing module adds an offer for sale digital record for the particular exchange item in a network-based virtual exchange item marketplace (e.g., an exchange item database).

In a second approach to the securely transferring the selected exchange item from the first computing device to the second computing device in accordance with the offer for sale of the selected exchange item, the processing module receives a request to purchase a particular exchange item from the second computing device, and authenticates the second computing device. When the second computing device is authenticated, the processing module transfers secure custody of the particular exchange item from a first computing device to the second computing device in accordance with a secure custody protocol and removes an offer for sale digital record for the particular exchange item from the network-based virtual exchange item marketplace (e.g., from the exchange item database).

The method continues at step 1146 where the processing module securely applies the selected exchange item to a closed loop digital transaction between two computing entities (e.g., computing device or server) in accordance with an agreement of the agreements database. The securely applying the selected exchange item to the closed loop digital transaction further includes receiving, from a computing device, a request to use an exchange item in a particular closed loop digital transaction with a recipient entity server, and accessing the agreements database to determine whether an agreement exists between an issuing server of the particular exchange item and the recipient entity server. When the agreement exists, the processing module determines whether the particular closed loop digital transaction is in accordance with the agreement. When the particular closed loop digital transaction is in accordance with the agreement, the processing module authorizes the particular closed loop transaction. When the agreement does not exist or the particular closed loop digital transaction is not in accordance with the agreement, the processing module denies the particular closed loop transaction.

The method continues at step 1148 where the processing module securely modifies the data of the selected exchange item in accordance with an applicable set of rules from the rules database. The securely modifying of the data of the selected exchange item further includes obtaining condition information of a computing device having secure custody of a particular exchange item, accessing rules of the applicable set of rules associated with the particular exchange item from the rules database, and comparing the condition information with the rules of the applicable set of rules. When the condition information compares favorably with the rules of the applicable set of rules, the processing module obtains secure custody of the particular exchange item from the computing device in accordance with secure custody protocol. While having secure custody, the processing module modifies the data of the particular exchange item in accordance with the rules of the application set of rules to produce a modified exchange item and transfers secure custody of the modified exchange item to the computing device.

The method described above in conjunction with the processing can alternatively be performed by other modules of the exchange item marketplace network or by other devices. In addition, at least one memory section (e.g., a computer readable memory, a non-transitory computer readable storage medium organized into a first memory section, a second memory section, a third memory section, a fourth memory section, a fifth memory section etc.) that stores operational instructions can, when executed by one or more processing modules of one or more computing devices (e.g., one or more servers) of the exchange item marketplace network, cause the one or more computing devices to perform any or all of the method steps described above.

FIGS. 9A-B are schematic block diagrams of another embodiment of an exchange item marketplace network that includes the exchange item (EI) issuing server 920 of FIG. 6, the EI trusted module 922 of FIG. 6, the EI buyer computing device 926 of FIG. 6, the point-of-sale (POS) equipment 32 of FIG. 1, the merchant server 924 of FIG. 6, the marketplace server 18 of FIG. 6, and the marketplace database 20 of FIG. 6. The EI buyer computing device 926 includes the digital wallet 944 of FIG. 6. Hereafter, the EI buyer computing device 926 may be interchangeably referred to as a user computing device. The marketplace server 18 includes the set up processing 936 of FIG. 6 and the use processing 940 of FIG. 6. The marketplace server 18 further includes a network interface (e.g., the network interface module 78 of FIG. 3), a memory (e.g., the main memory 66 of FIG. 3), and a processing module (e.g., the processing module 62 of FIG. 3). Hereafter the exchange item marketplace network may be interchangeable referred to as a data communication system. The data communication system functions to authorize exchange item redemption within the exchange item marketplace network.

FIG. 9A illustrates an example of the authorizing of the exchange item redemption where the set up processing 936 receives EI information 950 from the EI issuing server 920 to establish an exchange item within the marketplace. The receiving may be in response to a new exchange item establishment request and/or in response to an initial owner computing device facilitating sale of the exchange item via the marketplace. The receiving may further include the EI issuing server 920 and the EI trusted module 922 exchanging trust information 954 and the EI trusted module 922 exchanging set up verification 956 with the set up processing 936 to complete verification of the exchange item.

The EI information 950 includes an exchange item serial number as originally issued by at least one of the brand server 26 of FIG. 1, the processor server 28 of FIG. 1, and the distributor server 30 of FIG. 1. The exchange item serial number includes a static portion and a dynamic portion, where all bits of the serial number are static portion bits when there are no dynamic portion bits when each bit of the serial number may be either a static portion bits or a dynamic portion bit. A static portion bit is intended not to change over a time frame of utilization of the exchange item where a dynamic portion bit may change from time to time.

Having received the EI info 950, the set up processing 936 of the marketplace server 18 establishes one or more security parameters (e.g., hereafter interchangeably referred to as EI security parameters 1290 or security parameters) for the exchange item, where the exchange item includes an exchange item data file having a quantifiable value, a serial number (e.g., a static identifier), and issuance information (e.g., issuer identity, an issuance date, an expiration time frame, EI rules, use parameters). The one or more security parameters includes one or more of a secret key, a time interval truncation function (i.e., interchangeably referred to as a time interval increment), a generator algorithm identifier (ID) to identify one of a plurality of generator algorithms, and an arithmetic algorithm identifier (i.e., interchangeably referred to as a combiner algorithm ID) to identify one or more of a plurality of arithmetic algorithms (e.g., logical and/or mathematical functions). The establishing may be based on one or more of a predetermination, system registry information, a security requirement, and a request. The generating of the EI security parameters 1290 includes one or more of generating the secret key (e.g., anonymously in a random fashion as a shared key, subsequently in conjunction with the EI buyer computing device 926 utilizing a Diffie Hellman approach), selecting the time interval truncation function (e.g., truncate time to within 1 minute), selecting the generator algorithm ID, and selecting the combiner algorithm ID.

The establishing may further include the set up processing 936 of the marketplace server 18 receiving the exchange item data file (i.e., EI information 950) from the issuing server 920 of the data communication system. The receiving may include the EI issuing server 920 utilizing a first level of secure communication regarding the exchange item (e.g., secure link, trusted certificates, first level encryption using a public-private key pair after exchanging public keys). Alternatively, the receiving may include the set up processing 936 receiving the EI information 950 from an initial owner computing device (e.g., the initial owner computing device offers the exchange item for sale via the exchange item marketplace).

Having generated the EI security parameters 1290, the set up processing 936 stores the EI information 950 and the EI security parameters 1290 in the marketplace database 20. Having performed the storing, when the exchange item is purchased by the EI buyer computing device 926, the marketplace server 18 securely provides the one or more security parameters to the user computing device of the data communication system. For example, the set up processing 936 sends the EI information 950 and the EI security parameters 1290 to the EI buyer computing device 926 for storage in the digital wallet 944 for a subsequent EI redemption operation. For instance, the set up processing 936 identifies the EI purchase (e.g., a request from the EI buyer computing device 926 that identifies the static EI serial number), accesses the marketplace database 20 based on the static EI serial number, retrieves the associated EI information 950 and the EI security parameters 1290, and transmits the EI information 950 and the EI security parameters 1290 to the EI buyer computing device 926. Alternatively, the EI security parameters 1290 include parameters to establish the secret key between the set up processing 936 and the EI buyer computing device 926 utilizing an industry approach (e.g., Diffie Hellman approach) such that the secret key is not directly communicated between the marketplace server 18 and the EI buyer computing device 926.

FIG. 9B further illustrates the example of the authorizing of the exchange item redemption where, when the EI buyer computing device 926 desires to use the exchange item, the EI buyer computing device 926 generates first dynamically secure exchange item data using a dynamic securing function having inputs that include a user time value, the one or more security parameters, and one or more aspects of a copy of the exchange item data file in the possession of the user computing device (e.g., when the one or more aspects of the copy of the exchange item data file are held by the user computing device). The one or more aspects of the exchange item data file comprises one more of an exchange item identifier (i.e., a static serial number), issuer identity, an issuance date, an expiration time frame, exchange item rules and exchange item use parameters.

The generating the first dynamically secure exchange item data includes executing, as part of the dynamic securing function, a generator function of a plurality of generator algorithms on the user time value and the one or more security parameters to produce an intermediate resultant (e.g., a number, a value, a code, etc.) and executing an arithmetic function of a plurality of arithmetic functions on the intermediate resultant and the one or more aspects of the copy of the exchange item data file to produce the first dynamically secure exchange item data. (e.g., any type of arithmetic and/or function—add, subtract, combine, append, aggregate, truncate, etc.). The generating of the first dynamically secure exchange item data is discussed in greater detail with reference to FIG. 9C.

The generating the first dynamically secure exchange item data may alternatively include executing, as part of the dynamic securing function, a generator function of the plurality of generator algorithms on the user time value (e.g., a local time kept by the EI buyer computing device 926 which may be synchronized with a common time source) and the one or more security parameters to produce an intermediate resultant; executing a first arithmetic function of a plurality of arithmetic functions on the intermediate resultant and a first aspect of the one or more aspects of the copy of the exchange item data file to produce first partial dynamically secure exchange item data; executing a second arithmetic function of the plurality of arithmetic functions on the intermediate resultant and a second aspect of the one or more aspects of the copy of the exchange item data file to produce second partial dynamically secure exchange item data; and executing a third arithmetic function of a plurality of arithmetic functions on the first and second partial dynamically secure exchange item data to produce the first dynamically secure exchange item data.

Having generated the first dynamically secure exchange item data, the EI buyer computing device 926 sends the first dynamically secure exchange item data (e.g., dynamic EI information 1292) to the marketplace server 18. The market place server 18 receives the first dynamically secure exchange item data from the user computing device. For example, when the EI buyer computing device 926 redeems the EI, the use processing 940 receives merchant use information 980 (i.e., redemption transaction information, a merchant ID, a brand ID) and the dynamic EI information 1292 (e.g., may be considered as a secure version of the EI info received from the merchant server 924 via the POS equipment 32), where the EI buyer computing device 926 generates the dynamic EI information 1292 based on the EI information 950 utilizing the EI security parameters 1290, where the EI buyer computing device 926 generates buyer use information 976 (e.g., redemption transaction information: purchase amount, identifier of an item purchased, etc.), and where the merchant server 924 issues the merchant use information 980 to the use processing 940 based on the buyer use information 976 received from the EI buyer computing device 926 via the POS equipment 32 (e.g., received via one or more of magnetic stripe, security chip, QR code, barcode, 3-D barcode, manual entry, etc.).

Having received the first dynamically secure exchange item data, the marketplace server generates second dynamically secure exchange item data using the dynamic securing function having inputs that includes a marketplace time value (e.g., a local time kept by the marketplace server 18 which may be synchronized with the common time source), the one or more security parameters, and one or more aspects of the exchange item data file. The generating of the second dynamically secure exchange item data includes executing, as part of the dynamic securing function, the generator function of the plurality of generator algorithms on the marketplace time value and the one or more security parameters to produce an intermediate resultant and executing the arithmetic function of the plurality of arithmetic functions on the intermediate resultant and the one or more aspects of the exchange item data file to produce the second dynamically secure exchange item data.

As an example of the generating of the second dynamically secure exchange item data, the use processing 940 retrieves the EI information 950 and the EI security parameters 1290 from the marketplace database 20 and generates the second dynamically secure exchange item data based on the retrieved EI information 950 and the EI security parameter 1290. Having generated the second dynamically secure exchange item data, the marketplace server compares the first dynamically secure exchange item data with the second dynamically secure exchange item data (e.g., compares a received dynamic identifier to a locally generated dynamic identifier of the exchange item). When the first dynamically secure exchange item data substantially matches the second dynamically secure exchange item data, the marketplace server authorizes the use of the exchange item by the user computing device. For example, the use processing 940 indicates that the use of the exchange item by the user computing device is authorized when the received dynamic ID substantially matches the locally generated dynamic ID.

The use processing 940 may further verify the redemption of the EI. For example, the use processing 940 retrieves the EI serial number from the EI information 950 (i.e., from the marketplace database 20), issues a supplemental use verification request 1294 (i.e., EI info, redemption transaction info) to the EI issuing server 920 that includes the EI information 950 and the information of the redemption (e.g., merchant use information 980), where the EI issuing server 920 exchanges trust information 954 with the EI trusted module 922, and interprets a received supplemental use verification response 1296 (i.e., EI info, redemption transaction info, approval status: yes/no) to produce a further indication of authorization (i.e., indicate favorable authorization when the response is favorable, such as when the EI trusted module 922 and/or the EI issuing server 920 verify that a remaining balance of the exchange item (e.g., based on the static portion of the EI serial number) is sufficient to provide payment for a purchase associated with the redemption of the exchange item).

FIG. 9C is a schematic block diagram of an embodiment of the use processing of FIGS. 9A-B that includes a dynamic number generator 1298 and a combiner 1300 to generate the locally generated dynamic EI information (i.e., the second dynamically secure exchange item data). Alternatively, or in addition to, the use processing 940 may be implemented with a processing module of the EI buyer computing device 926 to generate the dynamic EI information 1292 (i.e., the first dynamically secure exchange item data). The use processing receives the EI information 950, a time 1302 (e.g., real-time), and the EI security parameters 1290 to produce the dynamic EI information. The dynamic number generator 1298 and the combiner 1300 may be implemented utilizing one or more of the processing module 62 of FIG. 2, the computing core 52 of FIG. 2, and the computing core 122 of FIG. 3.

In an example of operation of the generating of the dynamic EI information, the dynamic number generator 1298 applies one or more deterministic functions (e.g., a hash based message authentication code (HMAC), a sponge function, a hashing function, a signature function, a cyclic redundancy check (CRC), a checksum function, and a mask generating function (MGF) in accordance with the generator algorithm ID 1308 (e.g., to select which deterministic function(s)) to the time 1302 (e.g., real-time) in accordance with a time interval increment 1306 (i.e., a time truncation interval of 30 seconds) utilizing a secret key 1304 to produce a dynamic EI number portion 1314. For example, the dynamic number generator 1298 selects the HMAC based on the generator algorithm ID 1308, represents the time 1302 within a 30 second interval (i.e., xx:xx:00 or xx:xx:30) when the time interval increment 1306 indicates 30 second intervals, and applies the HMAC function to the represented time utilizing the secret key 1304 to produce an HMAC function output as the dynamic EI number portion 1314.

With the dynamic EI number portion 1314 produced, the combiner combines the dynamic EI and a portion of the EI information 950 (i.e., a static EI number portion 1312 of the EI information 950 in accordance with a combiner algorithm ID 1310 (i.e., arithmetic function) of the EI security parameters 1290) to produce the dynamic EI information 1292. As such, the dynamic EI information produces a secure version of the EI serial number, where a portion of the secure version may include static bits of the static EI number portion 1312 and dynamic bits of the dynamic EI number portion 1314 in accordance with the combiner algorithm ID 1310. For instance, the combiner algorithm ID indicates which bits are to be utilized for static bits and which bits are to be utilized for dynamic bits. Alternatively, or in addition to, the combiner 1300 may utilize one or more other variables to produce the static and dynamic bits, where the one or more other variables includes one or more of the time 1302, the secret key 1304, the time interval increment 1306, and the generator algorithm ID 1308. The combiner 1300 may replace static bits of the EI serial number with dynamic bits including replacement of most significant bits, middle bits, we significant bits, random bits, a combination, a personal identification (PIN) portion, etc. For example, the combiner 1300 utilizes most significant bits associated with 10 most significant numbers of the EI serial number and least significant bits of the dynamic EI number portion 1314 to generate 6 least significant numbers of the EI serial number to produce a 16-digit secure version of the EI serial number as the first or second dynamically secure exchange item data.

FIG. 9D is a logic diagram of an embodiment of a method for authorizing exchange item redemption in an exchange item marketplace network. In particular, a method is presented for use in conjunction with one or more functions and features described in conjunction with FIGS. 1-8P, 9A-C, and also FIG. 9D. The method includes step 1320 where a marketplace server of a data communication system establishes one or more security parameters for an exchange item, where the exchange item includes an exchange item data file having a quantifiable value, a serial number, and issuance information. The establishing may further include one or more of the marketplace server receiving the exchange item data file from an issuing server of the data communication system, the marketplace server receiving the exchange item data file from an initial owner computing device, and the marketplace server generating the one or more security parameters for the exchange item in response to detection of fraudulent acquisition of the exchange item (i.e., by an initial owner computing device with a stolen credit card), where the marketplace server initiates replacement of the exchange item (i.e., for a user computing device). Such replacement of the exchange item is discussed in greater detail with reference to FIGS. 10A-10C.

The method continues at step 1322 where the marketplace server securely provides the one or more security parameters to the user computing device of the data communication system. For example, the marketplace server provides the one or more security parameters to the user computing device when the user computing device purchases the exchange item.

When the user computing device desires to use the exchange item, the method continues at step 1324 where the user computing device generates first dynamically secure exchange item data using a dynamic securing function having inputs that include a user time value, the one or more security parameters, and one or more aspects of a copy of the exchange item data file in the possession of the user computing device (e.g., when the one or more aspects of the copy of the exchange item data file are held by the user computing device). The generating the first dynamically secure exchange item data includes executing, as part of the dynamic securing function, a generator function of a plurality of generator algorithms on the user time value and the one or more security parameters to produce an intermediate resultant. For example, the user computing device performs a hash based message authentication code on the user time value in accordance with a time truncation interval (i.e., 1 minute intervals) utilizing a secret key of the one or more security parameters to produce the intermediate resultant. The generating further includes executing an arithmetic function of a plurality of arithmetic functions on the intermediate resultant and the one or more aspects of the copy of the exchange item data file to produce the first dynamically secure exchange item data. For example, the user computing device replaces a most significant 10 bits of a static exchange item identifier of the one or more aspects of the copy of the exchange item data file with a most significant 10 bits of the intermediate resultant to produce the first dynamically secure exchange item data.

The generating the first dynamically secure exchange item data may alternatively include executing, as part of the dynamic securing function, a generator function of the plurality of generator algorithms on the user time value and the one or more security parameters to produce an intermediate resultant; executing a first arithmetic function of the plurality of arithmetic functions on the intermediate resultant and a first aspect of the one or more aspects of the copy of the exchange item data file to produce first partial dynamically secure exchange item data; executing a second arithmetic function of the plurality of arithmetic functions on the intermediate resultant and a second aspect of the one or more aspects of the copy of the exchange item data file to produce second partial dynamically secure exchange item data; and executing a third arithmetic function of the plurality of arithmetic functions on the first and second partial dynamically secure exchange item data to produce the first dynamically secure exchange item data.

For instance, the user computing device performs the hash based message authentication code function on the user time value utilizing the secret key of the one or more security parameters to produce the intermediate resultant; replaces a most significant 8 bits of the static exchange item serial number with a most significant 8 bits of the intermediate resultant to produce the first partially dynamically secure exchange item data; replaces a least significant 3 bits of a remaining balance indicator of the one or more aspects of the copy of the exchange item data file to produce the second partial dynamically secure exchange item data and combines the first and second partial dynamically secure exchange item data to produce the first dynamically secure exchange item data, where the first dynamically secure exchange item data includes 8 bits of the static exchange item serial number, 3 bits of the static exchange item serial number, and 3 bits of the remaining balance.

The method continues at step 1326 where the marketplace server receives the first dynamically secure exchange item data from the user computing device. For example, the user computing device issues an exchange item redemption request to the marketplace server, where the request includes the first dynamically secure exchange item data.

The method continues at step 1328 where the marketplace server generates second dynamically secure exchange item data using the dynamic securing function having inputs that includes a marketplace time value, the one or more security parameters, and the one or more aspects of the exchange item data file. The generating of the second dynamically secure exchange item data includes executing, as part of the dynamic securing function, a generator function of the plurality of generator algorithms on marketplace time value and the one or more security parameters to produce an intermediate resultant and executing an arithmetic function of a plurality of arithmetic functions on the intermediate resultant and the one or more aspects of the exchange item data file to produce the second dynamically secure exchange item data.

The method continues at step 1330 where the marketplace server compares the first dynamically secure exchange item data with the second dynamically secure exchange item data. For example, the marketplace server determines whether the received dynamic identifier from the user computing device substantially matches the locally generated dynamic identifier.

When the first dynamically secure exchange item data substantially matches the second dynamically secure exchange item data, the method continues at step 1332 where the marketplace server authorizes the use of the exchange item by the user computing device. For example, the marketplace server indicates that the use of the exchange item by the user computing device is authorized when the received dynamic identifier from the user computing device substantially matches the locally generated dynamic identifier.

The method described above in conjunction with the marketplace server, the issuing server, and the user computing device can alternatively be performed by other modules of the exchange item marketplace network or by other devices. In addition, at least one memory section (e.g., a computer readable memory, a non-transitory computer readable storage medium organized into a first memory element, a second memory element, a third memory element, a fourth element section, a fifth memory element etc.) that stores operational instructions can, when executed by one or more processing modules of one or more computing devices (e.g., one or more servers) of the exchange item marketplace network, cause the one or more computing devices to perform any or all of the method steps described above.

FIGS. 10A-B are schematic block diagrams of another embodiment of an exchange item marketplace network that includes the exchange item (EI) issuing server 920 of FIG. 6, the EI trusted module 922 of FIG. 6, the EI buyer computing device 926 of FIG. 6, the point-of-sale (POS) equipment 32 of FIG. 1, the merchant server 924 of FIG. 6, the marketplace server 18 of FIG. 6, and the marketplace database 20 of FIG. 6. The EI buyer computing device 926 includes the digital wallet 944 of FIG. 6. Hereafter, the EI buyer computing device 926 may be interchangeably referred to as a user computing device. The marketplace server 18 includes the set up processing 936 of FIG. 6 and the use processing 940 of FIG. 6. The marketplace server 18 further includes a network interface (e.g., the network interface module 78 of FIG. 3), a memory (e.g., the main memory 66 of FIG. 3), and a processing module (e.g., the processing module 62 of FIG. 3). Hereafter the exchange item marketplace network may be interchangeable referred to as a data communication system. The data communication system functions to abate fraudulent exchange item acquisition in the exchange item marketplace network.

FIG. 10A illustrates an example of the abating of the fraudulent exchange item acquisition where, when the EI buyer computing device 926 initiates redemption of an exchange item held by the EI buyer computing device (e.g., previously purchased from the marketplace, where an initial owner computing device fraudulently obtained a statically identified exchange item and utilized the marketplace to sell the fraudulently obtained exchange item to the EI buyer computing device) in accordance with a dynamic exchange item identifier, the use processing 940 receives an indication of the redemption initiation. For example, the use processing 940 receives merchant use information (info) 980 from the merchant server 924, where the merchant use information 980 includes an identifier of the exchange item, where the merchant server 924 receives buyer use information 976 from the EI buyer computing device 926 via the POS equipment 32, where the buyer use information 976 includes the exchange item identifier, where the EI buyer computing device 926 issues the buyer use information 976 upon initiation of the redemption, and where the EI identifier includes one or more of a static identifier and a dynamic identifier of the exchange item.

Having received the merchant use information 980, the use processing 940 determines that the exchange item was fraudulently obtained by the initial owner computing device. The determining includes one or more of receiving an invalid EI indicator 1340, interpreting the EI info 950 from the marketplace database 20, and forwarding the invalid EI indicator 1340 to the EI buyer computing device 926 (i.e., directly or via the merchant server 924 and POS equipment 32).

FIG. 10B further illustrates the example of the abating of the fraudulent exchange item acquisition where, when the EI was fraudulently obtained by the initial owner computing device (e.g., or otherwise associated with fraudulent obtaining), the set up processing 936 receives replacement EI information 1342 from the EI issuing server 920 to reestablish the exchange item within the marketplace. The receiving may be in response to a replacement exchange item request issued by the set up processing 936. The replacement EI information 1342 includes one or more of a new static exchange item serial number generated by the EI issuing server 920 or another entity associated with the marketplace (e.g., the processor server 28 of FIG. 1).

Having received the replacement EI info 1342, the set up processing 936 issues EI security parameters 1290 the replacement exchange item to the EI buyer computing device 926. The issuing includes generating the EI security parameters 1290. The generating includes one or more of generating a new secret key, generating a new time interval increment (i.e., truncation time interval), generator algorithm identifier, and/or combiner algorithm identifier. The issuing further includes sending the replacement EI info 1342 and the EI security parameters 1290 to the EI buyer computing device 926 and storing the replacement EI info 1342 and the EI security parameters 1290 in the marketplace database 20. Alternatively, the set up processing 936 sends one or more of the replacement EI information 1342, the EI security parameters 1290, and a valid redemption indicator to the merchant server 924 to indicate that the redemption is valid.

When the EI buyer computing device 926 indicates to continue to redeem the replacement exchange item, the use processing 940 receives dynamic EI information 1292 from the EI buyer computing device 926 (e.g., via the POS equipment 32 and the merchant server 924), where the EI buyer computing device 926 regenerates the dynamic EI information 1292 based on the replacement exchange item information 1342 utilizing the updated EI security parameters 1290. Having received the dynamic EI info 1292, the use processing 940 verifies the dynamic EI information 1292 to produce authorization information. The verifying includes comparing the received dynamic EI information 1292 to locally generated dynamic EI information and indicating favorable authorization when the comparison is favorable (i.e., a dynamic EI serial number matches). For example, the use processing 940 retrieves the replacement EI information 1342 and the updated EI security parameters 1290 from the marketplace database 20, and generates the locally generated dynamic EI information based on the retrieved replacement EI information 1342 and the retrieved updated EI security parameters 1290.

FIG. 10C is a logic diagram of an embodiment of a method for abating fraudulent exchange item acquisition in an exchange item marketplace network. The method includes step 1360 where, when a computing device initiates redemption of an exchange item, a processing module (e.g., of a marketplace server) receives an indication of the redemption initiation. For example, the processing module receives an exchange item identifier, where the exchange item identifier includes one or more of a static identifier and a dynamic identifier of the exchange item.

The method continues at step 1362 where the processing module determines that the exchange item was fraudulently obtained by an initial owner. The determining includes one or more of receiving an invalid EI indicator (e.g., the initial owner utilized a stolen credit card to obtain the EI), interpreting EI information from a marketplace database, and forwarding the invalid EI indicator to the computing device.

The method continues at step 1364 where the processing module receives replacement EI information. The receiving may be in response to a replacement EI request to an issuing server (e.g., a brand server). The method continues at step 1366 where the processing module issues updated EI security parameters for the replacement exchange item to the computing device. The issuing includes generating one or more of a new secret key, a new time truncation interval, a new generator algorithm, a new arithmetic function; sending the replacement EI information and updated EI security parameters to the computing device; and storing the replacement EI information and the updated EI security parameters in the marketplace database.

The method continues at step 1368 where the processing module receives dynamic EI information from the computing device. For example, when the computing device indicates to continue to redeem the replacement EI, the processing module receives dynamic EI information from the computing device, where the computing device generates the dynamic EI information based on the replacement EI information utilizing the updated EI security parameters. The method continues at step 1370 where the processing module verifies the dynamic EI information to produce authorization information. For example, the processing module compares the received dynamic EI information to locally generated dynamic EI information and indicates favorable authorization when the comparison is favorable (i.e., a dynamic EI serial number matches), where the comparing includes retrieving the replacement EI information and updated EI security parameters from the marketplace database and generating the locally generated dynamic EI information based on the retrieved replacement EI information and updated EI security parameters.

The method described above in conjunction with the marketplace server, the issuing server, and the user computing device can alternatively be performed by other modules of the exchange item marketplace network or by other devices. In addition, at least one memory section (e.g., a computer readable memory, a non-transitory computer readable storage medium organized into a first memory element, a second memory element, a third memory element, a fourth element section, a fifth memory element etc.) that stores operational instructions can, when executed by one or more processing modules of one or more computing devices (e.g., one or more servers) of the exchange item marketplace network, cause the one or more computing devices to perform any or all of the method steps described above.

FIG. 11A is a schematic block diagram of another embodiment of an exchange item marketplace network that includes the exchange item (EI) issuing server 920 of FIG. 6, the EI trusted module 922 of FIG. 6, the EI buyer computing device 926 of FIG. 6, the point-of-sale (POS) equipment 32 of FIG. 1, the merchant server 924 of FIG. 6, the marketplace server 18 of FIG. 6, the marketplace database 20 of FIG. 6, the initial owner computing device 928 of FIG. 6, and another computing device 1400. The other computing device 1400 may be implemented utilizing one or more of another EI buyer computing device 926. The EI buyer computing device 926 includes the digital wallet 944 of FIG. 6. The marketplace server 18 includes the set up processing 936 of FIG. 6 and the use processing 940 of FIG. 6. Hereafter, the EI buyer computing device 926 may be interchangeably referred to as a user computing device. Hereafter the exchange item marketplace network may be interchangeable referred to as a data communication system. The data communication system functions to detect fraudulent exchange item redemption in the exchange item marketplace network.

In an example of operation of the detecting of the fraudulent exchange item redemption, the set up processing 936 obtains EI information (info) 950 for an EI to offered for sale in the marketplace, where the EI info 950 includes a static EI identifier (ID). The static EI ID includes a static EI serial number derived from an issuer and/or a processor. The obtaining includes one or more of extracting the EI info from sale information 966 exchanged with the initial owner computing device 928 facilitating the sale and receiving the EI info from the EI issuing server 920 in response to a new EI establishment request.

When the EI is purchased by the EI buyer computing device 926, the set up processing 936 issues the EI info 950 and EI security parameters 1290 to the EI buyer computing device 926. The issuing includes the set up processing 936 generating the EI security parameters for the EI in accordance with a dynamic EI ID approach and sending the EI info 950 and the EI security parameters 1290 to the EI buyer computing device 926. The set up processing 936 stores the EI info 950 and the EI security parameters 1290 in the marketplace database 20, indicating that the static EI ID is disabled when utilizing the dynamic EI ID approach.

When these processing 940 receives merchant use information 980 associated with an EI redemption request (e.g., a balance check request, a full redemption request, a partial redemption request, etc.), the use processing 940 determines whether the merchant use information 980 is valid. The determining includes one or more of receiving EI info 950 from one or more of the initial owner computing device 928 and the other computing device 1400, where the EI info 950 includes the static EI ID (e.g., does not include a dynamic EI ID), and indicating invalid when a retrieved portion of the marketplace database 20 indicates that the static EI ID is disabled (e.g., only the dynamic EI ID is allowed).

When the merchant use information 980 is invalid, the use processing 940 denies the EI redemption request. The denying includes one or more of issuing a denial response to a requesting entity, and sending a security alert to one or more of the EI issuing server 920, the EI buyer computing device 926, and the merchant server 924, where the canal response indicates that at least one of the initial owner computing device 928 and the other computing device 1400 attempted to utilize the static ID based EI, where the initial owner computing device 928 may have attempted to fraudulently sell the EI directly to the other computing device 1400 after selling the EI through the marketplace to the EI buyer computing device 928.

FIG. 11B is a logic diagram of an embodiment of a method for detecting fraudulent exchange item redemption in an exchange item marketplace network. The method includes step 1410 where a processing module (e.g., of a marketplace server) obtains exchange item (EI) information (info) for an EI to offer for sale in an exchange item market place network, where the EI info includes a static EI identifier (ID). The obtaining includes at least one of extracting the EI info exchange with an initial owner computing device facilitating sale, and receiving from an EI issuing server in response to a new EI establishment request.

When the EI is purchased by a buyer computing device, the method continues at step 1412 where the processing module issues the EI info and EI security parameters to the buyer computing device, where the EI security parameters are associated with a dynamic EI identifier approach. The issuing includes generating the EI security parameters for the EI (e.g., secret key, time interval increment, generator algorithm ID, and combiner algorithm ID) and sending the EI info and the EI security parameters to the buyer computing device.

The method continues at step 1414 where the processing module stores the EI info and the EI security parameters in the marketplace database, indicating that the static EI identifier is disabled. The method continues at step 1416 where the processing module detects a request to utilize the static EI identifier with regards to a transaction (e.g., balance check, validity check, redemption). The detecting includes one or more of receiving EI info from one or more of an initial owner computing device and another computing device, where the EI info includes the static EI ID and does not include a dynamic EI ID, and indicating invalid when a retrieved portion of a marketplace database indicates that the static EI ID is disabled. The method continues at step 1418 where the processing module denies the transaction. The denying includes one or more of issuing a canal response to a requesting entity, and sending a security alert to one or more of an EI issuing server, the buyer computing device, and a merchant server.

FIG. 12A is a schematic block diagram of another embodiment of an exchange item marketplace network that includes the exchange item (EI) issuing server 920 of FIG. 6, the EI trusted module 922 of FIG. 6, the EI buyer computing device 926 of FIG. 6, the point-of-sale (POS) equipment 32 of FIG. 1, the merchant server 924 of FIG. 6, the marketplace server 18 of FIG. 6, and the marketplace database 20 of FIG. 6. The EI buyer computing device 926 includes the digital wallet 944 of FIG. 6. The marketplace server 18 includes the set up processing 936 of FIG. 6 and the use processing 940 of FIG. 6. Hereafter, the EI buyer computing device 926 may be interchangeably referred to as a user computing device. Hereafter the exchange item marketplace network may be interchangeable referred to as a data communication system. The data communication system functions to abate fraudulent exchange item acquisition in the exchange item marketplace network.

In an example of operation of the abating of the fraudulent exchange item acquisition, the set up processing 936 obtains EI information (info) 950 for an EI to offer for sale in the marketplace, where the EI info 950 includes a static EI identifier. The obtaining includes one or more of receiving from the EI issuing server 920 in response to a new EI establishment request and extracting from sale information exchanged with an initial owner computing device facilitating the sale.

When the EI is purchased by the EI buyer computing device, the set up processing 936 distributes the EI info 950 and EI security parameters 1290 to paired entities to support a future EI redemption. The determining includes set up processing 936 generating the EI security parameters 1290 for the EI, sending the EI info 950 and the EI security parameters 1290 to the EI buyer computing device 926, and storing the EI info and the EI security parameters in the marketplace database 20, indicating that the static EI ID is disabled.

With the EI info and EI security parameters stored, the use processing 940 determines that the EI was fraudulently purchased by the EI buyer computing device (e.g., with a stolen credit card). The determining includes receiving an invalid EI indicator 1420 from the EI trusted module 922 or from another indicating entity. When the EI was fraudulently purchase, the use processing 940 updates the EI security parameters to produce updated EI security parameters 1422 and updates the EI information to produce updated EI info 1424 for storage in the marketplace database 20. For example, the use processing 940 generates a new secret key and indicates that the EI is for sale again.

FIG. 12B is a logic diagram of an embodiment of another method for abating fraudulent exchange item acquisition in an exchange item marketplace network. The method includes step 1430 where a processing module (e.g., of a marketplace server) obtains exchange item (EI) information for an EI to offer for sale in an exchange item market place network, where the EI info includes a static EI identifier (ID). The obtaining includes at least one of receiving the EI info from an EI issuing server in response to a new EI establishment request and extracting the EI info from sale information exchanged with an initial owner computing device facilitating the sale.

When the EI is purchased by a computing device, the method continues at step 1432 where the processing module distributes the EI info and EI security parameters paired to entities to support a future EI redemption. The determining includes one or more of generating the EI security parameters for the EI, sending the EI info and the EI security parameters to the computing device, and storing the EI info and the EI security parameters in the marketplace database, indicating that the static EI ID is disabled.

The method continues at step 1434 where the processing module determines that the EI was fraudulently purchased by the computing device. The determining includes receiving an invalid EI indicator from an EI trusted module or another indicating entity. When the EI was fraudulently purchased, the method continues at step 1436 where the processing module updates the EI info and EI security parameters to produce updated EI info and updated EI security parameters for storage in the marketplace database. For example, the processing module generates a new secret key to replace a secret key of the EI security parameters and indicates that the EI is for sale again. Alternatively, or in addition to, the processing module sends the updated EI info and updated EI security parameters to another computing device when the other computing device initiates a purchase transaction of the EI.

FIG. 13A is a schematic block diagram of another embodiment of an exchange item marketplace network that includes the exchange item (EI) issuing server 920 of FIG. 6, the EI trusted module 922 of FIG. 6, the EI buyer computing device 926 of FIG. 6, the marketplace server 18 of FIG. 6, the marketplace database 20 of FIG. 6, and one or more other computing devices 1440. The one or more other computing devices 1440 may be implemented utilizing one or more other EI buyer computing devices and may include the EI buyer computing device 926. The EI buyer computing device 926 includes the digital wallet 944 of FIG. 6. Each of the other computing devices 1440 includes the digital wallet 944 of FIG. 6. The marketplace server 18 includes the set up processing 936 of FIG. 6. Hereafter, the EI buyer computing device 926 may be interchangeably referred to as a user computing device. Hereafter the exchange item marketplace network may be interchangeable referred to as a data communication system. The data communication system functions to redistribute an exchange item in the exchange item marketplace network.

In an example of operation of the redistributing of the exchange item, the set up processing 936 obtains EI information (info) 950 for an EI to offer for sale in the marketplace, where the EI info includes a static EI identifier (ID). The obtaining includes at least one of extracting the EI info from sale info exchanged with an initial owner computing device facilitating sale and receiving from the EI issuing server 920 in response to a new EI establishment request. When the EI is purchased by the EI buyer computing device 926, the set up processing 936 issues the EI info 950 and EI security parameters 1290 to the EI buyer computing device 926. The issuing includes generating the EI security parameters for the EI and sending the EI info and the EI security parameters to the EI buyer computing device 926.

Having sent the EI info and EI security parameters to the EI buyer computing device, the set up processing 936 stores the EI info 950 and the EI security parameters 1290 in the marketplace database 20, indicating that the static EI ID is disabled. When the EI buyer computing device 926 initiates a redistribution of the EI to the other computing devices 1440, the set up processing 936 verifies the received redistribution request 1442 and dynamic EI info 1292 from the EI buyer computing device 926. The verifying includes the EI buyer computing device generating the dynamic EI info to include a dynamic EI identifier based on the EI security parameters, the EI buyer computing device generating the redistribution request 1442 to include a redistribution approach (i.e., how much of a remaining balance to divide up to each of the other computing devices), the EI buyer computing device 926 sending the redistribution request 1442 and the dynamic EI info 1292 to the set up processing 936, and the set up processing 936 indicating verified when a comparison of the received dynamic EI info to locally generated dynamic EI info is favorable (i.e., same dynamic EI ID).

For each of the other computing devices 1440, the set up processing 936 issues updated EI info 1444 and updated EI security parameters 1446 in accordance with the redistribution request 1442. The issuing includes generating the updated EI security parameters 1446 (i.e., generate a unique security for each other computing device), modifying the EI info to indicate a redistributed EI to produce the updated EI info 1444 (i.e., portion of a remaining balance), sending the updated EI info 1444 and the updated EI security parameters 1446 to the other computing device 1440, and storing the updated EI info 1444 and the updated EI security parameters 1446 in the marketplace database 20.

FIG. 13B is a logic diagram of an embodiment of a method for redistributing an exchange item in an exchange item marketplace network. The method includes step 1450 where a processing module (e.g., of a marketplace server) obtains exchange item (EI) information (info) for an EI to offer for sale in a marketplace. The obtaining includes at least one of extracting the EI info from sale info exchanged with an initial owner computing device facilitating sale and receiving the EI info from an EI issuing server in response to a new EI establishment request.

When the EI is purchased by a buyer computing device, the method continues at step 1452 where the processing module issues the EI info and EI security parameters buyer computing device. The issuing includes generating the EI security parameters for the EI (i.e., to include a dynamic EI ID) and sending the EI info and the EI security parameters to the buyer computing device. The method continues at step 1454 where the processing module stores the EI info and the EI security parameters in a marketplace database to facilitate subsequent verification of a redistribution and/or redemption request.

When the buyer computing device initiates redistribution of the EI to one or more other computing devices, the method continues at step 1456 where the processing module verifies a received redistribution request and dynamic EI info from the buyer computing device. The verifying includes the buyer computing device generating the dynamic EI info to include the dynamic EI ID based on the EI security parameters, the buyer computing device generating the redistribution request to include a redistribution approach, the buyer computing device sending the redistribution request and the dynamic EI info to the processing module, and the processing module indicating verified when a comparison of the received dynamic EI info to locally generated dynamic EI info is favorable (i.e., same dynamic EI ID).

When verified, the method continues at step 1458 where, for each of the one or more other computing devices, the processing module issues updated EI info and updated EI security parameters in accordance with the redistribution request. The issuing includes generating the updated EI security parameters (i.e., a unique security for each other computing device), modifying the EI info to indicate a redistributed EI to produce the updated EI info, sending the updated EI info and updated EI security parameters to the other computing device, and storing the updated EI info and updated EI security parameters in the marketplace database.

FIG. 14A is a schematic block diagram of another embodiment of an exchange item marketplace network that includes the exchange item (EI) issuing server 920 of FIG. 6, the EI trusted module 922 of FIG. 6, the EI buyer computing device 926 of FIG. 6, the marketplace server 18 of FIG. 6, and the marketplace database 20 of FIG. 6. The EI buyer computing device 926 includes the digital wallet 944 of FIG. 6. The marketplace server 18 includes the set up processing 936 of FIG. 6. Hereafter, the EI buyer computing device 926 may be interchangeably referred to as a user computing device. Hereafter the exchange item marketplace network may be interchangeable referred to as a data communication system. The data communication system functions to convert an exchange item identification approach in the exchange item marketplace network.

In an example of operation of the converting of the exchange item identification approach, when the EI buyer computing device 926 purchases one or more exchange items through the marketplace server 18, the set up processing 936 issues EI information (info) 950 to the EI buyer computing device 926 for storage in the digital wallet 944, where the EI info 950 is based on a static EI identifier (ID). The issuing includes one or more of exchanging EI info 950 with the EI issuing server 920, where the EI issuing server 920 exchanges trust information 954 with the EI trusted module 922, where the EI trusted module 922 exchanges set up verification 956 with the set up processing 936 to verify the one or more exchange items, and for each EI, sending the EI info 950 to the EI buyer computing device 926, and storing the EI info 950 in the marketplace database 20.

At least one of the EI buyer computing device 926 and the set up processing 936 determines to initiate a conversion process to convert the one or more exchange items based on the static EI identifiers into the exchange items based on a dynamic EI identifier approach. The determining may be based on one or more of a request, a predetermination, and interpretation of an EI rule, in accordance with a timeframe expiration, a security issue, a solicitation, etc.

When converting, the set up processing 936 receives a conversion request 1460 from the EI buyer computing device 926, where the conversion request 1460 includes static EI identifiers of the one or more exchange items and an indication to initiate the conversion. For each EI, the set up processing 936 generates EI security parameters 1290 and updated EI info 1462. The generating includes generating the EI security parameters 1290 (i.e., producing a common secret key, producing unique secret keys), and updating the EI info to produce the updated EI info 1462 to indicate that the static ID is disabled and that the dynamic identifier approach is to be utilized. Having generated the updated EI info 1462 and the EI security parameters 1290, the set up processing 936 facilitates distribution of the updated EI info 1462 and the EI security parameters 1290. The facilitating includes one or more of storing the updated EI info 1462 and the EI security parameters 1290 in the marketplace database 20 and sending the updated EI info 1462 and the EI security parameters 1290 to the EI buyer computing device 926 to replace the static exchange item identifiers in the digital wallet 944.

FIG. 14B is a logic diagram of an embodiment of a method for converting an exchange item identification approach in an exchange item marketplace network. When a buyer computing device purchases one or more exchange items, the method includes step 1470 where a processing module (e.g., of a marketplace server) issues EI information to the buyer computing device, where the EI information is based on a static EI identifier (ID) approach. The issuing includes one or more of exchanging EI info with an EI issuing server and storing the EI info in a marketplace database.

The method continues at step 1472 where the processing module determines to initiate a conversion process to convert the one or more exchange items based on the static EI identifiers into EIs based on a dynamic EI identifier approach. The determining may be based on one or more of receiving a request, interpreting a predetermination, interpreting an EI rule, invoking after a timeframe expression, detecting a security issue, interpreting a solicitation, etc.

The method continues at step 1474 where the processing module receives a conversion request from the buyer computing device, where the conversion request includes static EI identifiers of the one or more exchange items. For each EI, the method continues at step 1476 where the processing module generates the EI security parameters and updated EI information. The generating includes generating the EI security parameters (i.e., a common secure key, unique secret keys), and updating the EI info to produce the updated EI info to indicate that the static ID is disabled and that the dynamic identifier approach is to be utilized.

For each EI, the method continues at step 1478 where the processing module distributes the EI security parameters and the updated EI information. The determining includes storing the updated EI info and the EI security parameters in the marketplace database and sending the updated EI info in the EI security parameters to the buyer computing device to replace the static EI identifiers.

FIG. 15A is a schematic block diagram of another embodiment of an exchange item marketplace network that includes the exchange item (EI) issuing server 920 of FIG. 6, the EI trusted module 922 of FIG. 6, the EI buyer computing device 926 of FIG. 6, the marketplace server 18 of FIG. 6, the marketplace database 20 of FIG. 6, and one or more other computing devices 1480. The one or more other computing devices 1480 may be implemented utilizing one or more other EI buyer computing devices and may include the EI buyer computing device 926. The EI buyer computing device 926 includes the digital wallet 944 of FIG. 6. Each of the other computing devices 1480 includes the digital wallet 944 of FIG. 6. The marketplace server 18 includes the set up processing 936 of FIG. 6. Hereafter, the EI buyer computing device 926 may be interchangeably referred to as a user computing device. Hereafter the exchange item marketplace network may be interchangeable referred to as a data communication system. The data communication system functions to share an exchange item in the exchange item marketplace network.

In an example of operation of the redistributing of the exchange item, the set up processing 936 obtains EI information (info) 950 for an EI to offer for sale in the marketplace, where the EI info includes a static EI identifier (ID). The obtaining includes at least one of extracting the EI info from sale info exchanged with an initial owner computing device facilitating sale and receiving from the EI issuing server 920 in response to a new EI establishment request. When the EI is purchased by the EI buyer computing device 926, the set up processing 936 issues the EI info 950 and EI security parameters 1290 to the EI buyer computing device 926. The issuing includes generating the EI security parameters for the EI and sending the EI info and the EI security parameters to the EI buyer computing device 926.

Having sent the EI info and EI security parameters to the EI buyer computing device, the set up processing 936 stores the EI info 950 and the EI security parameters 1290 in the marketplace database 20, indicating that the static EI ID is disabled. When the EI buyer computing device 926 initiates a sharing of the EI with the other computing devices 1480, the set up processing 936 verifies a received sharing request 1482 and dynamic EI info 1292 from the EI buyer computing device 926. The verifying includes the EI buyer computing device generating the dynamic EI info to include a dynamic EI identifier based on the EI security parameters, the EI buyer computing device generating the redistribution request 1442 to include a sharing approach (i.e., first come first serve to a remaining EI balance), the EI buyer computing device 926 sending the sharing request 1482 and the dynamic EI info 1292 to the set up processing 936, and the set up processing 936 indicating verified when a comparison of the received dynamic EI info to locally generated dynamic EI info is favorable (i.e., same dynamic EI ID).

For each of the other computing devices 1480, the set up processing 936 issues shared EI info 1484 and shared EI security parameters 1486 in accordance with the sharing request 1482. The issuing includes generating the shared EI security parameters 1486 (i.e., generate a common secret key for each other computing device), modifying the EI info to indicate a shared EI to produce the shared EI info 1484 (i.e., a remaining balance), sending the share EI info 1484 and the shared EI security parameters 1486 to the other computing device 1480, and storing the shared EI info 1484 and the shared EI security parameters 1486 in the marketplace database 20.

FIG. 15B is a logic diagram of an embodiment of a method for sharing an exchange item in an exchange item marketplace network. The method includes step 1490 where a processing module (e.g., of a marketplace server) obtains exchange item (EI) information (info) for an EI to offer for sale in a marketplace. The obtaining includes at least one of extracting the EI info from sale info exchanged with an initial owner computing device facilitating sale and receiving the EI info from an EI issuing server in response to a new EI establishment request.

When the EI is purchased by a buyer computing device, the method continues at step 1492 where the processing module issues the EI info and EI security parameters to the buyer computing device. The issuing includes generating the EI security parameters for the EI (i.e., to include a dynamic EI ID) and sending the EI info and the EI security parameters to the buyer computing device. The method continues at step 1494 where the processing module stores the EI info and the EI security parameters in a marketplace database to facilitate subsequent verification of a sharing and/or redemption request.

When the buyer computing device initiates a sharing of the EI with one or more other computing devices, the method continues at step 1496 where the processing module verifies a received sharing request and dynamic EI info from the buyer computing device. The verifying includes the buyer computing device generating the dynamic EI info to include the dynamic EI ID based on the EI security parameters, the buyer computing device generating the sharing request to include a sharing approach, the buyer computing device sending the sharing request and the dynamic EI info to the processing module, and the processing module indicating verified when a comparison of the received dynamic EI info to locally generated dynamic EI info is favorable (i.e., same dynamic EI ID).

When verified, the method continues at step 1498 where, for each of the one or more other computing devices, the processing module issues shared EI info and shared EI security parameters in accordance with the sharing request. The issuing includes generating the shared EI security parameters (i.e., a common secret key for each other computing device), modifying the EI info to indicate a shared EI to produce the shared EI info, sending the shared EI info and shared EI security parameters to the other computing device, and storing the shared EI info and shared EI security parameters in the marketplace database.

FIG. 16A is a schematic block diagram of another embodiment of an exchange item marketplace network that includes the exchange item (EI) issuing server 920 of FIG. 6, the EI trusted module 922 of FIG. 6, the EI buyer computing device 926 of FIG. 6, the point-of-sale (POS) equipment 32 of FIG. 1, the merchant server 924 of FIG. 6, the marketplace server 18 of FIG. 6, and the marketplace database 20 of FIG. 6. The EI buyer computing device 926 includes the digital wallet 944 of FIG. 6. The marketplace server 18 includes the set up processing 936 of FIG. 6 and the use processing 940 of FIG. 6. Hereafter, the EI buyer computing device 926 may be interchangeably referred to as a user computing device. Hereafter the exchange item marketplace network may be interchangeable referred to as a data communication system. The data communication system functions to convert exchange item brand affiliation in the exchange item marketplace network.

In an example of operation of the converting of the exchange item brand affiliation, when initiating a cross-brand EI redemption, the use processing 940 validates received merchant use information 1502 (i.e., buyer use info 1500, merchant ID) from the merchant server 924, where the merchant server 924 receives buyer use information 1500 (i.e., item for purchase, EI ID, user computer ID, a blockchain ledger signed by the user computing device, a cross-brand request, and dynamic EI info for an original brand), via the point-of-sale (POS) equipment 32, from the EI buyer computing device 926, where the EI buyer computing device 926, when acquiring an EI in accordance with a dynamic EI identifier (ID) approach, receives EI information (info) 950 and EI security parameters 1290 from the set up processing 936, where the set up processing 936 exchanges the EI info 950 and an EI rule set 952 with the EI issuing server 920 to establish the EI.

When the received merchant use information 1502 is valid, and when an EI rule of the EI rule set 952 enables cross-brand utilization, the set up processing 936 facilitates conversion of the EI into another brand EI in accordance with the EI rule. The facilitating includes the set up processing 936 distributing updated EI info 1506 (to include an ID of the other brand) based on the EI info 950 and updated EI security parameters 1504 (a new secret key, etc.) to the EI buyer computing device 926 and to the marketplace database 20 for storage.

These processing 940 facilitates conclusion of the cross-brand EI redemption when receiving valid cross-brand dynamic EI info 1508. The facilitating includes one or more of receiving the cross-brand dynamic EI info 1508 from the merchant server 924, where the merchant server 924 receives the cross-brand dynamic EI info 1508 from the EI buyer computing device 926 via the POS equipment 32, where the EI buyer computing device 926 generates the cross-brand dynamic EI info 1508 based on the updated EI info 1506 and the updated EI security parameters 1504, indicating valid when a generated other brand dynamic EI ID compares favorably to a received other brand dynamic EI ID of the cross-brand dynamic EI info 1508, and when valid, utilizing the other brand EI for the redemption (i.e., notify the merchant server 924 to include the transaction favorably, updating the marketplace database with a new remaining balance for the other brand EI).

FIG. 16B is a logic diagram of an embodiment of a method for converting exchange item brand affiliation in an exchange item marketplace network. The method includes step 1510 where a processing module (e.g., of a marketplace server) validates a received cross-brand exchange item (EI) redemption request from a computing device with regards to the EI. The validating includes indicating valid when a received dynamic EI identifier (ID) compares favorably to a generated dynamic EI ID based on EI security parameters and EI info associated with the EI.

When valid, and when an EI rule enables the cross-brand EI redemption, the method continues at step 1512 where the processing module facilitates conversion of the EI into another brand EI in accordance with the EI rule and the redemption request. The facilitating includes one or more of distributing updated EI info (i.e. to include an ID of the other brand) based on the EI info and updated EI security parameters (i.e., a new secret key, etc.) to the computing device and to a marketplace database.

The method continues at step 1514 where the processing module facilitates conclusion of the cross-brand EI redemption when receiving valid cross-brand dynamic EI info from the buyer computing device. The facilitating includes one or more of receiving the cross-brand dynamic EI info, where the computing device generates the cross-brand dynamic EI info to include another brand dynamic EI ID based on the updated EI info and the updated EI security parameters, indicating valid when a generated other brand dynamic EI ID compares favorably to the received other brand dynamic EI ID, and when valid, utilizing the other brand EI for the redemption (i.e., notify a merchant server to conclude the transaction favorably, update the marketplace database with a new remaining balance for the other brand EI). Alternatively, or in addition to, the processing module utilizes the other brand EI without validating the cross-brand updated EI info from the buyer computing device.

FIG. 17A is a schematic block diagram of another embodiment of an exchange item marketplace network that includes the exchange item (EI) issuing server 920 of FIG. 6, the EI trusted module 922 of FIG. 6, the EI buyer computing device 926 of FIG. 6, the point-of-sale (POS) equipment 32 of FIG. 1, the merchant server 924 of FIG. 6, the marketplace server 18 of FIG. 6, and the marketplace database 20 of FIG. 6. The EI buyer computing device 926 includes the digital wallet 944 of FIG. 6. The EI buyer computing device 926 may be additionally implemented as a token device (i.e., including a simple digital display and a one-time use long life battery). The marketplace server 18 includes the set up processing 936 of FIG. 6 and the use processing 940 of FIG. 6. Hereafter, the EI buyer computing device 926 may be interchangeably referred to as a user computing device. Hereafter the exchange item marketplace network may be interchangeable referred to as a data communication system. The data communication system functions to validate exchange item redemption in the exchange item marketplace network.

In an example of operation of the validating of the exchange item redemption, when the EI buyer computing device 926 initiates the EI redemption utilizing a post-dated dynamic EI identifier (ID) approach, these processing 940 receives buyer use information 1524, public information (info) 1520, and secret information 1522 from the EI buyer computing device 926. The buyer use information 1524 includes one or more of a purchase amount, an identifier of an item for purchase, and an indicator of use of the post-dated dynamic EI ID approach. The public information 1520 includes one or more of an issuance time (of a physical representation of a dynamic exchange item), a static EI number, and a portion of a dynamic EI ID. The secret information 1522 includes a remaining portion of the dynamic EI ID.

The receiving includes one or more of the set up processing 936 generating dynamic EI parameters (i.e., a secret key, a time interval increment, a generator algorithm ID, a combiner algorithm ID); generating a dynamic EI ID using the dynamic EI parameters, a static ID of the EI, and a current time as the issuance time; generating the public information 1520 to include one or more of the issuance time, the static EI ID, and a portion of the dynamic EI ID (e.g., a most significant 12 bits of a 16-bit ID); generating the secret info 1522 to include the remaining portion of the dynamic EI ID (e.g., a remaining 12 bits of the 16-bit ID); providing the public info 1520 and the secret info 1522 to a user associated with the EI buyer computing device 926 (e.g., one or more printed tickets, an audio output, a visual display output, etc.); the EI buyer computing device 926 receiving one or more inputs from the user including the public information 1520 and the secret information 1522 (e.g., via a manual keyboard input); the EI buyer computing device 926 sending the buyer use information 1524, the public information 1520, and the secret information 1522 to the merchant server 924 via the POS equipment 32; and the merchant server 924 issuing merchant use information 1526 to the use processing 940, where the merchant use information 1526 includes a merchant server ID, the buyer use information 1524, the public information 1520, and the secret information 1522.

Having received the merchant use information 1526, the use processing 940 validates the merchant use information 1526 in accordance with the post-dated dynamic EI ID approach. The validating includes one or more of combining the portion of the dynamic EI ID from the public information 1520 with the remaining portion of the dynamic EI ID from the secret information 1522 to produce a received dynamic EI ID; utilizing the EI security parameters and the EI info 950 retrieved from the marketplace database 20 to produce a locally generated dynamic EI ID, where issuance time of the received public information is utilized as a time inputs; and indicating that the merchant use information 1526 is valid when the received dynamic EI ID compares favorably to the locally generated dynamic EI ID.

When valid, the use processing 940 facilitates completion of the EI redemption. The facilitating includes one or more of notifying the merchant server 924 that the redemption is approved, and updating the EI info 950 maintained in the marketplace database 20 to indicate an updated remaining balance of the EI, etc.

FIG. 17B is a logic diagram of an embodiment of a method for validating exchange item redemption in an exchange item marketplace network. When a computing device initiates an exchange item (EI) redemption utilizing a post-dated dynamic EI identification (ID) approach, the method includes step 1530 where a processing module (e.g., of a marketplace server) receives redemption request information including one or more of buyer use information, public information associated with the EI, and secret information associated with the EI. For example, the processing module generates dynamic EI parameters; generates a dynamic EI ID of the dynamic EI parameters, a static ID of the EI, and a current time as an issuance time; generates the public information to include one or more of the issuance time, the static EI ID, and a portion of the dynamic EI ID; generates the secret information to include a remaining portion of the dynamic EI ID; provides the public information and the secure information to a user associated with the computing device (e.g., via a printed ticket); the computing device receives one or more inputs from the user including the public information and the secret information (e.g., via a keyboard input); the computing device sends buyer use information, the public information, and the secret information to a merchant server; and the merchant server issues merchant use information to the processing module, where the merchant use information includes a merchant server ID, the buyer use information, the public information, and the secret information.

The method continues at step 1532 where the processing module validates the redemption request information in accordance with the post-dated dynamic EI ID approach. The validating includes one or more of combining the portion of the dynamic EI ID from the public information with the remaining portion of the dynamic EI ID from the secure information to produce a received dynamic EI ID; utilizing EI security parameters and EI information retrieved from a marketplace database to produce a locally generated dynamic EI ID, where the issuance time of the received public information is utilized as a time input; and indicating valid when the received dynamic EI ID compares favorably to the locally generated dynamic EI ID.

When valid, the method continues at step 1534 where the processing module facilitates completion of the EI redemption. The facilitating includes one or more of notifying the merchant server that the redemption is approved and updating the EI information of the marketplace database to indicate an updated remaining balance of the EI, etc.

FIG. 18A is a schematic block diagram of another embodiment of an exchange item marketplace network that includes the exchange item (EI) issuing server 920 of FIG. 6, the EI trusted module 922 of FIG. 6, the EI buyer computing device 926 of FIG. 6, the point-of-sale (POS) equipment 32 of FIG. 1, the merchant server 924 of FIG. 6, the marketplace server 18 of FIG. 6, and the marketplace database 20 of FIG. 6. The EI buyer computing device 926 includes the digital wallet 944 of FIG. 6. The marketplace server 18 includes the set up processing 936 of FIG. 6 and the use processing 940 of FIG. 6. Hereafter, the EI buyer computing device 926 may be interchangeably referred to as a user computing device. Hereafter the exchange item marketplace network may be interchangeable referred to as a data communication system. The data communication system functions to convert an exchange item identification approach in the exchange item marketplace network.

In an example of operation of the converting of the exchange item identification approach, for a group of exchange items to be associated with the EI buyer computing device 926, the set up processing 936 distribute shared EI security parameters 1540. The determining includes one or more of generating the shared EI security parameters 1540 (e.g., a common secret key, a common key seed, a common generator algorithm ID, a common time interval, a common combiner algorithm ID); sending EI information (info) 950 and the shared EI security parameters 1540 to the EI buyer computing device 926; and storing the EI info 950 and the shared EI security parameters 1540 in the marketplace database 20, where the set up processing 936 exchanges EI info 950 and an EI rule set 952 with the EI issuing server 920, where the EI issuing server 920 exchanges trust information 954 with the EI trusted module 922, and where the EI trusted module 922 exchanges set up verification 956 with the set up processing 936 to verify the EI.

When the EI buyer computing device 926 utilizes a selected EI for an EI redemption, the use processing 940 receives dynamic EI information 1544 and associated merchant use information 1546. The receiving includes one or more of the EI buyer computing device 926 generating dynamic EI information (e.g., dynamic EI ID utilizing a dynamic EI ID approach) based on the shared EI security parameters 1540 and the EI info 950; sending the buyer use information 1542 (i.e., an identifier of an item for purchase, a static EI identifier, an EI buyer computing device identifier, a blockchain ledger signed by the buyer computing device) to the merchant server 924 via the POS equipment 32; the merchant server 924 generating the merchant use information 1546 to include the buyer use information 1542 and a merchant identifier; and the merchant server 924 sending the merchant use information 1546 and the dynamic EI information 1544 to the use processing 940.

Having received the dynamic EI information 1544 and the associated merchant use information 1546, the use processing 940 verifies the dynamic EI information 1544. The verifying includes indicating favorable verification when a locally generated dynamic EI ID based on retrieved shared EI security parameters 1540 (i.e., retrieved from the marketplace database 20) compares favorably to a received dynamic EI ID of the dynamic EI information 1544. When favorably verified, the use processing 940 facilitates completion of the redemption. The facilitating includes one or more of updating the EI info 950 in the marketplace database 20 to adjust a remaining balance level, and notifying the merchant server 924 that the redemption is approved.

FIG. 18B is a logic diagram of an embodiment of another method for converting an exchange item identification approach in an exchange item marketplace network. For a group of exchange items to be associated with a computing device, the method includes step 1550 where a processing module (e.g., of a marketplace server) distributes shared exchange item (EI) security parameters. The distributing includes one or more of generating common EI parameters, sending EI information (info) and the shared EI security parameters to the computing device, and storing the EI info and the shared EI parameters in a marketplace database for subsequent utilization during a redemption request.

When the computing device utilizes a selected EI for an EI redemption, the method continues at step 1552 where the processing module receives dynamic EI information and associated merchant use information. The receiving includes one or more of the computing device generating the dynamic EI information based on the shared EI security parameters and the EI information, sending buyer use information (i.e., item for purchase ID, static EI ID, EI buyer computing device ID, a blockchain ledger signed by the buyer computing device) to the merchant server, the merchant server generating the merchant use information to include the buyer use information and a merchant identifier, and the merchant server sending the merchant use information and the dynamic EI information to the processing module.

The method continues at step 1554 where the processing module verifies the dynamic EI information based on the distributed shared EI security parameters. The verifying includes indicating favorable verification when a locally generated dynamic EI ID based on retrieved shared EI security parameters compares favorably to a received dynamic EI ID of the dynamic EI information. When favorably verified, the method continues at step 1556 where the processing module facilitates completion of the EI redemption. The facilitating includes one or more of updating the EI info of the EI in the marketplace database to adjust a remaining balance level and notifying the merchant server that the redemption is approved.

FIG. 19A is a schematic block diagram of another embodiment of an exchange item marketplace network that includes the exchange item (EI) issuing server 920 of FIG. 6, the EI trusted module 922 of FIG. 6, the EI buyer computing device 926 of FIG. 6, the marketplace server 18 of FIG. 6, the marketplace database 20 of FIG. 6, one or more merchant servers 924 of FIG. 6, and one or more other computing devices 1568. The one or more other computing devices 1568 may be implemented utilizing one or more other EI buyer computing devices. The EI buyer computing device 926 includes the digital wallet 944 of FIG. 6. Each of the other computing devices 1568 includes the digital wallet 944 of FIG. 6. The marketplace server 18 includes the set up processing 936 of FIG. 6 and the use processing 940 of FIG. 6. Hereafter, the EI buyer computing device 926 may be interchangeably referred to as a user computing device. Hereafter the exchange item marketplace network may be interchangeable referred to as a data communication system. The data communication system functions to transfer an exchange item in the exchange item marketplace network.

In an example of operation of the transferring of the exchange item, the set up processing 936 distributes purchase recommendation information (info) 1560 to the one or more other computing devices 1568. The purchase recommendation info 1560 includes one or more of item identifiers, item purchase prices, exchange item identifiers, and privatization information. The distributing includes obtaining the purchase recommendation information (i.e., generate, receive), identifying the one or more other computing devices 1568 (i.e., identify an affiliation with the EI buyer computing device 926 such as friends, family, a wedding registry, etc.), sending the purchase recommendation information 1560 to the identified other computing devices 1568, and storing the purchase recommendation information 1560 in the marketplace database 20.

Having distributed the purchase recommendation information, the set up processing 936 receives one or more EI transfer requests 1562 from the one or more other computing devices 1568 with regards to transferring at least a portion of one or more exchange items from another computing device to the EI buyer computing device 926 in accordance with prioritization information of the purchase recommendation information 1560. Each EI transfer request 1562 includes one or more of an item identifier, an item purchase price, and an identifier of an exchange item held by the other computing device. The receiving includes one or more of another computing device selecting an item identifier of an item for purchase of the purchase recommendation information (i.e., manual input, automatic selection based on exchange items held in the digital wallet 944 of the other computing device 1568), the other computing device selecting the corresponding exchange item from the digital wallet 944 of the other computing device for subsequent redemption to facilitate purchase on behalf of the EI buyer computing device of the selected item, the other computing device generating the EI transfer request 1562, and sending the EI transfer request to the marketplace server 18.

Having received the one or more EI transfer requests 1562, the set up processing 936 distributes updated EI information 1564 based on one or more of the EI transfer request 1562 within a transfer time frame. The updated EI info 1564 includes an expanded list of exchange items held by the EI buyer computing device 926. The determining includes one or more of aggregating transferred exchange items into the updated EI info 1564, sending the updated EI info 1564 to the EI buyer computing device 926, and storing the updated EI info 1564 in the marketplace database 20.

The use processing 940 facilitates purchase of at least some of the identified items for purchase utilizing the updated EI info 1564. The facilitating includes one or more of selecting the next item for purchase utilizing one or more exchange items transferred to the EI buyer computing device (i.e., identified by a list and the updated EI info) in accordance with the prioritized item identifiers of the purchase recommendation information. Alternatively, or in addition to, the use processing 940 may receive a prioritization update from the EI buyer computing device 926 with regards to reordering item purchases. The facilitating further includes the use processing 940 exchanging merchant use information 1566 with one or more corresponding merchant servers 924 to facilitate the purchase of the selected items utilizing the one or more exchange items transferred to the EI buyer computing device 926.

FIG. 19B is a logic diagram of an embodiment of a method for transferring an exchange item in an exchange item marketplace network. The method includes step 1570 where a processing module (e.g., of a marketplace server) distributes purchase recommendation information to one or more gifting computing devices. The issuing includes one or more of obtaining the purchase recommendation info (i.e., generating, receiving), identifying the one or more gifting computing devices (i.e., identify an affiliation with a recipient computing device), sending the purchase recommendation information to the identified gifting computing devices, and storing the purchase recommendation information in a marketplace database.

The method continues at step 1572 where the processing module receives one or more exchange item (EI) transfer requests from at least some of the one or more gifting computing devices with regards to transferring at least a portion of one or more exchange items to the recipient computing device. The receiving includes one or more of a gifting computing device selecting an item identifier of an item for purchase of the purchase recommendation info, selecting a corresponding exchange item associated with the gifting computing device for use in the redemption, generating the EI transfer request, and sending the EI transfer request to the processing module.

The method continues at step 1574 where the processing module distributes updated EI info based on the one or more EI transfer request received within a receiving time frame. The distributing includes one or more of aggregating transferred exchange items into the updated EI info, sending the updated EI info to the recipient computing device, and storing the updated EI info in the market place database.

The method continues at step 1576 where the processing module facilitates purchase of at least some identified items utilizing the updated EI info. The facilitating includes one or more of selecting, in accordance with a privatization of the purchase recommendation information, a next item for purchase utilizing one or more exchange items transferred to the recipient computing device, interpreting a prioritization update from the recipient computing device, and exchanging merchant use information with one or more selected merchant servers to facilitate the purchase of the selected items utilizing the one or more exchange items transferred to the recipient computing device.

FIG. 20A is a schematic block diagram of another embodiment of an exchange item marketplace network that includes the exchange item (EI) issuing server 920 of FIG. 6, the EI trusted module 922 of FIG. 6, the EI buyer computing device 926 of FIG. 6, the marketplace server 18 of FIG. 6, and the marketplace database 20 of FIG. 6. The EI buyer computing device 926 includes the digital wallet 944 of FIG. 6. The marketplace server 18 includes the set up processing 936 of FIG. 6. Hereafter, the EI buyer computing device 926 may be interchangeably referred to as a user computing device. Hereafter the exchange item marketplace network may be interchangeable referred to as a data communication system. The data communication system functions to generate a marketplace credit in the exchange item marketplace network.

In an example of operation of the generating of the marketplace credit, the set up processing 936 determines to issue a marketplace EI credit to the EI buyer computing device 926. The determining includes indicating to issue the marketplace EI credit based on one or more of when the EI buyer computing device 926 downloads a marketplace application, in response to a promotion, when requiring payment for purchase of another exchange item from the marketplace, when utilizing a discount to purchase the marketplace exchange item, in response to a request from the EI buyer computing device, and in accordance with a schedule.

Having determined to issue the marketplace EI credit, the set up processing 936 issues marketplace EI information (info) 1580 to the EI buyer computing device 926. The marketplace EI info 1580 includes one or more of a marketplace EI identifier, a consolidated marketplace EI remaining balance, and a marketplace EI rule set based on a rule set 952 associated with the EI issuing server 920. The issuing includes one or more of generating the marketplace EI info based on one or more of the determination to issue the marketplace EI credit, and marketplace EI information 1580 retrieved from the marketplace database (i.e., to add to remaining balance).

Having issued the marketplace EI info 1580, the set up processing 936 stores the marketplace EI info 1580 in the marketplace database 20, where EI info 950 is stored for available exchange items in accordance with the EI rule set 952 from the EI issuing server 920. When the EI buyer computing device 926 initiates redemption of at least a portion of the marketplace EI info 1580 to purchase one or more exchange items listed in the marketplace, the set up processing 936 exchanges purchase information 1582 with the EI buyer computing device. The purchase information 1582 includes one or more of an exchange item identifier, a marketplace exchange item identifier, and marketplace EI balance information. The exchanging includes one or more of receiving an identifier for an exchange item for purchase utilizing the marketplace EI associated with the EI buyer computing device 926, and sending a confirmation of the purchase of the exchange item to the EI buyer computing device 926.

FIG. 20B is a logic diagram of an embodiment of a method for generating a marketplace credit in an exchange item marketplace network. The method includes step 1590 where a processing module (e.g., of a marketplace server) determines to issue a marketplace exchange item (EI) credit to a computing device with regards to a marketplace EI associated with the computing device. The determining includes indicating to issue the marketplace he a credit based on one or more of when the computing device downloads a marketplace application, in response to promotion, when requiring payment for purchase of another exchange item from the marketplace, when utilizing a discount to purchase the marketplace exchange item, in response to a request from the computing device, and in accordance with a schedule.

The method continues at step 1592 where the processing module issues marketplace EI information (info) to the computing device based on the marketplace EI credit. The issuing includes one or more of generating the marketplace EI info based on one or more of the determination to issue the marketplace EI credit and marketplace EI information retrieved from a marketplace database.

The method continues at step 1594 where the processing module stores the marketplace EI info in the marketplace database, where the EI info is stored for available exchange items for purchase when redeeming the marketplace exchange item. When the computing device initiates redemption of the marketplace exchange item, the method continues at step 1596 where the processing module exchanges purchase information with the computing device to fill facilitate purchase of one or more of the exchange items for purchase. The exchanging includes one or more of receiving an identifier for an exchange item to purchase when redeeming the marketplace exchange item associated with the computing device and sending a confirmation of the purchase of the exchange item to the computing device.

FIGS. 21A and 21B are schematic block diagrams of another embodiment of an exchange item marketplace network that includes exchange item (EI) issuing server 920, EI trusted module 922, a first computing device 1598 (e.g., an EI buyer computing device), point-of-sale (POS) equipment 32, merchant server 924, marketplace server 18, and marketplace database 20. First computing device 1598 includes digital wallet 944. The marketplace server 18 includes set up processing 936 and use processing 940. When fraudulent acquisition is detected, the exchange marketplace network functions to protect the EI from corruption and prevent use of the EI by fraudulent means.

In an example of operation, FIG. 21A depicts the set up processing 936 of the marketplace server 18 obtaining EI information (info) 950 for an EI to offer for sale in the marketplace, where the EI info 950 includes a static EI identifier (ID) 1600. For example, the marketplace server 18 receives the EI information 950 from an EI issuing server 920. The first computing device 1598 initiates acquisition of the EI from the marketplace server 18 (e.g., the first computing device 1598 purchases/obtains the EI for use). Upon acquisition, the marketplace server 18 creates a first dynamic identifier (ID) 1602 for the first computing device 1598. A secure chain of custody for the EI (which includes a secure data block featuring the EI information) is updated to include a new secure data block representative of the first computing device's acquisition of the EI and the assignment of the first dynamic ID 1602. Updating the secure chain of custody will be discussed in greater detail with reference to FIG. 22.

During the acquisition of the exchange item (EI) by the first computing device 1598 or sometime after acquisition, the marketplace server 18 detects fraudulent acquisition of the EI 1604 by the first computing device 1598. In an example, the marketplace server 18 detects the fraudulent acquisition by receiving a notification from an EI trusted module 922 regarding a fraudulent activity (e.g., unauthorized or unverifiable IP address, unauthorized or unverifiable computing device ID, fraudulent IP address, fraudulent computing device ID, unauthorized or unverifiable credit card use to purchase the exchange item, fraudulent credit card used to purchase the exchange item, etc.) of the first computing device 1598. As another example, the marketplace server detects that the EI was purchased using a fraudulent financial instrument (e.g., the EI was purchased using a stolen credit card, a fraudulent credit card, a stolen gift card, a fraudulent gift card, etc.) and/or the EI was purchased by an unauthorized user (e.g., the first computing device 1598 has a fake/unauthorized computing device ID).

FIG. 21B depicts the EI trusted module 922 sending the marketplace server 18 an invalid EI indicator 1420 to alert the marketplace server 18 of the detected fraud. Alternatively, the marketplace server 18 receives an invalid EI indicator 1420 from another entity of the computing network (e.g., the brand server, the processor server, the retailer server, the distributor server, etc.). In response to detecting the fraudulent acquisition, the marketplace server 18 deactivates the first dynamic ID 1602 in response to detecting the fraudulent acquisition. The secure chain of custody for the EI is updated to include a new secure data block representative of the deactivation of the first dynamic ID 1602. After deactivating the first dynamic ID 1602, the marketplace server 18 detects requested use of the EI by the first computing device 1598. The marketplace server 18 denies any requested use of the EI by the first computing device 1598 and reclaims ownership of the EI. The secure chain of custody for the EI is updated to include a new secure data block representative of the reclaimed ownership of the EI.

In this manner, the EI is reclaimed by the marketplace server 18 and the EI is not corrupted (e.g., the static ID and the EI information remain unaffected) despite the fraudulent activity of the first computing device. Since the reclaimed EI is not corrupted, a second computing device may then request to acquire it. In this instance, the marketplace server 18 assigns a second dynamic ID for the second computing device. The secure chain of custody of the EI would be updated to include a new data block representative of the acquisition of the EI by the second computing device and the assignment of the second dynamic ID.

FIG. 22 is a schematic block diagram of a portion of a secure chain of custody 1610 of an exchange item (EI). The portion of the secure chain of custody 1610 of the EI includes data blocks (e.g., secure data block x, x+1, x+2, and x+3) of information relating to the EI and the use of the EI. Each secure data block of the secure chain of custody includes a header section 1612 and a transaction section 1614. The header section 1612 includes one or more of a nonce, a hash of a preceding block of the secure chain of custody 1610, where the preceding block was under control of a preceding device in a chain of control of the secure chain of custody 1610, and a hash of a current block (e.g., a current transaction section) of the secure chain of custody 1610, where the current block is under control of a current device in the chain of control of the secure chain of custody 1610. The transaction section 1614 includes one or more of a public key of the current device, a signature of the preceding device, and one or more transactions regarding the exchange item. For example, a transaction includes acquisition of the exchange item, sale of the exchange item, use of the exchange item, fraud detection information, etc.

In reference to FIGS. 21A and 21B, an EI is acquired by a first computing device. The secure chain of custody already includes secure data block x. Secure data block x includes a transaction section 1614 populated with EI information including the static ID (e.g., serial number and/or issuer identification) associated with the EI. When the first computing device acquires the EI from the marketplace server or elsewhere, the first computing device is the transactor and the marketplace server is the transactee. The secure chain of custody is updated by including secure data block x+1 which includes a transaction section populated with information regarding the acquisition of the EI by the first computing device as well as the assignment of the first dynamic ID.

When the marketplace server detects fraudulent acquisition of the EI, the marketplace server deactivates the first dynamic ID and updates the secure chain of custody 1610. The secure chain of custody 1610 is updated by adding the secure data block x+2 which includes a transaction section 1614 populated with information regarding the fraud detection and the deactivation of the first dynamic ID. At some later point in time, the marketplace server detects use of the exchange item by the first computing device, denies the use, and reclaims ownership of the EI. This information is included in the transaction section of secure data block x+3, which is added to the secure chain of custody. Additionally, the marketplace server may receive a new acquisition request from a second computing device. The marketplace server would assign the second computing device a second dynamic ID for the EI and update the secure chain of custody to include a new secure data block which includes a transaction section 1614 populated with information regarding acquisition of the EI by the second computing device and the assignment of the second dynamic ID.

FIG. 23 is a logic diagram of an example of protecting an exchange item from fraudulent acquisition. The method begins with step 1616 where the marketplace server of a computing network detects fraudulent acquisition of an exchange item (EI) by a first computing device of the computing network. The EI is associated with EI info that includes a static EI identifier (ID). When the first computing device acquires the EI, the marketplace server assigns the first computing device a first dynamic ID for the EI. A secure chain of custody for the EI (which includes a secure data block featuring the EI information) is updated to include a new secure data block representative of the first computing device's acquisition of the EI and the assignment of the first dynamic ID. Examples of fraudulent acquisition include the exchange item was purchased using a fraudulent financial instrument (e.g., the EI was purchased using a stolen credit card) and/or the exchange item was purchased by an unauthorized user (e.g., the first computing device has a fake/unauthorized computing device ID).

The method continues with step 1618 where the marketplace server deactivates the first dynamic ID in response to detecting the fraudulent acquisition. The secure chain of custody for the EI is updated to include a new secure data block representative of the deactivation of the first dynamic ID. After deactivating the first dynamic ID, the method continues to step 1620 where the marketplace server detects requested use of the EI by the first computing device. The method continues to step 1622 where the marketplace server denies any requested use of the EI by the first computing device. The method continues with step 1624 where the marketplace server reclaims ownership of the EI. The secure chain of custody for the EI is updated to include a new secure data block representative of the reclaimed ownership of the EI. Alternatively, no requested use of the first computing device is detected and after the first dynamic ID is deactivated, the marketplace server reclaims ownership of the EI.

A second computing device may then request to acquire the reclaimed EI. The marketplace server would then assign a second dynamic ID for the second computing device. The secure chain of custody of the EI would be updated to include a new data block representative of the acquisition of the EI by the second computing device and the assignment of the second dynamic ID.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprising:
   generating, for an exchange item and by a marketplace server of a computing network, a first dynamic identifier (ID) for utilization of the exchange item by a first computing device within the computing network, wherein exchange item information is associated with the exchange item, wherein the exchange item information includes a static ID of the exchange item, wherein the first dynamic ID includes a combination of dynamic bits and static bits, wherein the combination is based on a dynamic securing function associated with the exchange item, and wherein the static bits are at least a portion of the static ID;
   detecting, by the marketplace server, fraudulent acquisition of the exchange item by the first computing device, wherein the marketplace server has control over a secure chain of custody of the exchange item;
   deactivating, by the marketplace server, the first dynamic ID in response to the detecting fraudulent acquisition, wherein the static ID of the exchange item remains active and valid; and
   after deactivating the first dynamic ID:
      detecting, by the marketplace server, requested use of the exchange item by the first computing device;
      denying, by the marketplace server, the requested use of the exchange item; and
      reclaiming, by the marketplace server, ownership of the exchange item, wherein the static ID of the exchange item remains active and valid.

2. The method of claim 1, wherein the fraudulent acquisition comprises one or more of:
   determining the exchange item was purchased using a fraudulent financial instrument; and
   determining the exchange item was purchased by an unauthorized user.

3. The method of claim 1 further comprising:
   creating, by the marketplace server, a first secure data block for the acquisition of the exchange item by the first computing device, wherein the first secure data block is included in the secure chain of custody of the exchange item, wherein the first secure data block includes a first header section and a first transaction section and wherein the first transaction section includes information regarding ownership acquisition by the first computing device and the first dynamic ID being associated with the exchange item and the first computing device.

4. The method of claim 3, wherein the deactivating the first dynamic ID comprises:
   creating, by the marketplace server, a second secure data block, wherein the second secure data block is included in the secure chain of custody, wherein the second secure data block includes a second header section and a second transaction section, wherein the second header section includes a hash of the first secure data block, and wherein the second transaction section includes information regarding deactivating the first dynamic ID and a hash of the information regarding the deactivating of the first dynamic ID.

5. The method of claim 1, wherein the reclaiming comprises:
   creating, by the marketplace server, a first secure data block for the reclaiming ownership of the exchange item, wherein the first secure data block is included in the secure chain of custody of the exchange item, wherein the first secure data block includes a header section and a transaction section and wherein the transaction section includes information regarding reclaiming ownership of the exchange item by the marketplace server.

6. The method of claim 1 further comprising:
   receiving, by the marketplace server, a request to acquire the reclaimed exchange item by a second computing device;
   generating, by the marketplace server, a second dynamic ID for the second computing device, wherein the second dynamic ID establishes the exchange item for use by the second computing device within the computing network, and wherein the second dynamic ID includes a second combination of second dynamic bits and the static bits; and
   generating, by the marketplace server, a subsequent secure data block for the acquisition of the exchange item by the second computing device, wherein the subsequent secure data block is included in the secure chain of custody of the exchange item, wherein the subsequent secure data block includes a header section and a transaction section and wherein the transaction section includes information regarding ownership acquisition by the second computing device and the second dynamic ID being associated with the exchange item and the second computing device.

7. A method comprising:
   generating, for an exchange item and by a marketplace server of a computing network, a first dynamic identifier (ID) for utilization of the exchange item by a first computing device within the computing network, wherein exchange item information is associated with the exchange item, wherein the exchange item information includes a static ID of the exchange item, wherein the first dynamic ID includes a combination of dynamic bits and static bits, wherein the combination is based on a dynamic securing function associated with the exchange item, and wherein the static bits are at least a portion of the static ID;

detecting, by the marketplace server, fraudulent acquisition of the exchange item by the first computing device, wherein the marketplace server has control over the secure chain of custody of the exchange item;

deactivating, by the marketplace server, the first dynamic ID in response to the detecting fraudulent acquisition, wherein the static ID of the exchange item remains active and valid; and after deactivating the first dynamic ID:
reclaiming, by the marketplace server, ownership of the exchange item, wherein the static ID of the exchange item remains active and valid;

receiving, by the marketplace server, a request to acquire the reclaimed exchange item by a second computing device; and generating, by the marketplace server, a second dynamic ID for the second computing device, wherein the second dynamic ID establishes the exchange item for use by the second computing device within the computing network, wherein the static ID of the exchange item remains active and valid, and wherein the second dynamic ID includes a second combination of second dynamic bits and the static bits.

8. The method of claim 7 further comprising:
creating, by the marketplace server, a first secure data block for the acquisition of the exchange item by the first computing device, wherein the first secure data block is included in the secure chain of custody of the exchange item, wherein the first secure data block includes a first header section and a first transaction section and wherein the first transaction section includes information regarding ownership acquisition by the first computing device and the first dynamic ID being associated with the exchange item and the first computing device.

9. The method of claim 8 wherein deactivating the first dynamic ID comprises:
creating, by the marketplace server, a second secure data block, wherein the second secure data block is included in the secure chain of custody, wherein the second secure data block includes a second header section and a second transaction section, wherein the second header section includes a hash of the first secure data block, and wherein the second transaction section includes information regarding deactivating the first dynamic ID and a hash of the information regarding the deactivating of the first dynamic ID.

10. The method of claim 7, wherein the reclaiming comprises:
creating, by the marketplace server, a first secure data block for the reclaiming ownership of the exchange item, wherein the first secure data block is included in the secure chain of custody of the exchange item, wherein the first secure data block includes a header section and a transaction section and wherein the transaction section includes information regarding reclaiming ownership of the exchange item by the marketplace server.

11. The method of claim 7 further comprising:
generating, by the marketplace server, a subsequent secure data block for the acquisition of the exchange item by the second computing device, wherein the subsequent secure data block is included in the secure chain of custody of the exchange item, wherein the subsequent secure data block includes a header section and a transaction section and wherein the transaction section includes information regarding ownership acquisition by the second computing device and the second dynamic ID being associated with the exchange item and the second computing device.

12. A marketplace server of a computing network, the marketplace server comprising:
an interface;
memory; and
a processing module operably coupled to the memory and the interface, wherein the processing module is configured to:
generate, for an exchange item, a first dynamic identifier (ID) for utilization of the exchange item by a first computing device within the computing network, wherein exchange item information is associated with the exchange item, wherein the exchange item information includes a static ID of the exchange item, wherein the first dynamic ID includes a combination of dynamic bits and static bits, wherein the combination is based on a dynamic securing function associated with the exchange item, and wherein the static bits are at least a portion of the static ID;

detect fraudulent acquisition of the exchange item by the first computing device, wherein the marketplace server has control over a secure chain of custody of the exchange item;

deactivate the first dynamic ID in response to the detecting fraudulent acquisition, wherein the static ID of the exchange item remains active and valid; and after deactivating the first dynamic ID:
detect requested use of the exchange item by the first computing device;
deny the requested use of the exchange item; and
reclaim ownership of the exchange item, wherein the static ID of the exchange item remains active and valid.

13. The marketplace server of claim 12, wherein the fraudulent acquisition comprises one or more of:
determining the exchange item was purchased using a fraudulent financial instrument; and
determining the exchange item was purchased by an unauthorized user.

14. The marketplace server of claim 12, wherein the processing module is further configured to:
create a first secure data block for the acquisition of the exchange item by the first computing device, wherein the first secure data block is included in the secure chain of custody of the exchange item, wherein the first secure data block includes a first header section and a first transaction section and wherein the first transaction section includes information regarding ownership acquisition by the first computing device and the first dynamic ID being associated with the exchange item and the first computing device.

15. The marketplace server of claim 14, wherein the processing module is configured to deactivate the first dynamic ID by:
creating a second secure data block, wherein the second secure data block is included in the secure chain of custody, wherein the second secure data block includes a second header section and a second transaction section, wherein the second header section includes a hash of the first secure data block, and wherein the second transaction section includes information regarding deactivating the first dynamic ID and a hash of the information regarding the deactivating of the first dynamic ID.

16. The marketplace server of claim 12, wherein the processing module is configured to reclaim by:
create a first secure data block for the reclaiming ownership of the exchange item, wherein the first secure data block is included in the secure chain of custody of the exchange item, wherein the first secure data block includes a header section and a transaction section and wherein the transaction section includes information regarding reclaiming ownership of the exchange item by the marketplace server.

17. The marketplace server of claim 12, wherein the processing module is further configured to:
receive a request to acquire the reclaimed exchange item by a second computing device;
generate a second dynamic ID for the second computing device, wherein the second dynamic ID establishes the exchange item for use by the second computing device within the computing network; and
generate a subsequent secure data block for the acquisition of the exchange item by the second computing device, wherein the subsequent secure data block is included in the secure chain of custody of the exchange item, wherein the subsequent secure data block includes a header section and a transaction section and wherein the transaction section includes information regarding ownership acquisition by the second computing device and the second dynamic ID being associated with the exchange item and the second computing device.

18. A marketplace server of a computing network, the marketplace server comprising:
an interface;
memory; and
a processing module operably coupled to the memory and the interface, wherein the processing module is configured to:
generate, for an exchange item, a first dynamic identifier (ID) for utilization of the exchange item by a first computing device within the computing network, wherein exchange item information is associated with the exchange item wherein the exchange item information includes a static ID of the exchange item, wherein the first dynamic ID includes a combination of dynamic bits and static bits, wherein the combination is based on a dynamic securing function associated with the exchange item, and wherein the static bits are at least a portion of the static ID;
detect fraudulent acquisition of the exchange item by the first computing device, wherein the marketplace server has control over a secure chain of custody of the exchange item;
deactivate the first dynamic ID in response to the detecting fraudulent acquisition, wherein the static ID of the exchange item remains active and valid; and after deactivating the first dynamic ID:
reclaim ownership of the exchange item;
receive a request to acquire the reclaimed exchange item by a second computing device; and
generate a second dynamic ID for the second computing device, wherein the second dynamic ID establishes the exchange item for use by the second computing device within the computing network, wherein the static ID of the exchange item remains active and valid, and wherein the second dynamic ID includes a second combination of second dynamic bits and the static bits.

19. The marketplace server of claim 18, wherein the processing module is further configured to:
create a first secure data block for the acquisition of the exchange item by the first computing device, wherein the first secure data block is included in the secure chain of custody of the exchange item, wherein the first secure data block includes a first header section and a first transaction section and wherein the first transaction section includes information regarding ownership acquisition by the first computing device and the first dynamic ID being associated with the exchange item and the first computing device.

20. The marketplace server of claim 19, wherein the processing module is configured to deactivate the first dynamic ID by:
creating a second secure data block, wherein the second secure data block is included in the secure chain of custody, wherein the second secure data block includes a second header section and a second transaction section, wherein the second header section includes a hash of the first secure data block, and wherein the second transaction section includes information regarding deactivating the first dynamic ID and a hash of the information regarding the deactivating of the first dynamic ID.

21. The marketplace server of claim 18, wherein the processing module is configured to reclaim by:
creating a first secure data block for the reclaiming ownership of the exchange item, wherein the first secure data block is included in the secure chain of custody of the exchange item, wherein the first secure data block includes a header section and a transaction section and wherein the transaction section includes information regarding reclaiming ownership of the exchange item by the marketplace server.

22. The marketplace server of claim 18, wherein the processing module is further configured to:
generate a subsequent secure data block for the acquisition of the exchange item by the second computing device, wherein the subsequent secure data block is included in the secure chain of custody of the exchange item, wherein the subsequent secure data block includes a header section and a transaction section and wherein the transaction section includes information regarding ownership acquisition by the second computing device and the second dynamic ID being associated with the exchange item and the second computing device.

* * * * *